US012643039B2

(12) United States Patent
Huijbregts et al.

(10) Patent No.: US 12,643,039 B2
(45) Date of Patent: Jun. 2, 2026

(54) METHODS AND DEVICES FOR SUPPORTING DEVICE ADAPTIVE ONLINE VIDEO GAMES

(71) Applicant: Bright Star Studios ApS, Aarhus C (DK)

(72) Inventors: Joris Johannes Adrianus Huijbregts, Copenhagen (DK); Tom Aaron Yaxley, Preston (AU)

(73) Assignee: Bright Star Gamining LLC, Austin, TX (US)

( * ) Notice: Subject to any disclaimer, the term of this patent is extended or adjusted under 35 U.S.C. 154(b) by 215 days.

(21) Appl. No.: 18/678,864

(22) Filed: May 30, 2024

(65) Prior Publication Data

US 2024/0307768 A1     Sep. 19, 2024

Related U.S. Application Data

(63) Continuation of application No. PCT/US2023/060285, filed on Jan. 9, 2023.

(Continued)

(51) Int. Cl.
     *G06Q 30/02*     (2023.01)
     *A63F 13/355*     (2014.01)

(52) U.S. Cl.
     CPC .................................. *A63F 13/355* (2014.09)

(58) Field of Classification Search
     CPC ........ A63F 13/355; A63F 13/35; A63F 13/67; G06N 3/006; G06N 3/08; G06N 3/126;

(Continued)

(56) References Cited

U.S. PATENT DOCUMENTS 7,293,235 B1 * 11/2007 Powers ..................... G06T 7/20
                                                    463/9

9,323,680 B1 * 4/2016 Salli ................. H04N 21/23406
10,673,924 B2   6/2020 Boudville
                        (Continued)

FOREIGN PATENT DOCUMENTS

JP          2007222310 A     9/2007
KR          101827355 B1     2/2018

OTHER PUBLICATIONS

"Game-on-demand: An online game engine based on geometry streaming" (Li, Fred & Lau, Rynson & Kilis, Danny & Li, Lewis.; published Sep. 2, 2011, TOMCCAP. 7. 19. 10.1145/2000486. 2000493) (Year: 2011).*
"AppStreamer: Reducing Storage Requirements of Mobile Games through Predictive Streaming" (Theera-Ampornpunt, Nawanol et al.; May 19, 2020; EWSN '20: Proceedings of the 2020 International Conference on Embedded Wireless Systems and Networks pp. 37-48) (Year: 2020).*

(Continued)

*Primary Examiner* — James M Detweiler
(74) *Attorney, Agent, or Firm* — Katz Ruby & Carle LLP; Bruce E. Stuckman

(57)     ABSTRACT

A device operates by receiving prefetch data associated with a video game, wherein the prefetch data includes an amount of first video gaming data to be prefetched that is determined based on performance parameters; executing the video game via the end user device; receiving user input at a user interface associated with controlling movement of a player in a first region of the video game; predicting, based on the movement of the player in the first region, a movement of the player to a second region of the video game; lazy loading second video gaming data and prior to the player entering the region, wherein the lazy loading is adapted based on the performance parameters to a bandwidth that is a predetermined amount less than the connection speed; and continuing executing the video game on the end user device based at least in part on the second video gaming data.

19 Claims, 46 Drawing Sheets
(11 of 46 Drawing Sheet(s) Filed in Color)

Related U.S. Application Data

(60) Provisional application No. 63/477,288, filed on Dec. 27, 2022, provisional application No. 63/477,318, filed on Dec. 27, 2022, provisional application No. 63/477,300, filed on Dec. 27, 2022, provisional application No. 63/477,292, filed on Dec. 27, 2022, provisional application No. 63/477,332, filed on Dec. 27, 2022, provisional application No. 63/477,326, filed on Dec. 27, 2022, provisional application No. 63/477,313, filed on Dec. 27, 2022, provisional application No. 63/477,308, filed on Dec. 27, 2022, provisional application No. 63/297,940, filed on Jan. 10, 2022, provisional application No. 63/297,941, filed on Jan. 10, 2022.

(58) Field of Classification Search
CPC .......... G06N 5/01; G06N 5/048; G06N 20/10; G06N 3/0464; G06N 7/00
See application file for complete search history.

(56) References Cited

U.S. PATENT DOCUMENTS

| | | | |
|---|---|---|---|
| 2008/0147971 A1* | 6/2008 | Hawkins ................. | A63F 13/00 |
| | | | 711/E12.017 |
| 2009/0292513 A1* | 11/2009 | Watte .................... | A63F 13/358 |
| | | | 711/170 |
| 2015/0165310 A1 | 6/2015 | Rebh et al. | |
| 2016/0080442 A1* | 3/2016 | Justice ................... | A63F 13/77 |
| | | | 709/219 |
| 2019/0015752 A1* | 1/2019 | Chan ..................... | H04L 65/401 |
| 2019/0230185 A1* | 7/2019 | Dhanabalan ............ | H04L 12/14 |
| 2019/0250773 A1* | 8/2019 | Miyaki ............... | G06F 3/04815 |
| 2020/0193717 A1 | 6/2020 | Daly | |

OTHER PUBLICATIONS

International Searching Authority; International Search Report and Written Opinion; International Application No. PCT/US2023/060285; Apr. 28, 2023; 13 pgs.

* cited by examiner

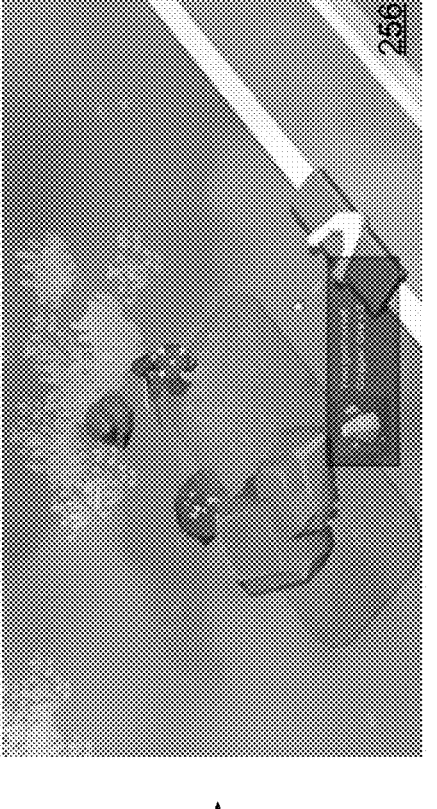
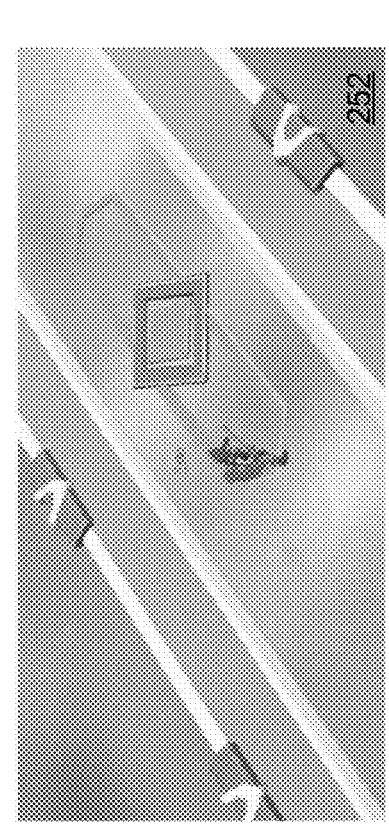
FIG. 2A

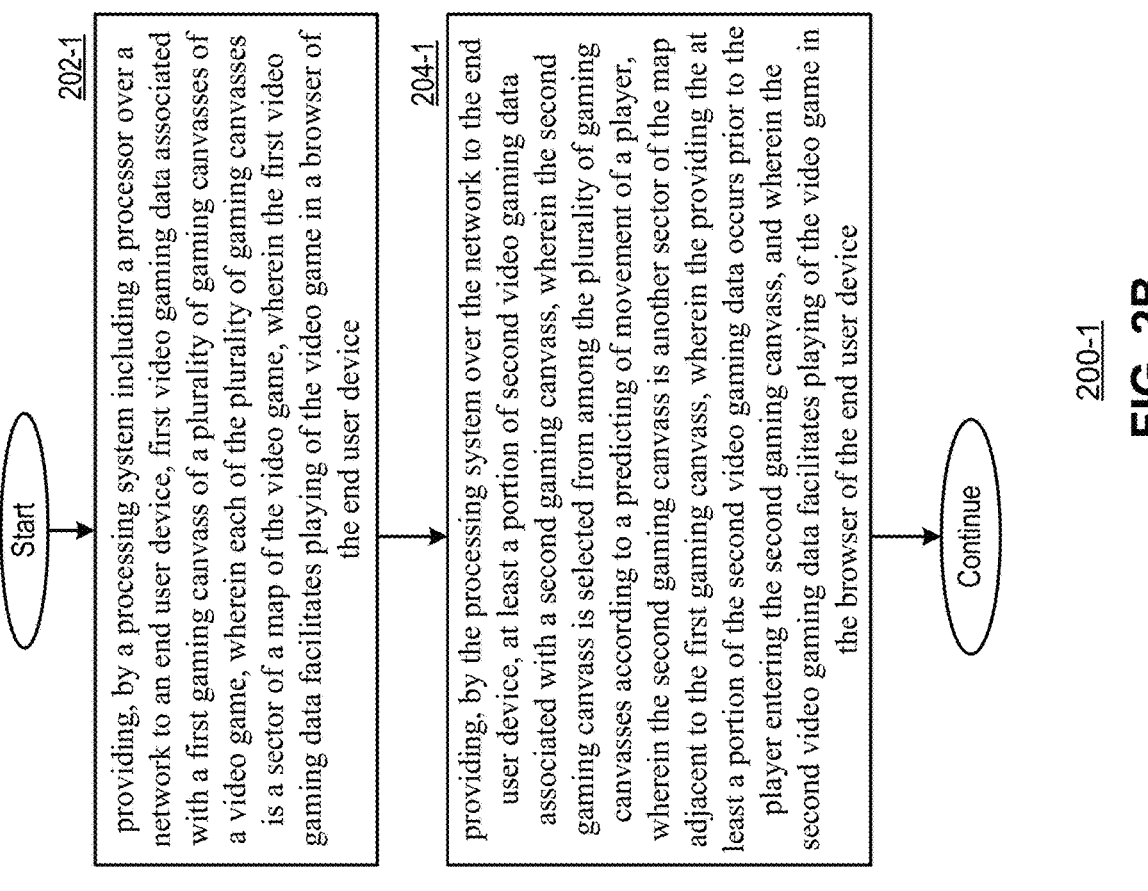

202-1 providing, by a processing system including a processor over a network to an end user device, first video gaming data associated with a first gaming canvass of a plurality of gaming canvasses of a video game, wherein each of the plurality of gaming canvasses is a sector of a map of the video game, wherein the first video gaming data facilitates playing of the video game in a browser of the end user device 204-1 providing, by the processing system over the network to the end user device, at least a portion of second video gaming data associated with a second gaming canvass, wherein the second gaming canvass is selected from among the plurality of gaming canvasses according to a predicting of movement of a player, wherein the second gaming canvass is another sector of the map adjacent to the first gaming canvass, wherein the providing the at least a portion of the second video gaming data occurs prior to the player entering the second gaming canvass, and wherein the second video gaming data facilitates playing of the video game in the browser of the end user device 200-1

FIG. 2B

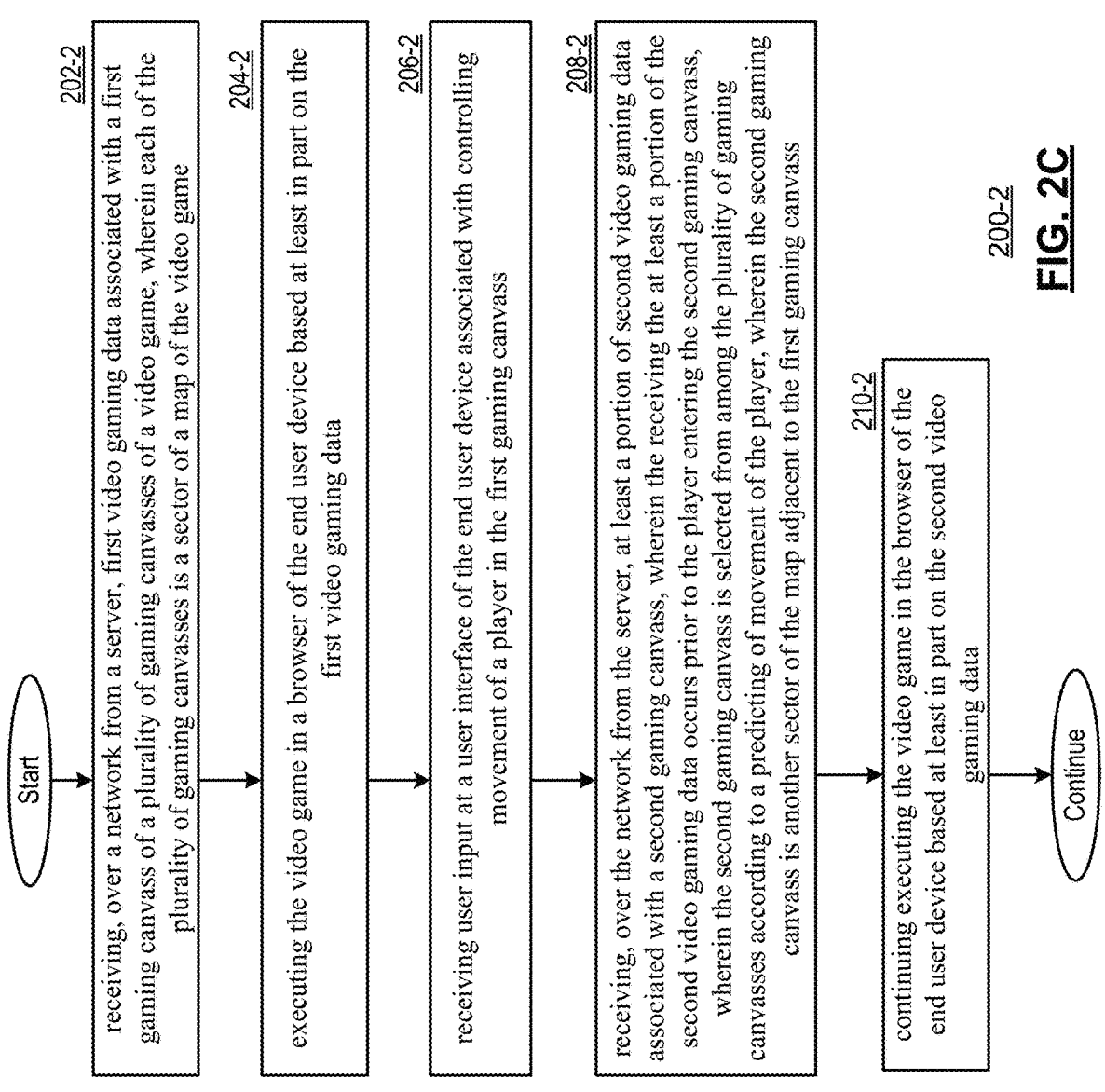

Start 202-2
receiving, over a network from a server, first video gaming data associated with a first gaming canvass of a plurality of gaming canvasses of a video game, wherein each of the plurality of gaming canvasses is a sector of a map of the video game 204-2
executing the video game in a browser of the end user device based at least in part on the first video gaming data 206-2
receiving user input at a user interface of the end user device associated with controlling movement of a player in the first gaming canvass 208-2
receiving, over the network from the server, at least a portion of second video gaming data associated with a second gaming canvass, wherein the receiving the at least a portion of the second video gaming data occurs prior to the player entering the second gaming canvass, wherein the second gaming canvass is selected from among the plurality of gaming canvasses according to a predicting of movement of the player, wherein the second gaming canvass is another sector of the map adjacent to the first gaming canvass 210-2
continuing executing the video game in the browser of the end user device based at least in part on the second video gaming data Continue 200-2
FIG. 2C

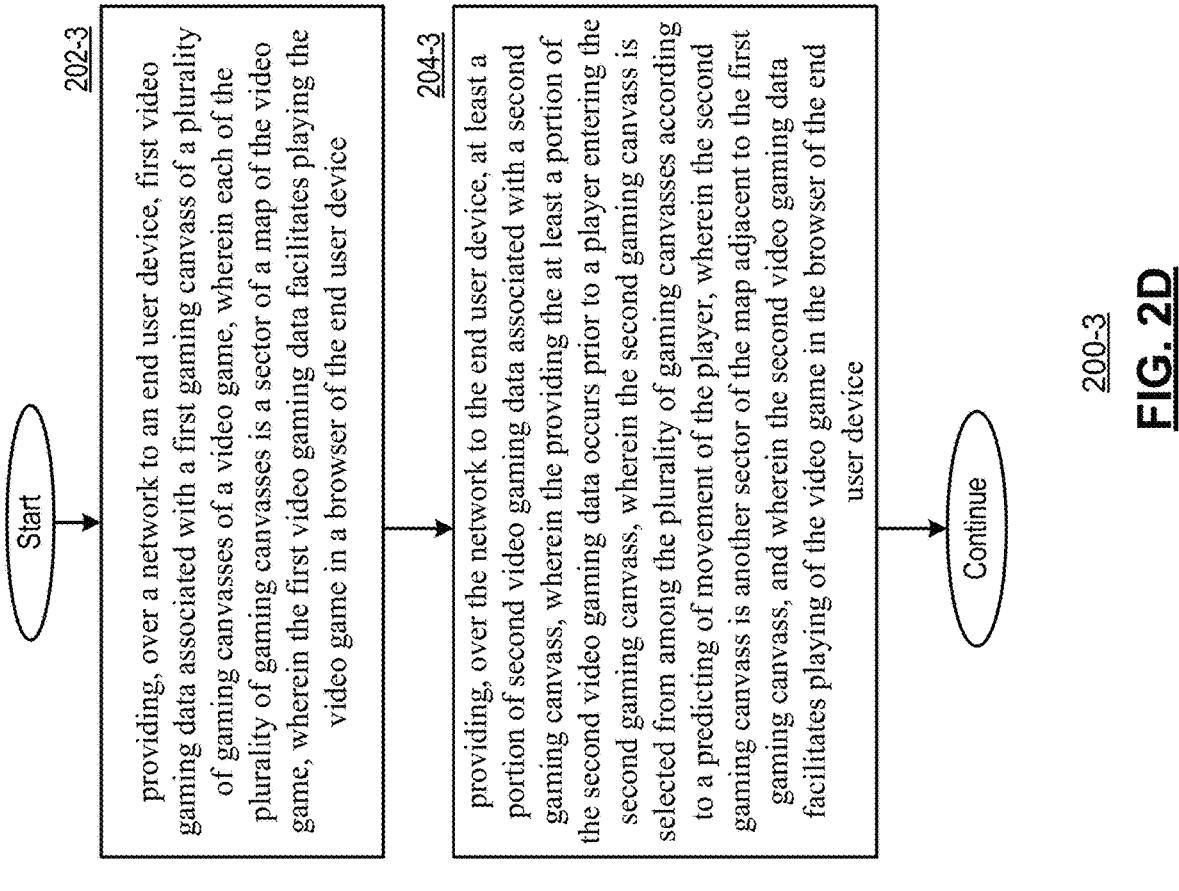

202-3 providing, over a network to an end user device, first video gaming data associated with a first gaming canvass of a plurality of gaming canvasses of a video game, wherein each of the plurality of gaming canvasses is a sector of a map of the video game, wherein the first video gaming data facilitates playing the video game in a browser of the end user device 204-3 providing, over the network to the end user device, at least a portion of second video gaming data associated with a second gaming canvass, wherein the providing the at least a portion of the second video gaming data occurs prior to a player entering the second gaming canvass, wherein the second gaming canvass is selected from among the plurality of gaming canvasses according to a predicting of movement of the player, wherein the second gaming canvass is another sector of the map adjacent to the first gaming canvass, and wherein the second video gaming data facilitates playing of the video game in the browser of the end user device Start Continue 200-3

FIG. 2D

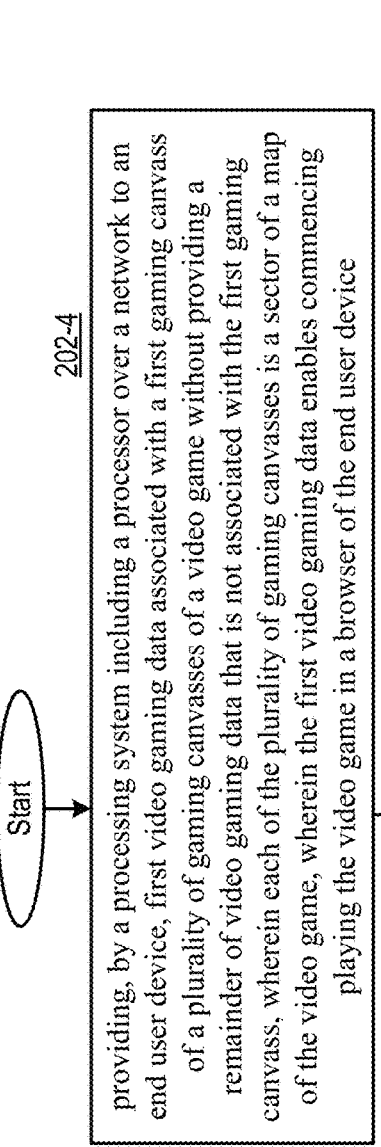

Start

202-4 providing, by a processing system including a processor over a network to an end user device, first video gaming data associated with a first gaming canvass of a plurality of gaming canvasses of a video game without providing a remainder of video gaming data that is not associated with the first gaming canvass, wherein each of the plurality of gaming canvasses is a sector of a map of the video game, wherein the first video gaming data enables commencing playing the video game in a browser of the end user device

204-4 providing, by the processing system over the network to the end user device, second video gaming data associated with a second gaming canvass that is another sector of the map adjacent to the first gaming canvass, wherein the providing the second video gaming data commences prior to a player entering the second gaming canvass, wherein the second video gaming data facilitates playing of the video game in the browser of the end user device, and wherein the providing the second video gaming data comprises: prioritizing downloading of static objects according to Axis-Aligned Bounding Box (AABB) volume and distance to the player; and prioritizing downloading of dynamic objects according to type and distance to the player; wherein unloading of the video gaming data is according to a memory pressure calculation for the end user device, reference counting of resources associated with the static and dynamic objects, access times for the static and dynamic objects, and unloading policies assigned to a resource type

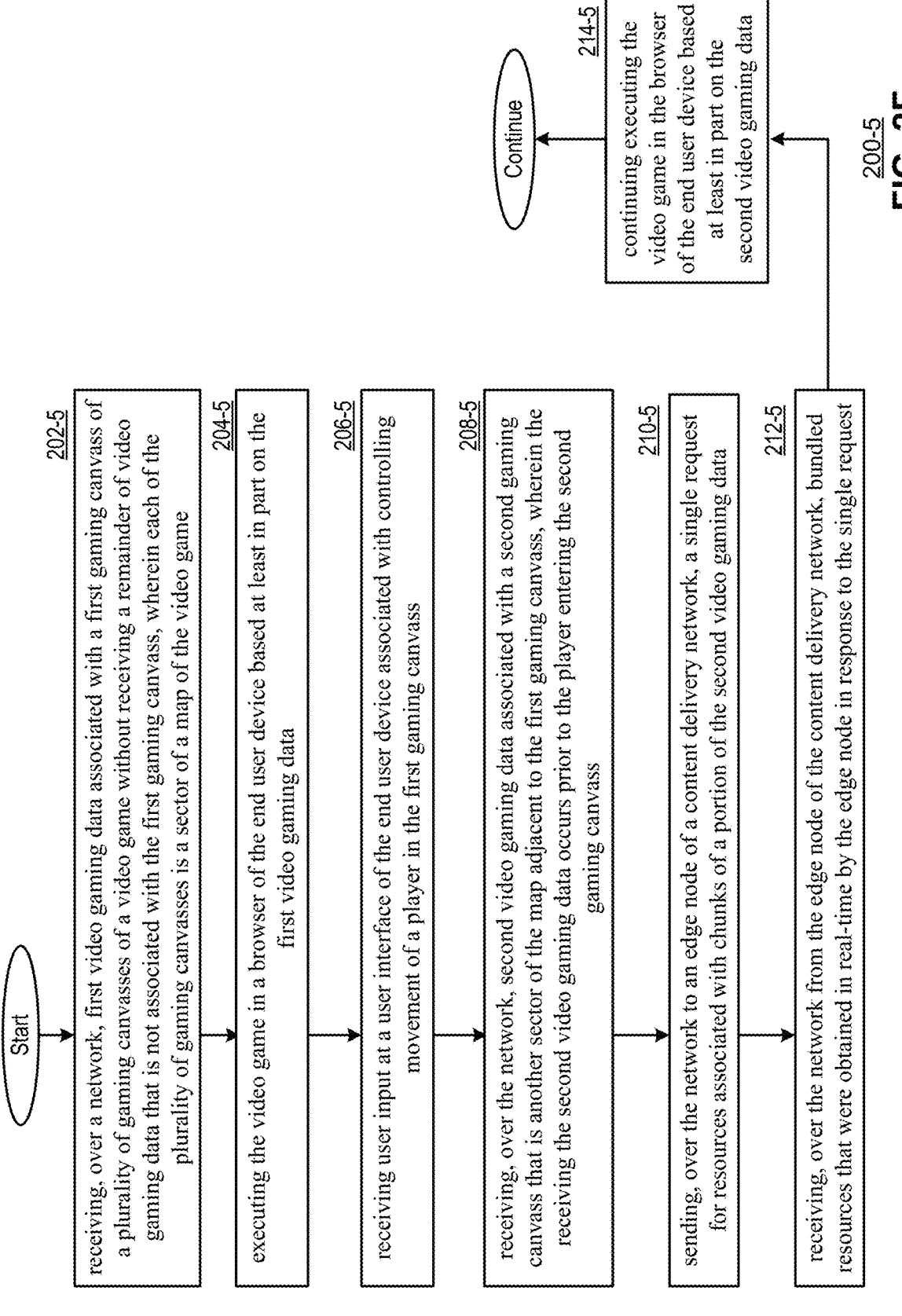

Start 202-5 receiving, over a network, first video gaming data associated with a first gaming canvass of a plurality of gaming canvasses of a video game without receiving a remainder of video gaming data that is not associated with the first gaming canvass, wherein each of the plurality of gaming canvasses is a sector of a map of the video game 204-5 executing the video game in a browser of the end user device based at least in part on the first video gaming data 206-5 receiving user input at a user interface of the end user device associated with controlling movement of a player in the first gaming canvass 208-5 receiving, over the network, second video gaming data associated with a second gaming canvass that is another sector of the map adjacent to the first gaming canvass, wherein the receiving the second video gaming data occurs prior to the player entering the second gaming canvass 210-5 sending, over the network to an edge node of a content delivery network, a single request for resources associated with chunks of a portion of the second video gaming data 212-5 receiving, over the network from the edge node of the content delivery network, bundled resources that were obtained in real-time by the edge node in response to the single request 214-5 continuing executing the video game in the browser of the end user device based at least in part on the second video gaming data Continue 200-5

FIG. 2F

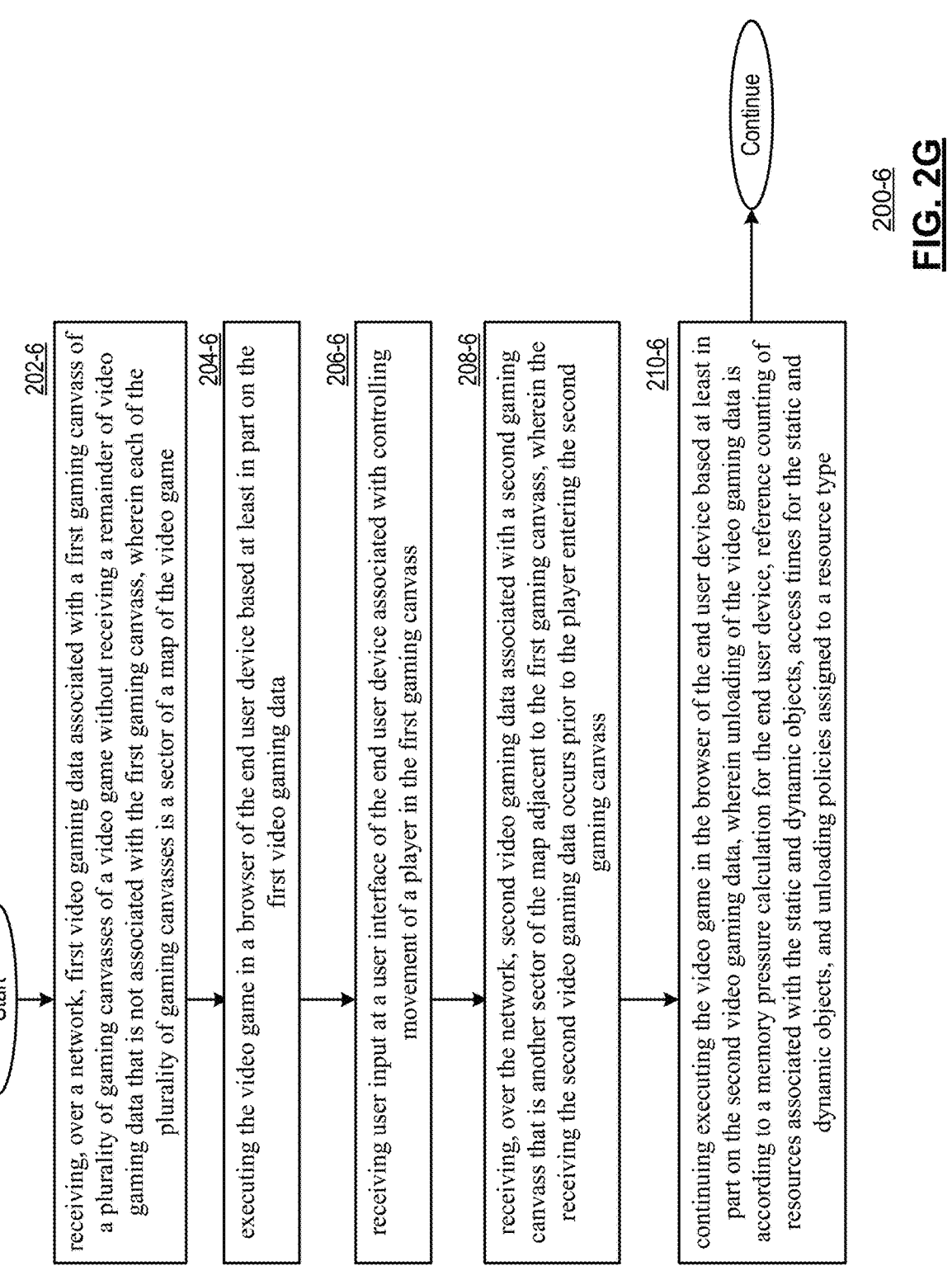

202-6 receiving, over a network, first video gaming data associated with a first gaming canvass of a plurality of gaming canvasses of a video game without receiving a remainder of video gaming data that is not associated with the first gaming canvass, wherein each of the plurality of gaming canvasses is a sector of a map of the video game 204-6 executing the video game in a browser of the end user device based at least in part on the first video gaming data 206-6 receiving user input at a user interface of the end user device associated with controlling movement of a player in the first gaming canvass 208-6 receiving, over the network, second video gaming data associated with a second gaming canvass that is another sector of the map adjacent to the first gaming canvass, wherein the receiving the second video gaming data occurs prior to the player entering the second gaming canvass 210-6 continuing executing the video game in the browser of the end user device based at least in part on the second video gaming data, wherein unloading of the video gaming data is according to a memory pressure calculation for the end user device, reference counting of resources associated with the static and dynamic objects, access times for the static and dynamic objects, and unloading policies assigned to a resource type Start Continue 200-6

$s$ = max speed $e$ = extrapolation distance $magnitude(v^1 - v^2) * s * e$

330

340

350

400

500

Sector set
652-5

Sector set
652-4

Sector set
652-3

Sector set
652-2

Sector set
652-1

Sector set
652-7

Sector set
652-6

650

Game server
660

Data 182 in
support of lazy
loading
transactions

End user device
105

640

620

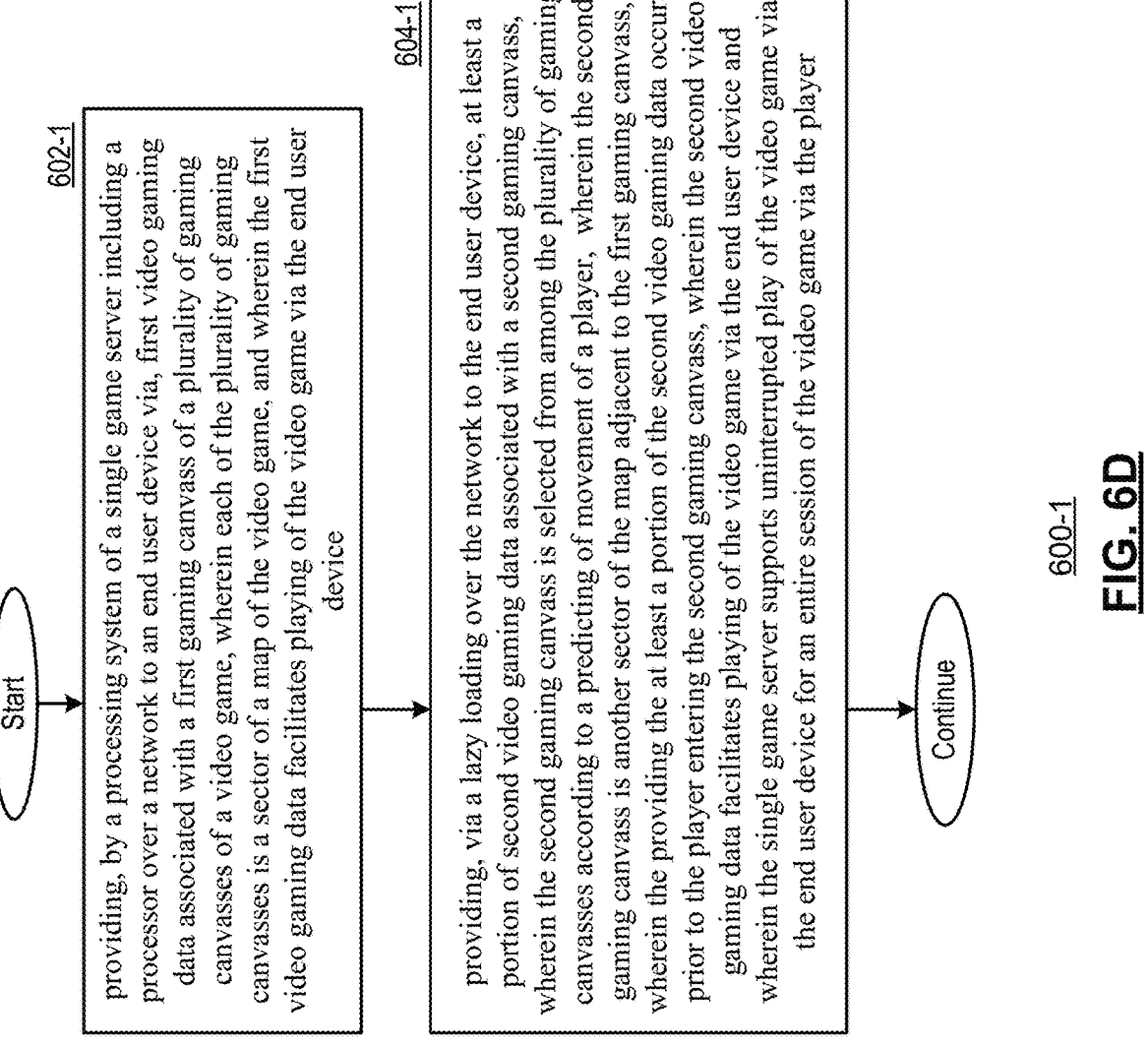

602-1 providing, by a processing system of a single game server including a processor over a network to an end user device via, first video gaming data associated with a first gaming canvass of a plurality of gaming canvasses of a video game, wherein each of the plurality of gaming canvasses is a sector of a map of the video game, and wherein the first video gaming data facilitates playing of the video game via the end user device 604-1 providing, via a lazy loading over the network to the end user device, at least a portion of second video gaming data associated with a second gaming canvass, wherein the second gaming canvass is selected from among the plurality of gaming canvasses according to a predicting of movement of a player, wherein the second gaming canvass is another sector of the map adjacent to the first gaming canvass, wherein the providing the at least a portion of the second video gaming data occurs prior to the player entering the second gaming canvass, wherein the second video gaming data facilitates playing of the video game via the end user device and wherein the single game server supports uninterrupted play of the video game via the end user device for an entire session of the video game via the player 600-1

FIG. 6D

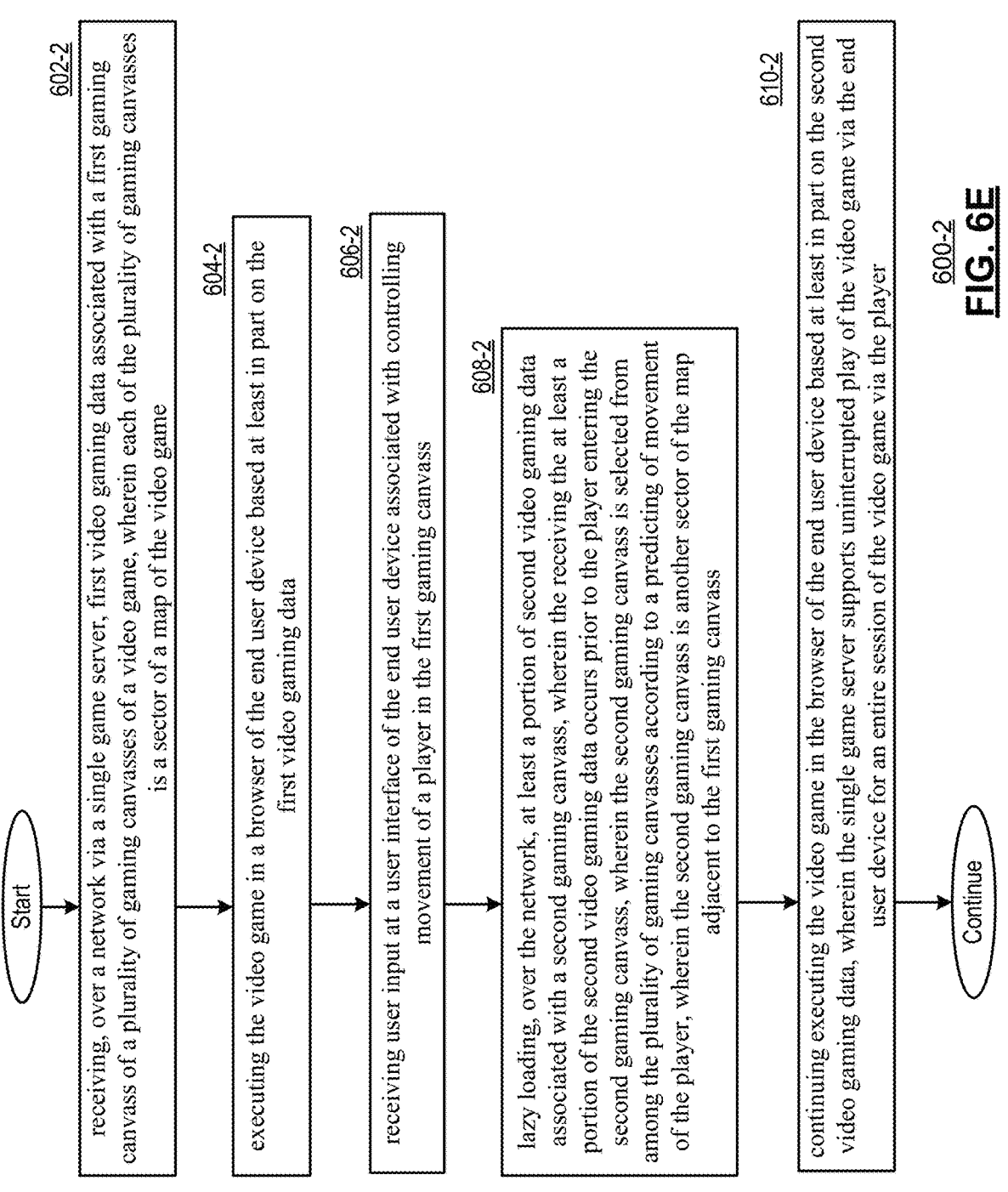

Start 602-2 receiving, over a network via a single game server, first video gaming data associated with a first gaming canvass of a plurality of gaming canvasses of a video game, wherein each of the plurality of gaming canvasses is a sector of a map of the video game 604-2 executing the video game in a browser of the end user device based at least in part on the first video gaming data 606-2 receiving user input at a user interface of the end user device associated with controlling movement of a player in the first gaming canvass 608-2 lazy loading, over the network, at least a portion of second video gaming data associated with a second gaming canvass, wherein the receiving the at least a portion of the second video gaming data occurs prior to the player entering the second gaming canvass, wherein the second gaming canvass is selected from among the plurality of gaming canvasses according to a predicting of movement of the player, wherein the second gaming canvass is another sector of the map adjacent to the first gaming canvass 610-2 continuing executing the video game in the browser of the end user device based at least in part on the second video gaming data, wherein the single game server supports uninterrupted play of the video game via the end user device for an entire session of the video game via the player Continue 600-2

FIG. 6E

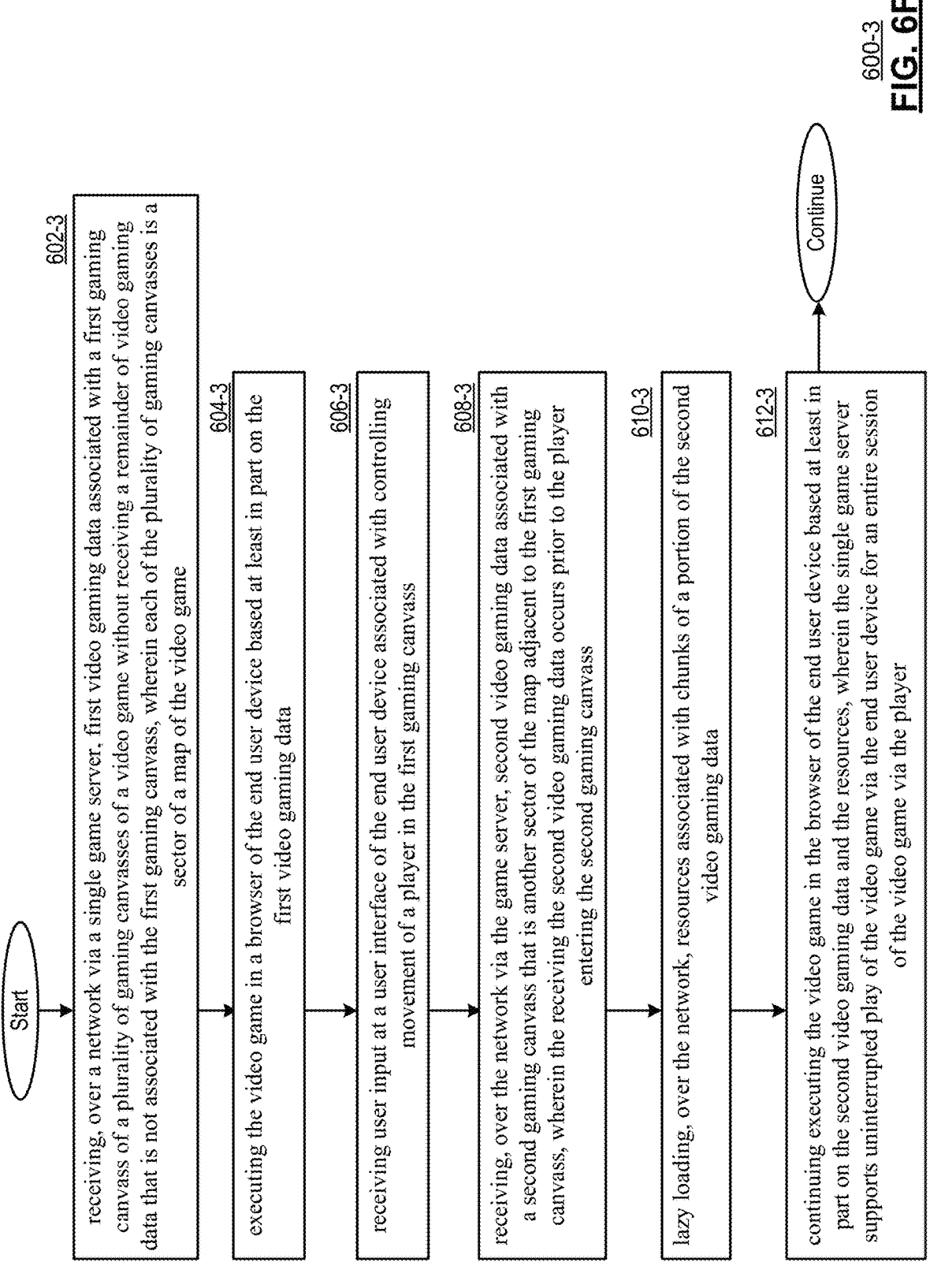

602-3 receiving, over a network via a single game server, first video gaming data associated with a first gaming canvass of a plurality of gaming canvasses of a video game without receiving a remainder of video gaming data that is not associated with the first gaming canvass, wherein each of the plurality of gaming canvasses is a sector of a map of the video game 604-3 executing the video game in a browser of the end user device based at least in part on the first video gaming data 606-3 receiving user input at a user interface of the end user device associated with controlling movement of a player in the first gaming canvass 608-3 receiving, over the network via the game server, second video gaming data associated with a second gaming canvass that is another sector of the map adjacent to the first gaming canvass, wherein the receiving the second video gaming data occurs prior to the player entering the second gaming canvass 610-3 lazy loading, over the network, resources associated with chunks of a portion of the second video gaming data 612-3 continuing executing the video game in the browser of the end user device based at least in part on the second video gaming data and the resources, wherein the single game server supports uninterrupted play of the video game via the end user device for an entire session of the video game via the player Continue 600-3

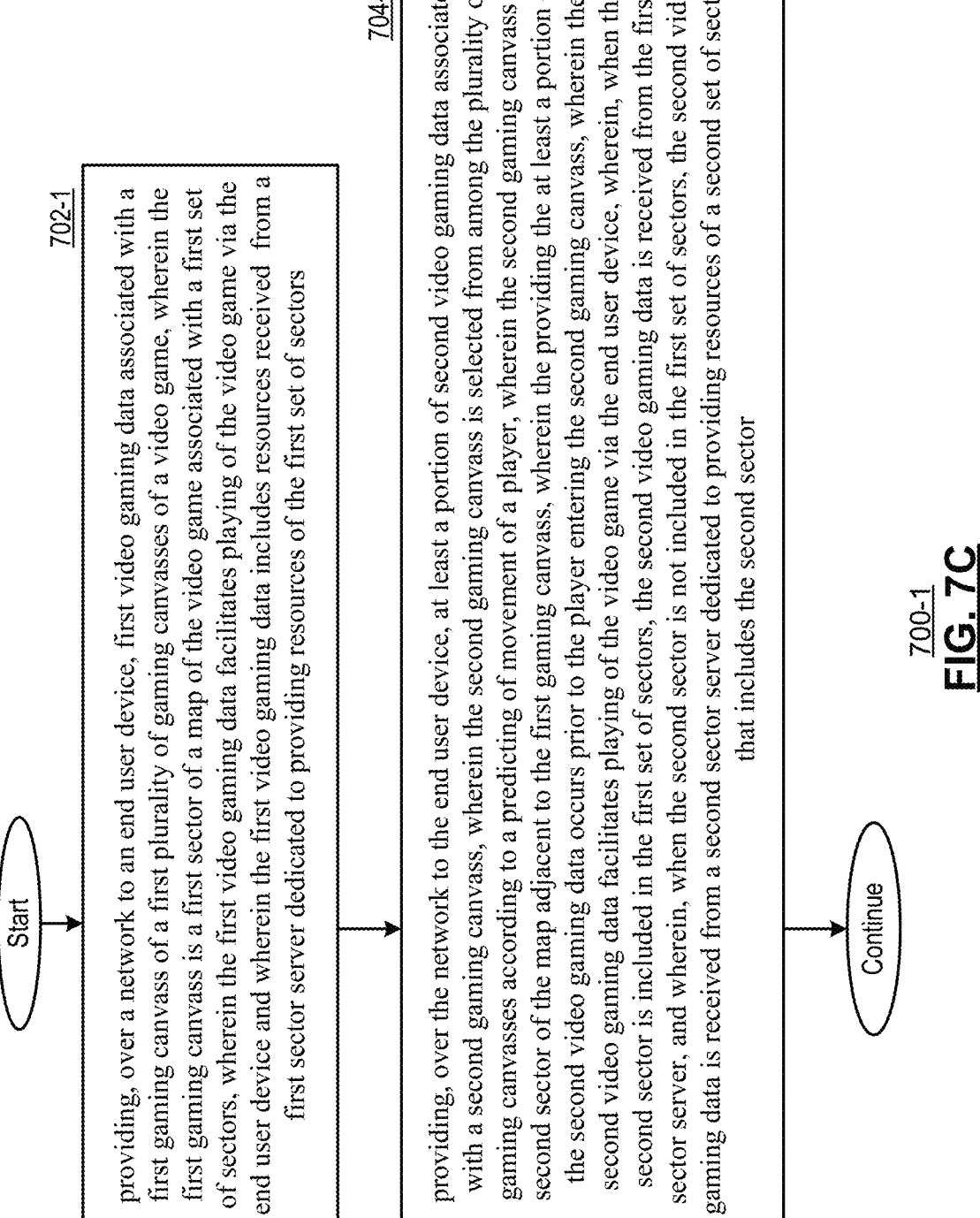

702-1 providing, over a network to an end user device, first video gaming data associated with a first gaming canvass of a first plurality of gaming canvasses of a video game, wherein the first gaming canvass is a first sector of a map of the video game associated with a first set of sectors, wherein the first video gaming data facilitates playing of the video game via the end user device and wherein the first video gaming data includes resources received from a first sector server dedicated to providing resources of the first set of sectors 704-1 providing, over the network to the end user device, at least a portion of second video gaming data associated with a second gaming canvass, wherein the second gaming canvass is selected from among the plurality of gaming canvasses according to a predicting of movement of a player, wherein the second gaming canvass is second sector of the map adjacent to the first gaming canvass, wherein the providing the at least a portion of the second video gaming data occurs prior to the player entering the second gaming canvass, wherein the second video gaming data facilitates playing of the video game via the end user device, wherein, when the second sector is included in the first set of sectors, the second video gaming data is received from the first sector server, and wherein, when the second sector is not included in the first set of sectors, the second video gaming data is received from a second sector server dedicated to providing resources of a second set of sectors that includes the second sector Continue Start 700-1
FIG. 7C

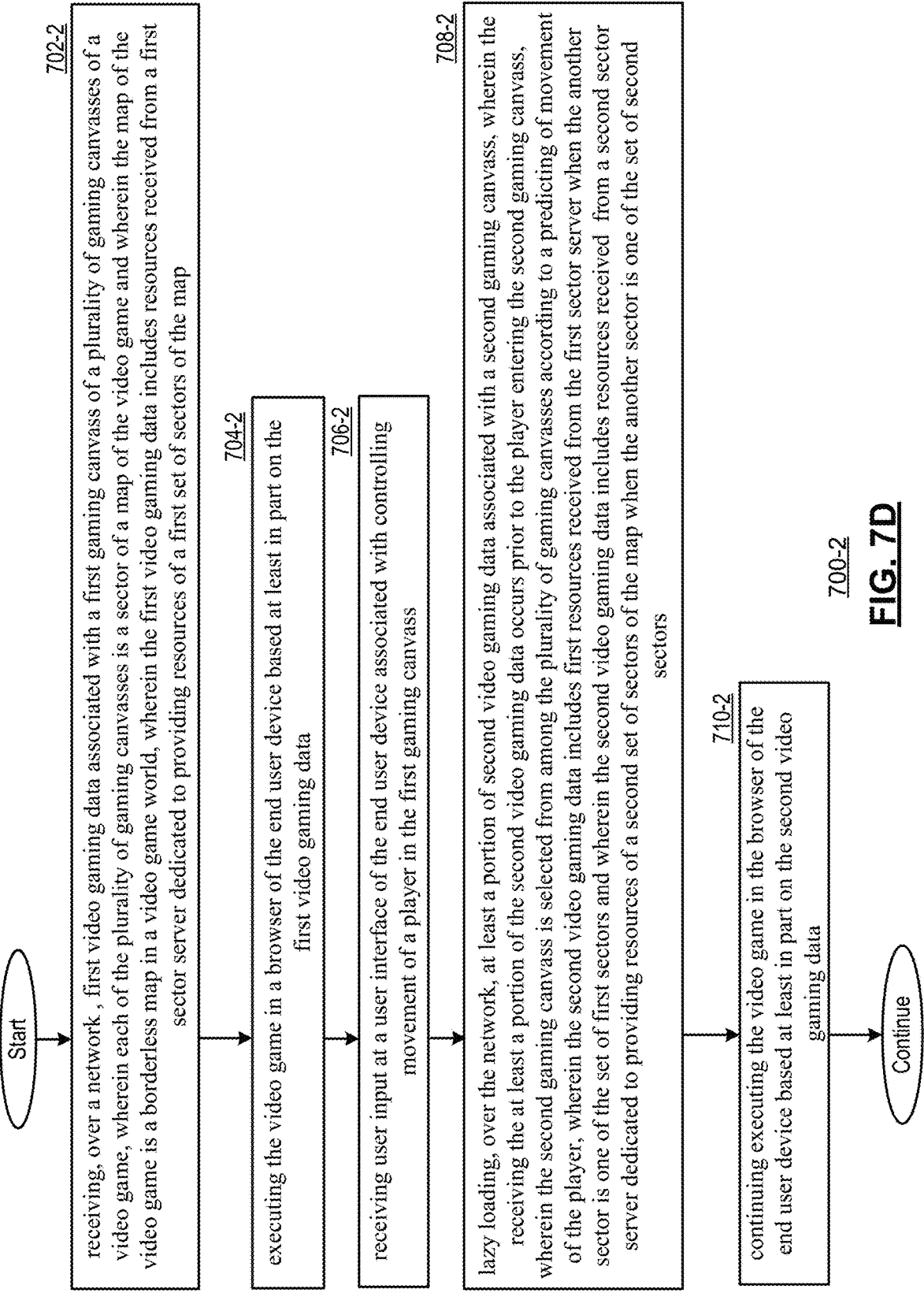

_702-2_ receiving, over a network , first video gaming data associated with a first gaming canvass of a plurality of gaming canvasses of a video game, wherein each of the plurality of gaming canvasses is a sector of a map of the video game and wherein the map of the video game is a borderless map in a video game world, wherein the first video gaming data includes resources received from a first sector server dedicated to providing resources of a first set of sectors of the map

_704-2_ executing the video game in a browser of the end user device based at least in part on the first video gaming data

_706-2_ receiving user input at a user interface of the end user device associated with controlling movement of a player in the first gaming canvass

_708-2_ lazy loading, over the network, at least a portion of second video gaming data associated with a second gaming canvass, wherein the receiving the at least a portion of the second video gaming data occurs prior to the player entering the second gaming canvass, wherein the second gaming canvass is selected from among the plurality of gaming canvasses according to a predicting of movement of the player, wherein the second video gaming data includes first resources received from the first sector server when the another sector is one of the set of first sectors and wherein the second video gaming data includes resources received from a second sector server dedicated to providing resources of a second set of sectors of the map when the another sector is one of the set of second sectors

_710-2_ continuing executing the video game in the browser of the end user device based at least in part on the second video gaming data

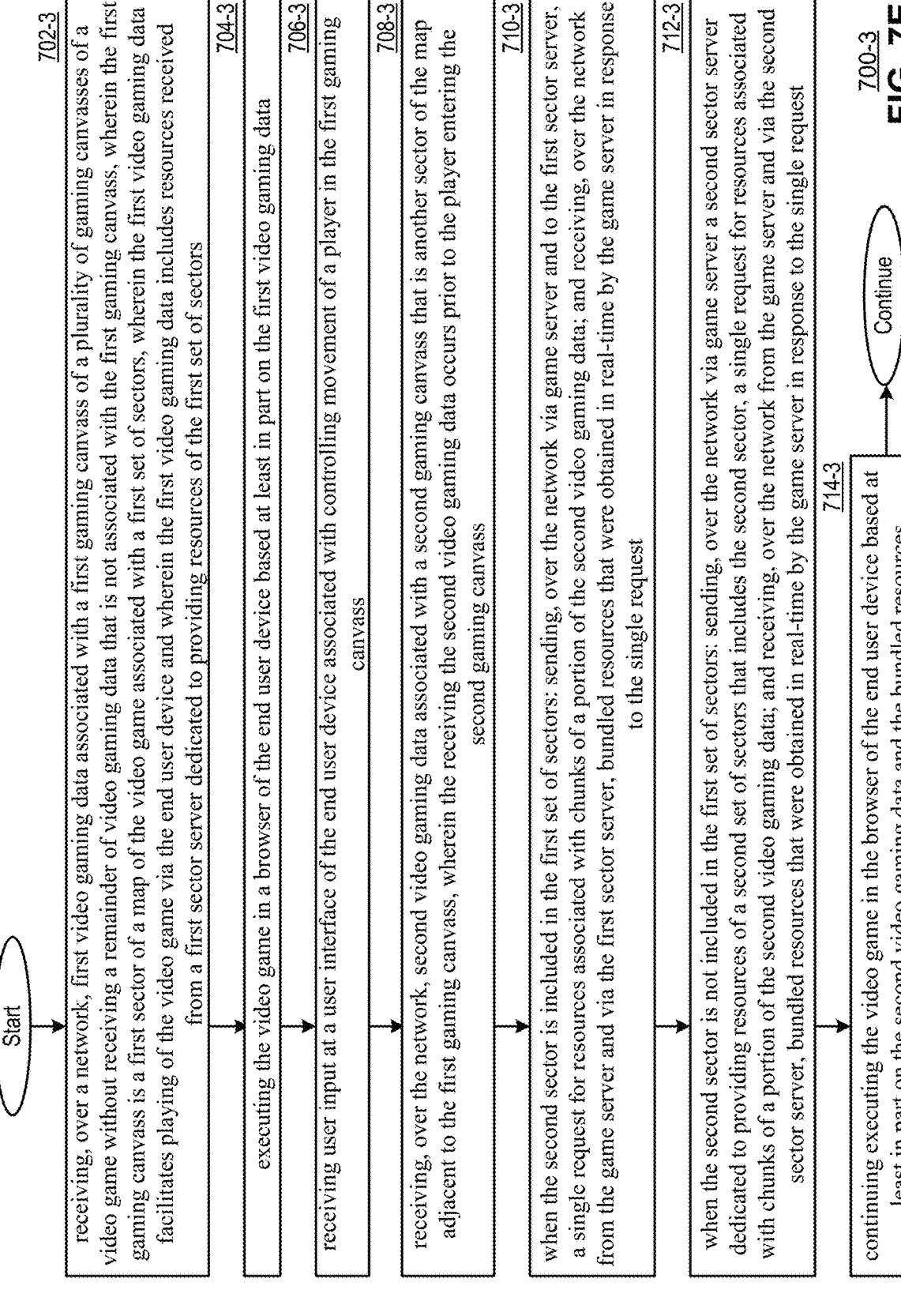

Start 702-3 receiving, over a network, first video gaming data associated with a first gaming canvass of a plurality of gaming canvasses of a video game without receiving a remainder of video gaming data that is not associated with the first gaming canvass, wherein the first gaming canvass is a first sector of a map of the video game associated with a first set of sectors, wherein the first video gaming data facilitates playing of the video game via the end user device and wherein the first video gaming data includes resources received from a first sector server dedicated to providing resources of the first set of sectors 704-3 executing the video game in a browser of the end user device based at least in part on the first video gaming data 706-3 receiving user input at a user interface of the end user device associated with controlling movement of a player in the first gaming canvass 708-3 receiving, over the network, second video gaming data associated with a second gaming canvass that is another sector of the map adjacent to the first gaming canvass, wherein the receiving the second video gaming data occurs prior to the player entering the second gaming canvass 710-3 when the second sector is included in the first set of sectors: sending, over the network via game server and to the first sector server, a single request for resources associated with chunks of a portion of the second video gaming data; and receiving, over the network from the game server and via the first sector server, bundled resources that were obtained in real-time by the game server in response to the single request 712-3 when the second sector is not included in the first set of sectors: sending, over the network via game server a second sector server dedicated to providing resources of a second set of sectors that includes the second sector, a single request for resources associated with chunks of a portion of the second video gaming data; and receiving, over the network from the game server and via the second sector server, bundled resources that were obtained in real-time by the game server in response to the single request 714-3 continuing executing the video game in the browser of the end user device based at least in part on the second video gaming data and the bundled resources Continue 700-3

FIG. 7E

Start 802-1 providing, by a processing system including a processor over a network to an end user device, first video gaming data associated with a first gaming canvass of a plurality of gaming canvasses of a video game, wherein each of the plurality of gaming canvasses is a sector of a map of the video game, wherein the map of the video game is a borderless map in a video game world, and wherein the first video gaming data facilitates playing of the video game via the end user device 804-1 providing, via a lazy loading by the processing system over the network to the end user device, second video gaming data associated with a second gaming canvass that is another sector of the map adjacent to the first gaming canvass, wherein the providing the second video gaming data commences prior to a player entering the second gaming canvass, wherein the second video gaming data facilitates playing of the video game in the browser of the end user device, and wherein the second video gaming data comprises static objects and dynamic objects and wherein unloading of the video gaming data is based on a memory pressure calculation for the end user device and a position of the player on the map Continue 800-1

FIG. 8B

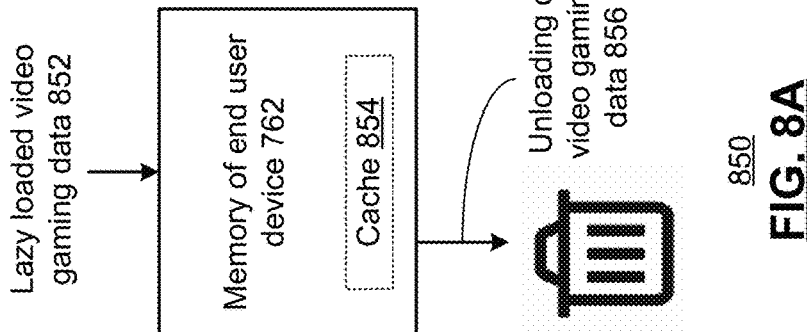

Lazy loaded video gaming data 852

Memory of end user device 762

Cache 854

Unloading of video gaming data 856

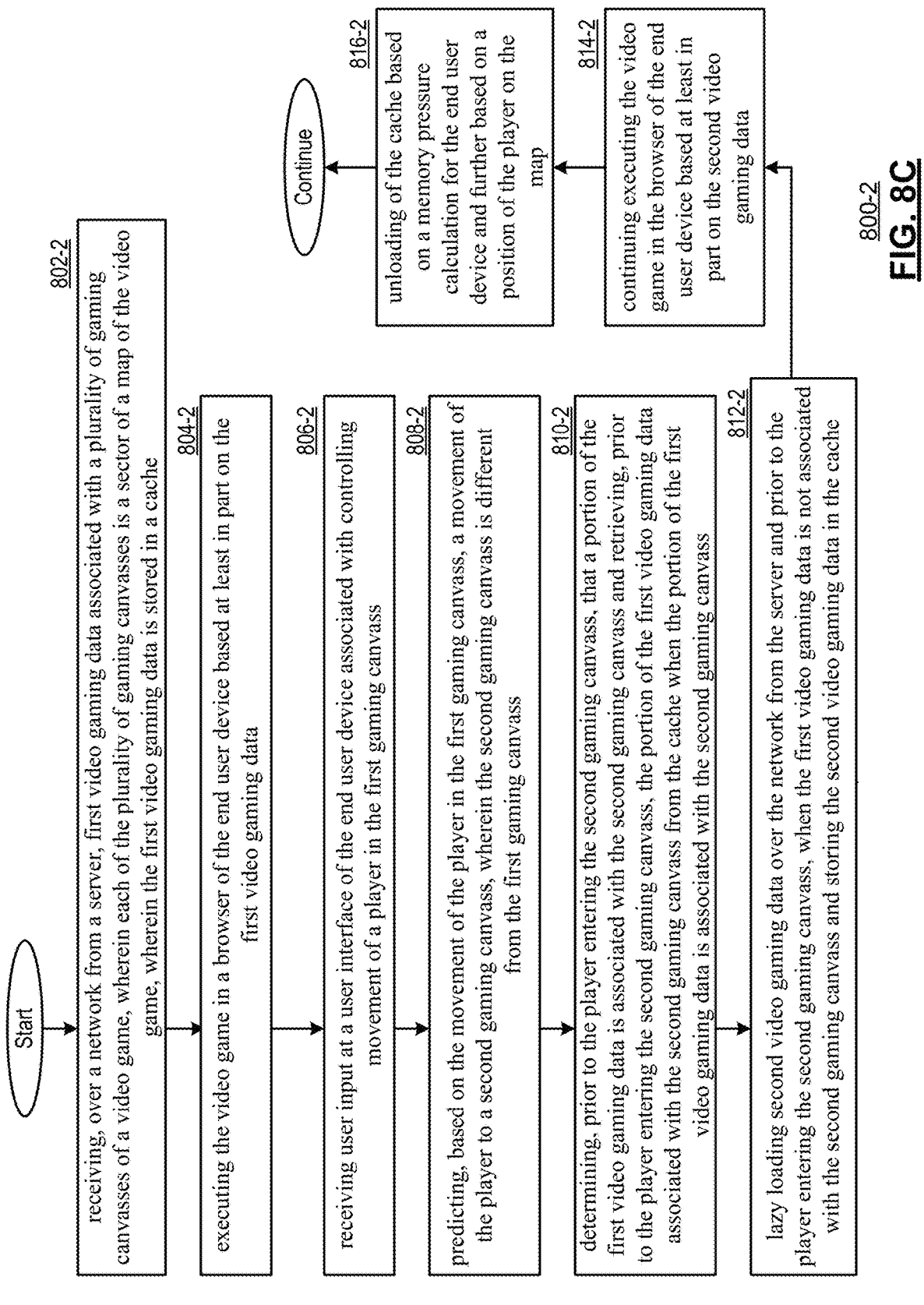

FIG. 8C
800-2

Start 802-2 receiving, over a network from a server, first video gaming data associated with a plurality of gaming canvasses of a video game, wherein each of the plurality of gaming canvasses is a sector of a map of the video game, wherein the first video gaming data is stored in a cache 804-2 executing the video game in a browser of the end user device based at least in part on the first video gaming data 806-2 receiving user input at a user interface of the end user device associated with controlling movement of a player in the first gaming canvass 808-2 predicting, based on the movement of the player in the first gaming canvass, a movement of the player to a second gaming canvass, wherein the second gaming canvass is different from the first gaming canvass 810-2 determining, prior to the player entering the second gaming canvass, that a portion of the first video gaming data is associated with the second gaming canvass and retrieving, prior to the player entering the second gaming canvass, the portion of the first video gaming data associated with the second gaming canvass from the cache when the portion of the first video gaming data is associated with the second gaming canvass 812-2 lazy loading second video gaming data over the network from the server and prior to the player entering the second gaming canvass, when the first video gaming data is not associated with the second gaming canvass and storing the second video gaming data in the cache 814-2 continuing executing the video game in the browser of the end user device based at least in part on the second video gaming data 816-2 unloading of the cache based on a memory pressure calculation for the end user device and further based on a position of the player on the map Continue

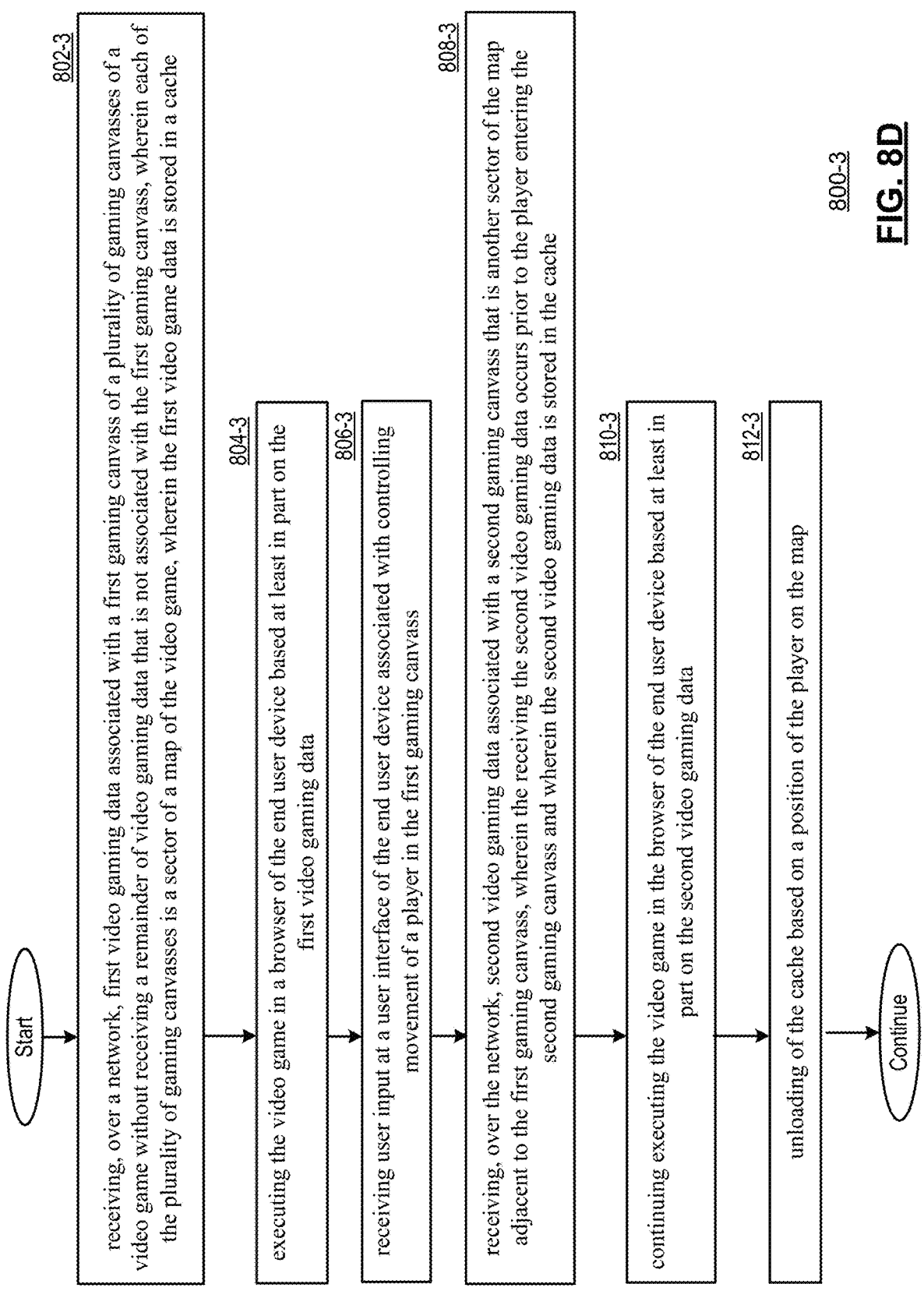

802-3 receiving, over a network, first video gaming data associated with a first gaming canvass of a plurality of gaming canvasses of a video game without receiving a remainder of video gaming data that is not associated with the first gaming canvass, wherein each of the plurality of gaming canvasses is a sector of a map of the video game, wherein the first video game data is stored in a cache 804-3 executing the video game in a browser of the end user device based at least in part on the first video gaming data 806-3 receiving user input at a user interface of the end user device associated with controlling movement of a player in the first gaming canvass 808-3 receiving, over the network, second video gaming data associated with a second gaming canvass that is another sector of the map adjacent to the first gaming canvass, wherein the receiving the second video gaming data occurs prior to the player entering the second gaming canvass and wherein the second video gaming data is stored in the cache 810-3 continuing executing the video game in the browser of the end user device based at least in part on the second video gaming data 812-3 unloading of the cache based on a position of the player on the map

Start

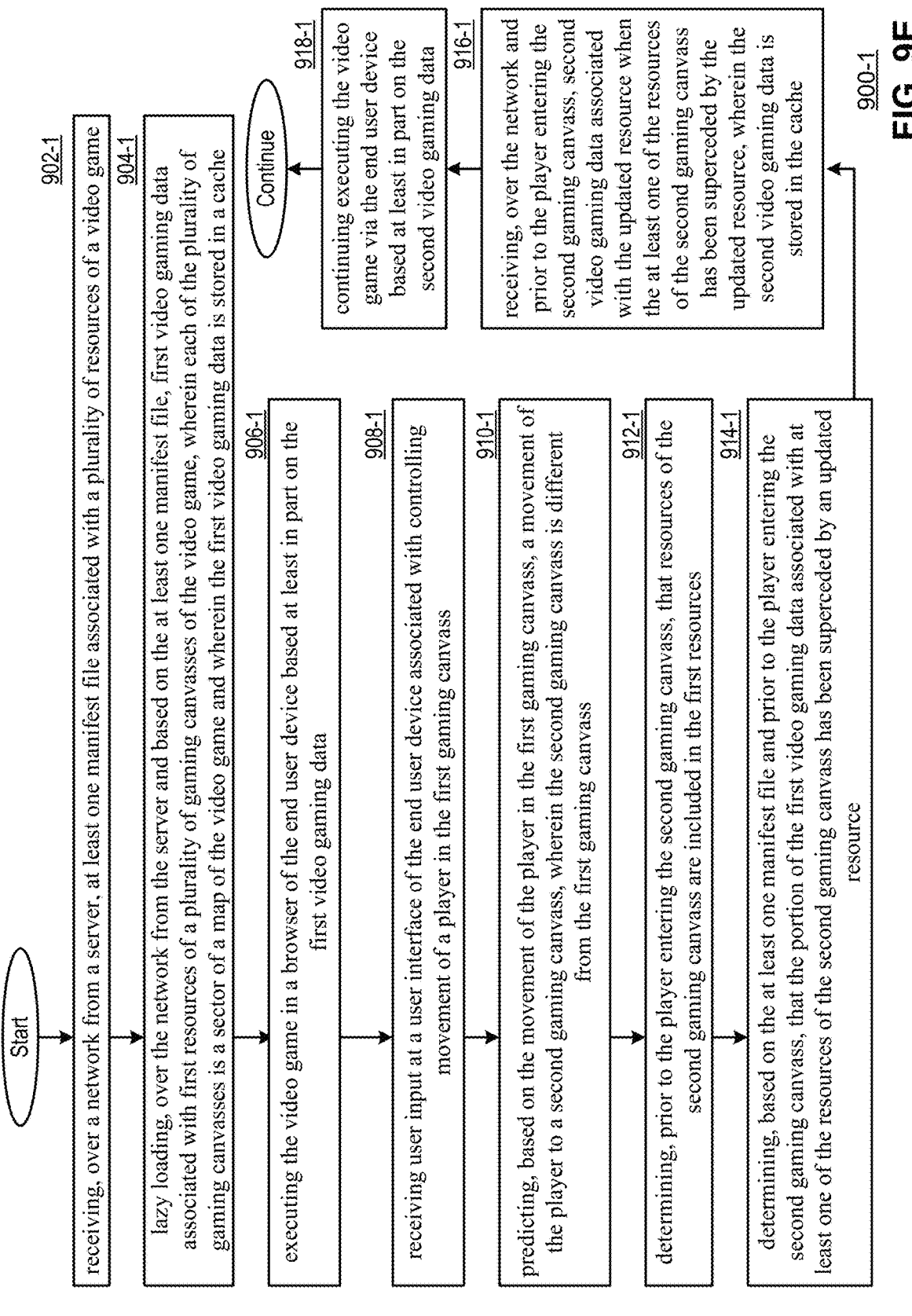

902-1 receiving, over a network from a server, at least one manifest file associated with a plurality of resources of a video game 904-1 lazy loading, over the network from the server and based on the at least one manifest file, first video gaming data associated with first resources of a plurality of gaming canvasses of the video game, wherein each of the plurality of gaming canvasses is a sector of a map of the video game and wherein the first video gaming data is stored in a cache 906-1 executing the video game in a browser of the end user device based at least in part on the first video gaming data 908-1 receiving user input at a user interface of the end user device associated with controlling movement of a player in the first gaming canvass 910-1 predicting, based on the movement of the player in the first gaming canvass, a movement of the player to a second gaming canvass, wherein the second gaming canvass is different from the first gaming canvass 912-1 determining, prior to the player entering the second gaming canvass, that resources of the second gaming canvass are included in the first resources 914-1 determining, based on the at least one manifest file and prior to the player entering the second gaming canvass, that the portion of the first video gaming data associated with at least one of the resources of the second gaming canvass has been superseded by an updated resource 916-1 receiving, over the network and prior to the player entering the second gaming canvass, second video gaming data associated with the updated resource when the at least one of the resources of the second gaming canvass has been superseded by the updated resource, wherein the second video gaming data is stored in the cache 918-1 continuing executing the video game via the end user device based at least in part on the second video gaming data Continue

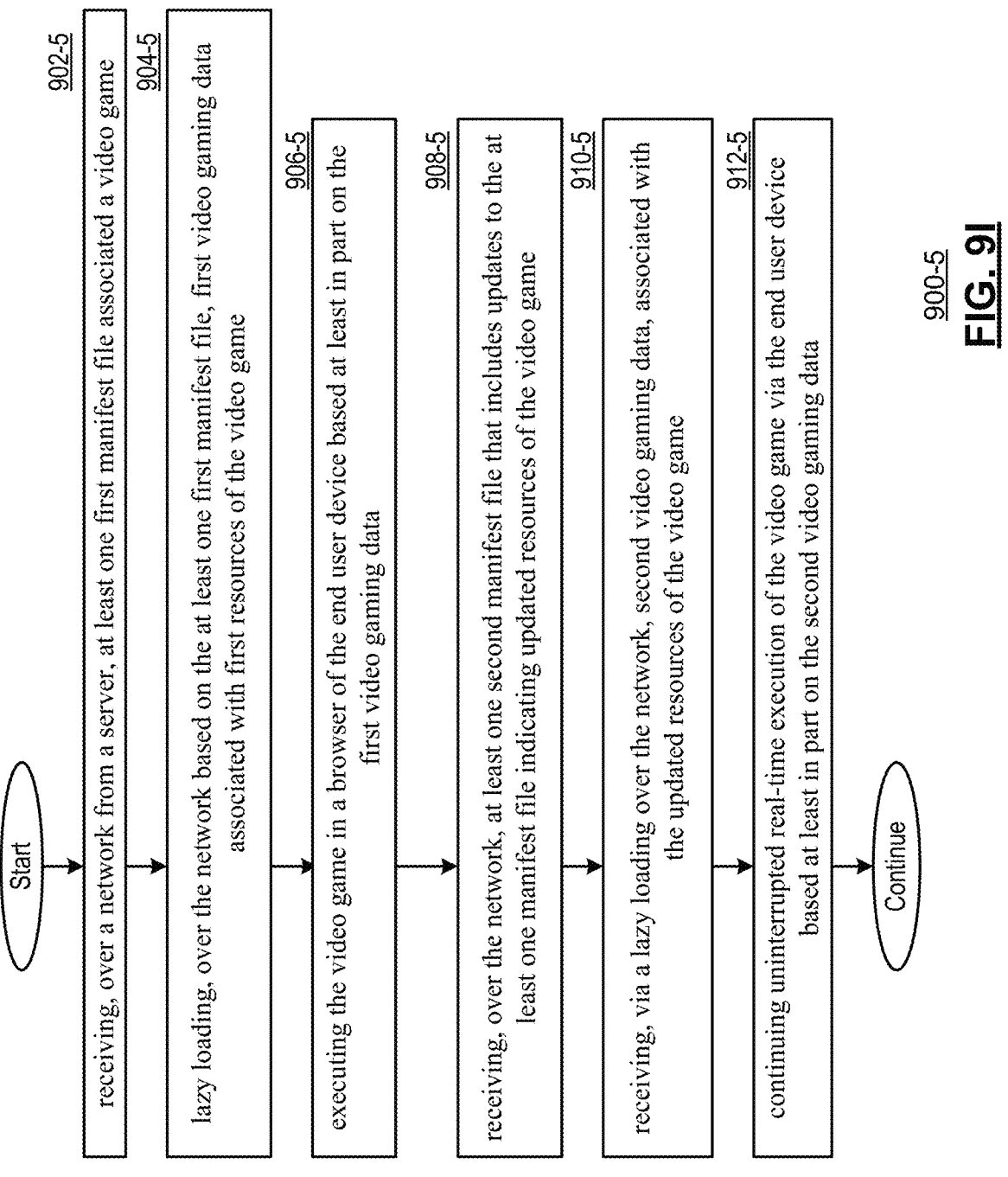

902-5 receiving, over a network from a server, at least one first manifest file associated a video game 904-5 lazy loading, over the network based on the at least one first manifest file, first video gaming data associated with first resources of the video game 906-5 executing the video game in a browser of the end user device based at least in part on the first video gaming data 908-5 receiving, over the network, at least one second manifest file that includes updates to the at least one manifest file indicating updated resources of the video game 910-5 receiving, via a lazy loading over the network, second video gaming data, associated with the updated resources of the video game 912-5 continuing uninterrupted real-time execution of the video game via the end user device based at least in part on the second video gaming data 900-5

FIG. 9I

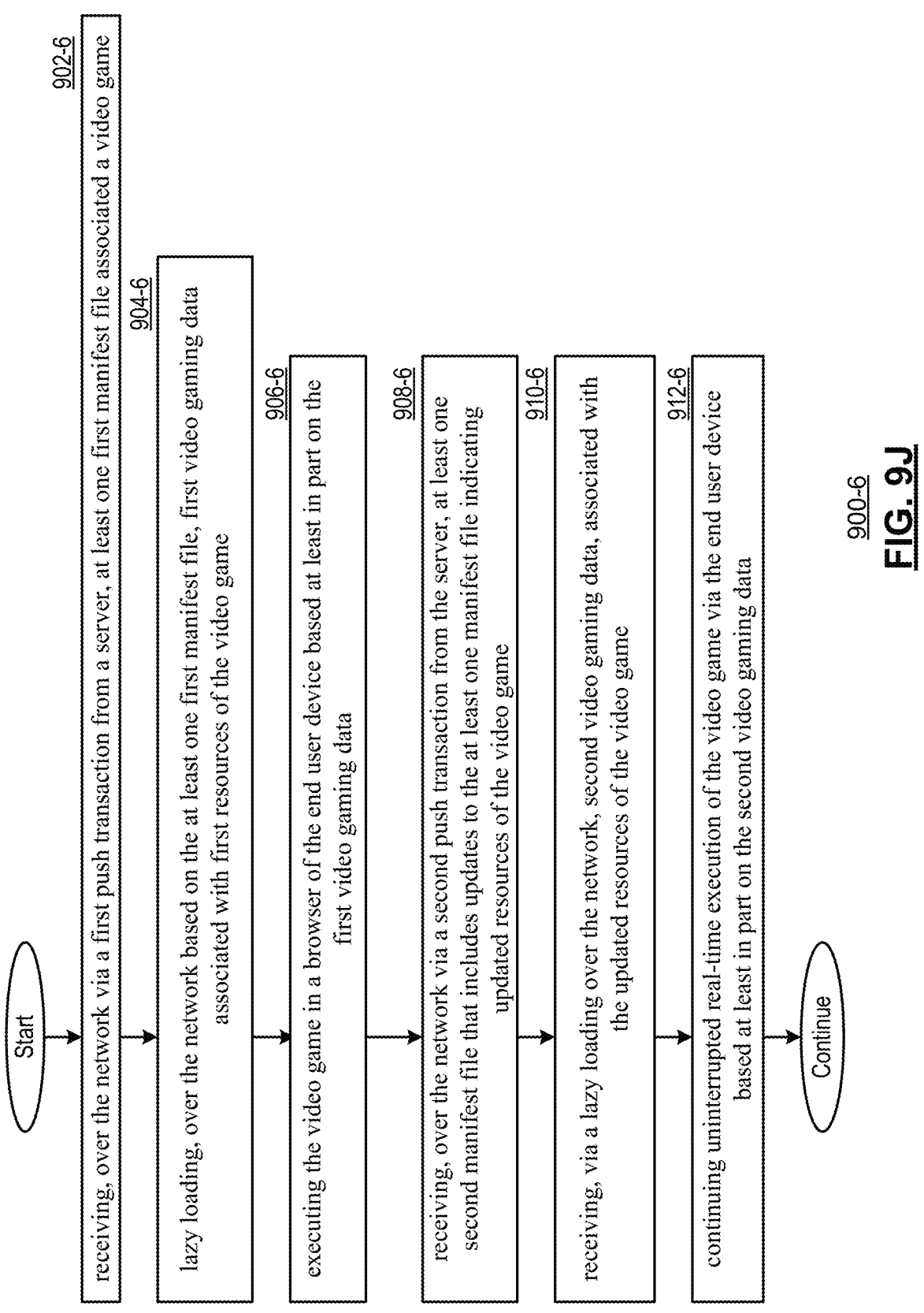

902-6 receiving, over the network via a first push transaction from a server, at least one first manifest file associated a video game 904-6 lazy loading, over the network based on the at least one first manifest file, first video gaming data associated with first resources of the video game 906-6 executing the video game in a browser of the end user device based at least in part on the first video gaming data 908-6 receiving, over the network via a second push transaction from the server, at least one second manifest file that includes updates to the at least one manifest file indicating updated resources of the video game 910-6 receiving, via a lazy loading over the network, second video gaming data, associated with the updated resources of the video game 912-6 continuing uninterrupted real-time execution of the video game via the end user device based at least in part on the second video gaming data 900-6

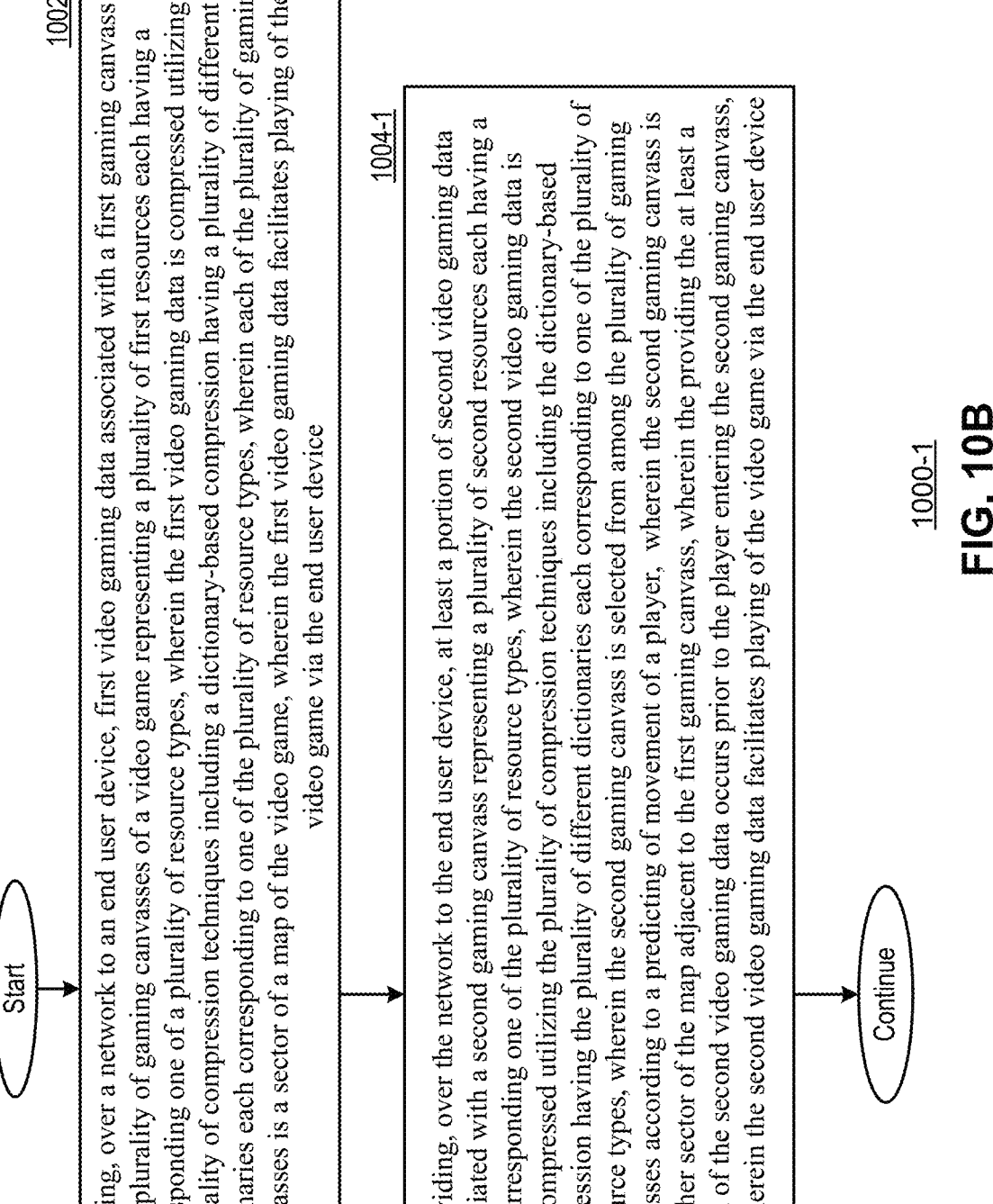

Start 1002-1 providing, over a network to an end user device, first video gaming data associated with a first gaming canvass of a plurality of gaming canvasses of a video game representing a plurality of first resources each having a corresponding one of a plurality of resource types, wherein the first video gaming data is compressed utilizing a plurality of compression techniques including a dictionary-based compression having a plurality of different dictionaries each corresponding to one of the plurality of resource types, wherein each of the plurality of gaming canvasses is a sector of a map of the video game, wherein the first video gaming data facilitates playing of the video game via the end user device 1004-1 providing, over the network to the end user device, at least a portion of second video gaming data associated with a second gaming canvass representing a plurality of second resources each having a corresponding one of the plurality of resource types, wherein the second video gaming data is compressed utilizing the plurality of compression techniques including the dictionary-based compression having the plurality of different dictionaries each corresponding to one of the plurality of resource types, wherein the second gaming canvass is selected from among the plurality of gaming canvasses according to a predicting of movement of a player, wherein the second gaming canvass is another sector of the map adjacent to the first gaming canvass, wherein the providing the at least a portion of the second video gaming data occurs prior to the player entering the second gaming canvass, and wherein the second video gaming data facilitates playing of the video game via the end user device Continue 1000-1

FIG. 10B

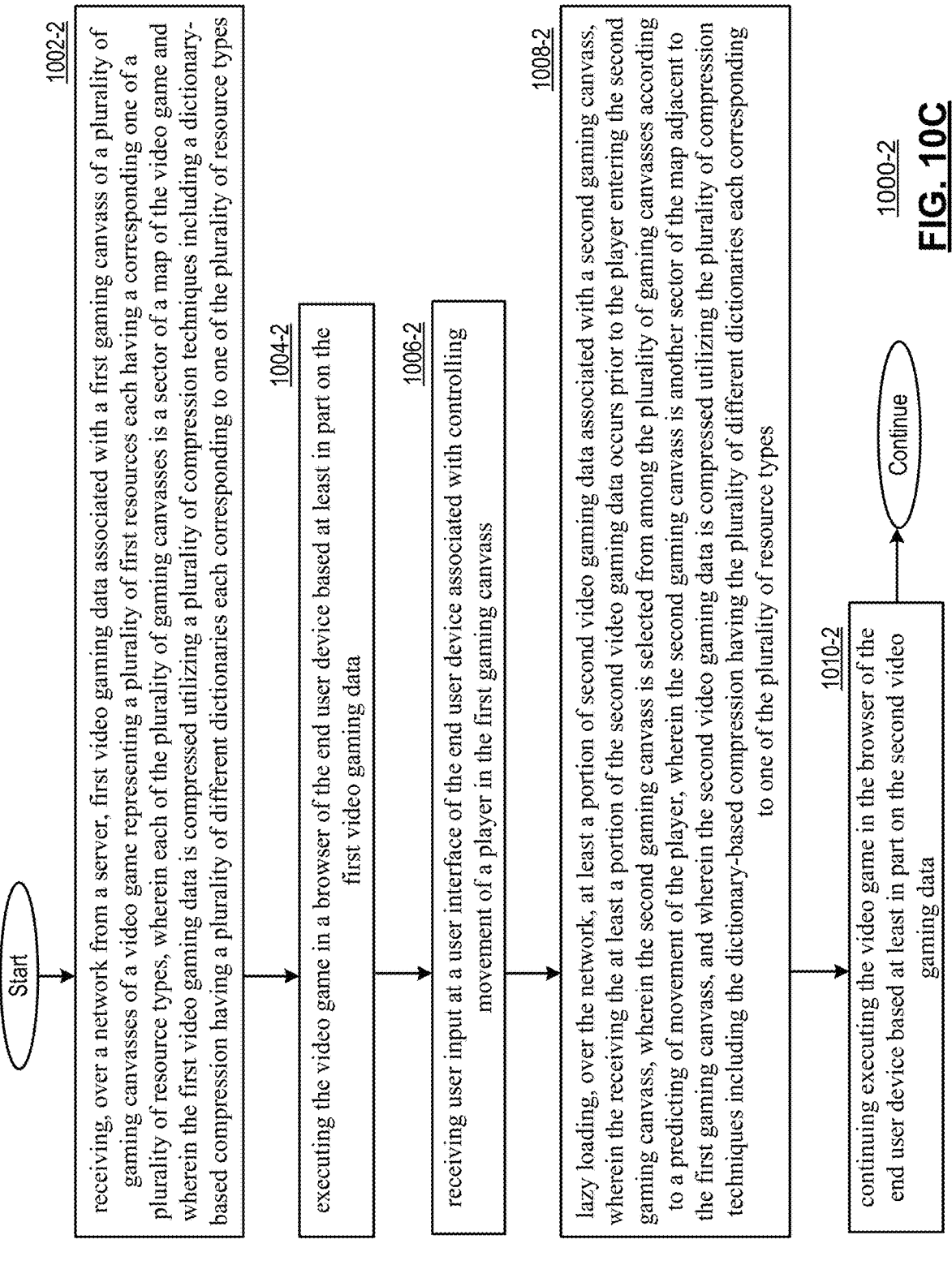

Start

1002-2
receiving, over a network from a server, first video gaming data associated with a first gaming canvass of a plurality of gaming canvasses of a video game representing a plurality of first resources each having a corresponding one of a plurality of resource types, wherein each of the plurality of gaming canvasses is a sector of a map of the video game and wherein the first video gaming data is compressed utilizing a plurality of compression techniques including a dictionary-based compression having a plurality of different dictionaries each corresponding to one of the plurality of resource types

1004-2
executing the video game in a browser of the end user device based at least in part on the first video gaming data

1006-2
receiving user input at a user interface of the end user device associated with controlling movement of a player in the first gaming canvass

1008-2
lazy loading, over the network, at least a portion of second video gaming data associated with a second gaming canvass, wherein the receiving the at least a portion of the second video gaming data occurs prior to the player entering the second gaming canvass, wherein the second gaming canvass is selected from among the plurality of gaming canvasses according to a predicting of movement of the player, wherein the second gaming canvass is another sector of the map adjacent to the first gaming canvass, and wherein the second video gaming data is compressed utilizing the plurality of compression techniques including the dictionary-based compression having the plurality of different dictionaries each corresponding to one of the plurality of resource types

1010-2
continuing executing the video game in the browser of the end user device based at least in part on the second video gaming data Continue

1000-2
FIG. 10C

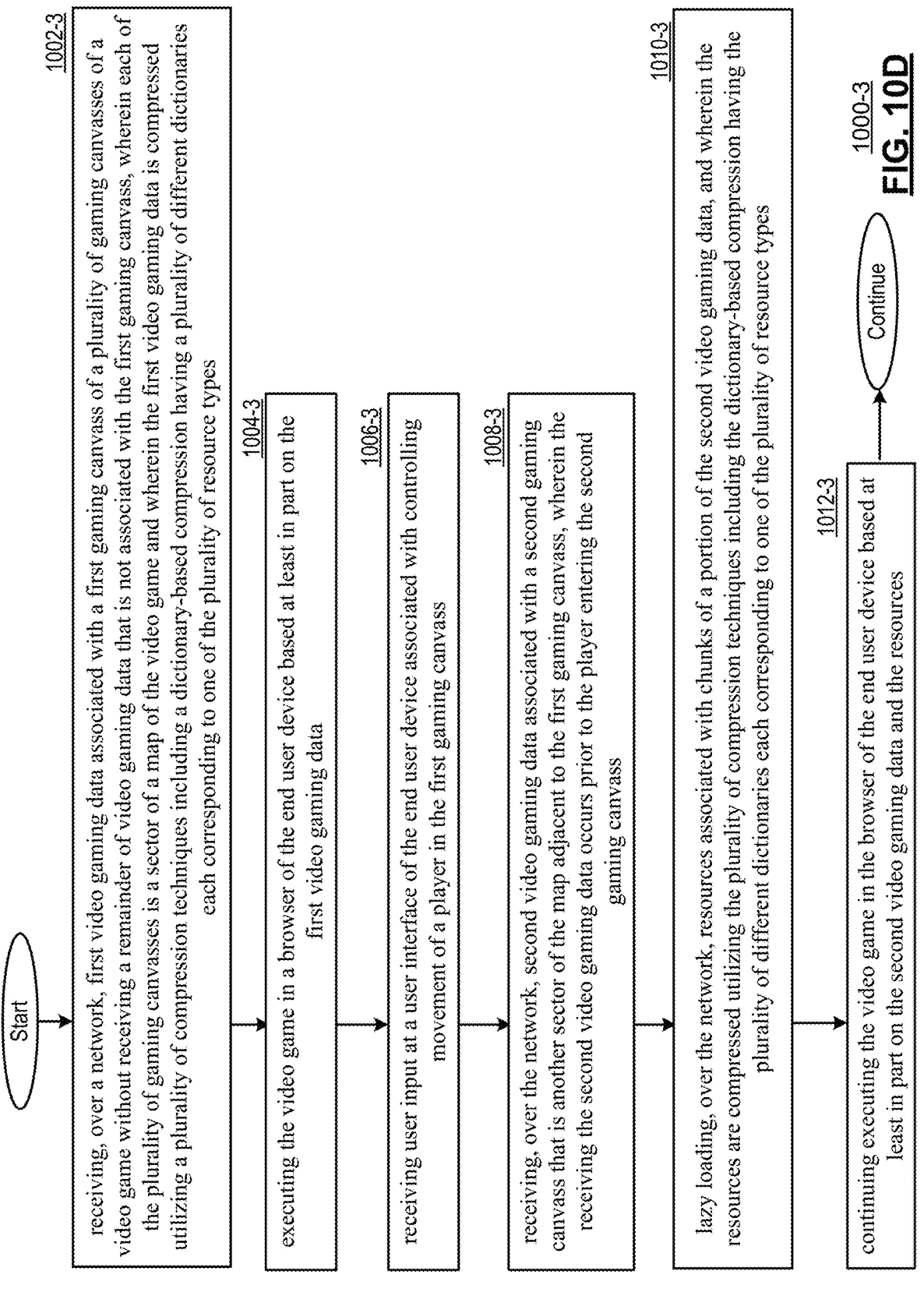

Start

1002-3
receiving, over a network, first video gaming data associated with a first gaming canvass of a plurality of gaming canvasses of a video game without receiving a remainder of video gaming data that is not associated with the first gaming canvass, wherein each of the plurality of gaming canvasses is a sector of a map of the video game and wherein the first video gaming data is compressed utilizing a plurality of compression techniques including a dictionary-based compression having a plurality of different dictionaries each corresponding to one of the plurality of resource types

1004-3
executing the video game in a browser of the end user device based at least in part on the first video gaming data

1006-3
receiving user input at a user interface of the end user device associated with controlling movement of a player in the first gaming canvass

1008-3
receiving, over the network, second video gaming data associated with a second gaming canvass that is another sector of the map adjacent to the first gaming canvass, wherein the receiving the second video gaming data occurs prior to the player entering the second gaming canvass

1010-3
lazy loading, over the network, resources associated with chunks of a portion of the second video gaming data, and wherein the resources are compressed utilizing the plurality of compression techniques including the dictionary-based compression having the plurality of different dictionaries each corresponding to one of the plurality of resource types

1012-3
continuing executing the video game in the browser of the end user device based at least in part on the second video gaming data and the resources Continue

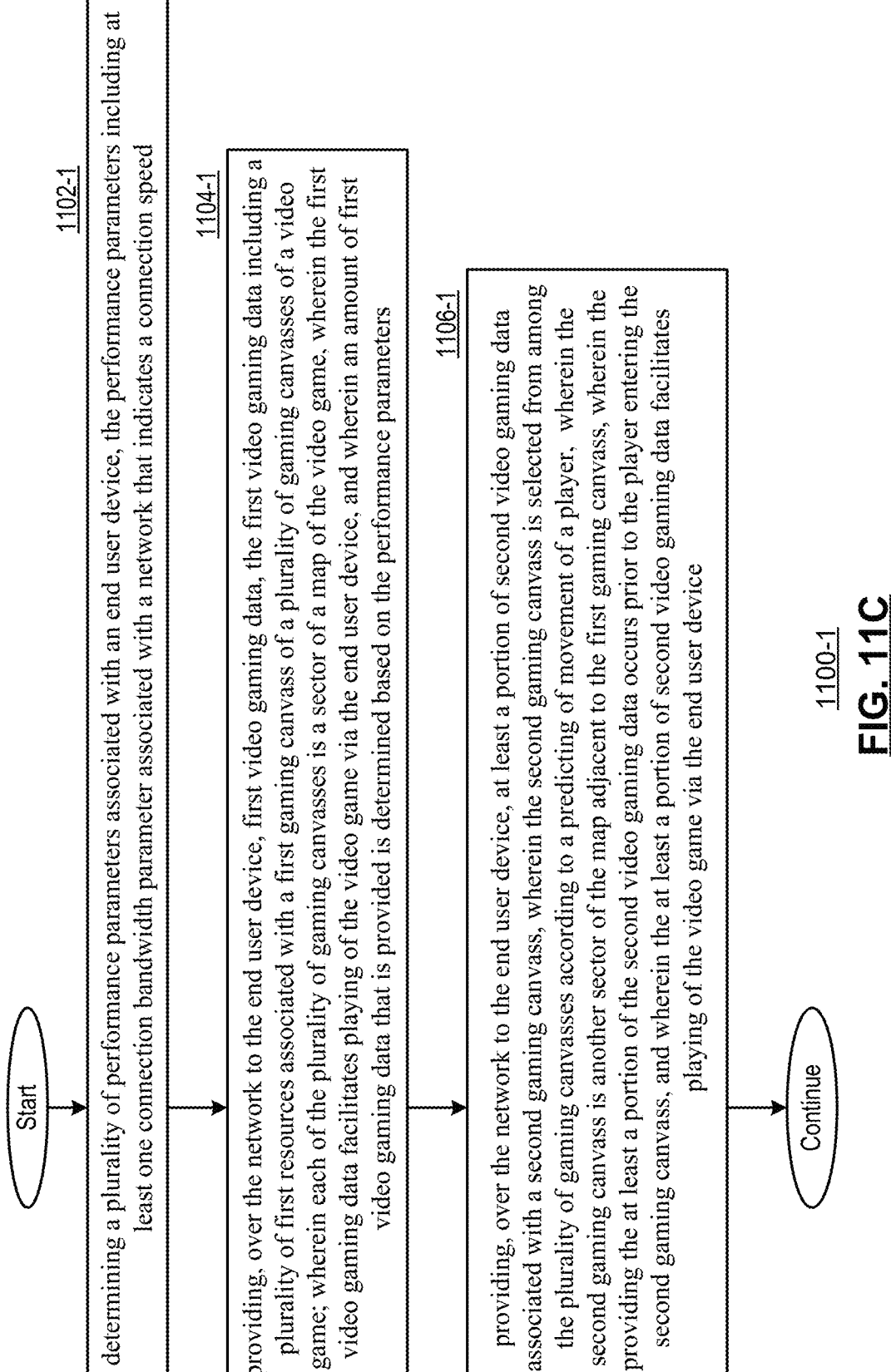

1102-1 determining a plurality of performance parameters associated with an end user device, the performance parameters including at least one connection bandwidth parameter associated with a network that indicates a connection speed 1104-1 providing, over the network to the end user device, first video gaming data, the first video gaming data including a plurality of first resources associated with a first gaming canvass of a plurality of gaming canvasses of a video game; wherein each of the plurality of gaming canvasses is a sector of a map of the video game, wherein the first video gaming data facilitates playing of the video game via the end user device, and wherein an amount of first video gaming data that is provided is determined based on the performance parameters 1106-1 providing, over the network to the end user device, at least a portion of second video gaming data associated with a second gaming canvass, wherein the second gaming canvass is selected from among the plurality of gaming canvasses according to a predicting of movement of a player, wherein the second gaming canvass is another sector of the map adjacent to the first gaming canvass, wherein the providing the at least a portion of the second video gaming data occurs prior to the player entering the second gaming canvass, and wherein the at least a portion of second video gaming data facilitates playing of the video game via the end user device 1100-1

FIG. 11C

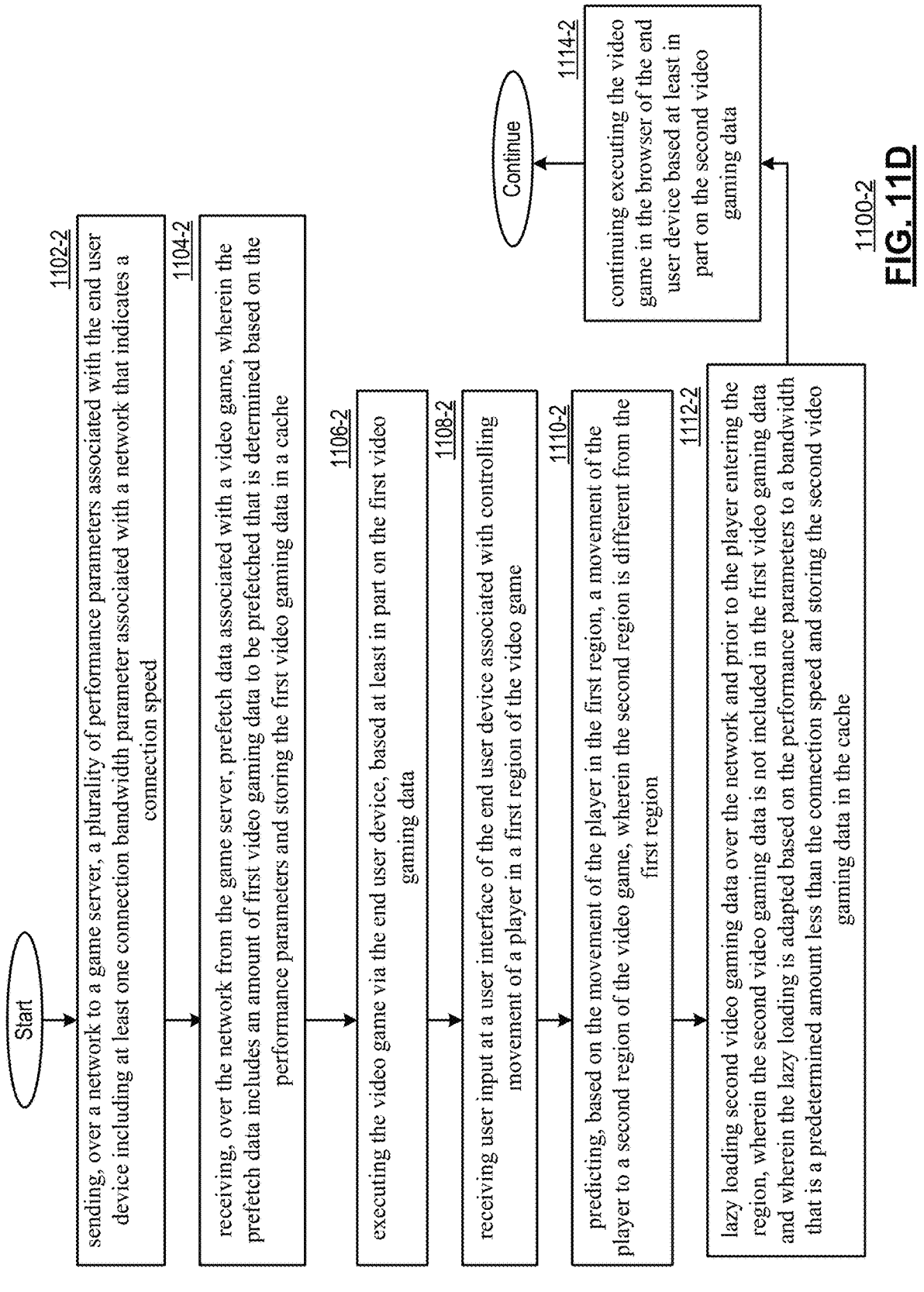

1102-2 sending, over a network to a game server, a plurality of performance parameters associated with the end user device including at least one connection bandwidth parameter associated with a network that indicates a connection speed 1104-2 receiving, over the network from the game server, prefetch data associated with a video game, wherein the prefetch data includes an amount of first video gaming data to be prefetched that is determined based on the performance parameters and storing the first video gaming data in a cache 1106-2 executing the video game via the end user device, based at least in part on the first video gaming data 1108-2 receiving user input at a user interface of the end user device associated with controlling movement of a player in a first region of the video game 1110-2 predicting, based on the movement of the player in the first region, a movement of the player to a second region of the video game, wherein the second region is different from the first region 1112-2 lazy loading second video gaming data over the network and prior to the player entering the first region, wherein the second video gaming data is not included in the first video gaming data and wherein the lazy loading is adapted based on the performance parameters to a bandwidth that is a predetermined amount less than the connection speed and storing the second video gaming data in the cache 1114-2 continuing executing the video game in the browser of the end user device based at least in part on the second video gaming data Continue 1100-2

FIG. 11D

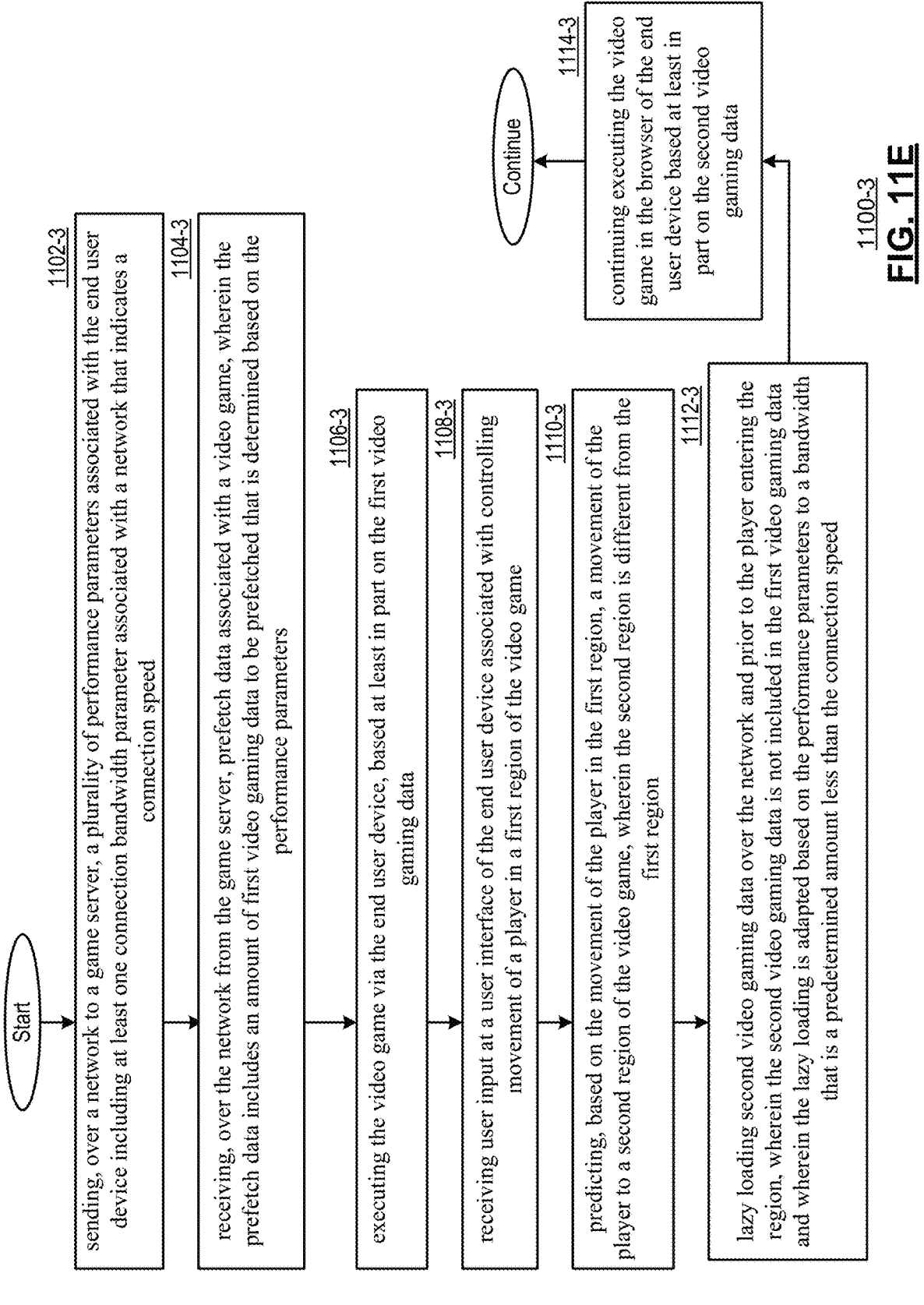

1102-3 — sending, over a network to a game server, a plurality of performance parameters associated with the end user device including at least one connection bandwidth parameter associated with a network that indicates a connection speed 1104-3 — receiving, over the network from the game server, prefetch data associated with a video game, wherein the prefetch data includes an amount of first video gaming data to be prefetched that is determined based on the performance parameters 1106-3 — executing the video game via the end user device, based at least in part on the first video gaming data 1108-3 — receiving user input at a user interface of the end user device associated with controlling movement of a player in a first region of the video game 1110-3 — predicting, based on the movement of the player in the first region, a movement of the player to a second region of the video game, wherein the second region is different from the first region 1112-3 — lazy loading second video gaming data over the network and prior to the player entering the second region, wherein the second video gaming data is not included in the first video gaming data and wherein the lazy loading is adapted based on the performance parameters to a bandwidth that is a predetermined amount less than the connection speed 1114-3 — continuing executing the video game in the browser of the end user device based at least in part on the second video gaming data Continue 1202-1 providing, over a network to an end user device, first video gaming data, the first video gaming data including a plurality of first resources associated with a first gaming canvass of a plurality of gaming canvasses of a video game; wherein each of the plurality of gaming canvasses is a sector of a map of the video game, wherein the first video gaming data facilitates playing of the video game via the end user device via a mobile application that includes a native game engine that is separate from a browser of the end user device 1204-1 providing, over the network to the end user device, at least a portion of second video gaming data associated with a second gaming canvass, wherein the second gaming canvass is selected from among the plurality of gaming canvasses according to a predicting of movement of a player, wherein the second gaming canvass is another sector of the map adjacent to the first gaming canvass, wherein the providing the at least a portion of the second video gaming data occurs prior to the player entering the second gaming canvass, and wherein the at least a portion of second video gaming data facilitates playing of the video game via the mobile application of the end user device Start Continue 1200-1

FIG. 12B

Download of mobile application 1252 that includes a native game engine

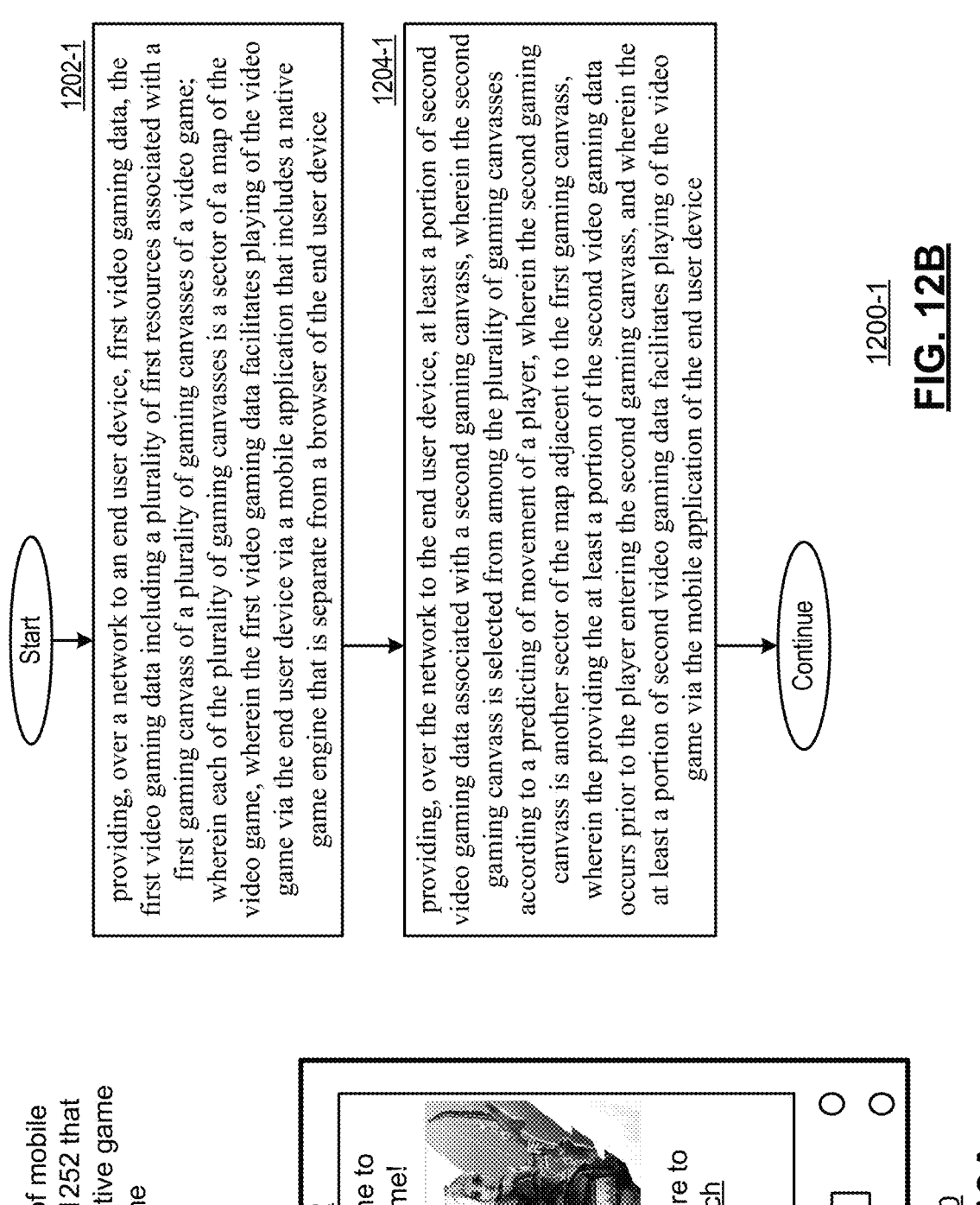

762

Welcome to the game!

Click here to Launch

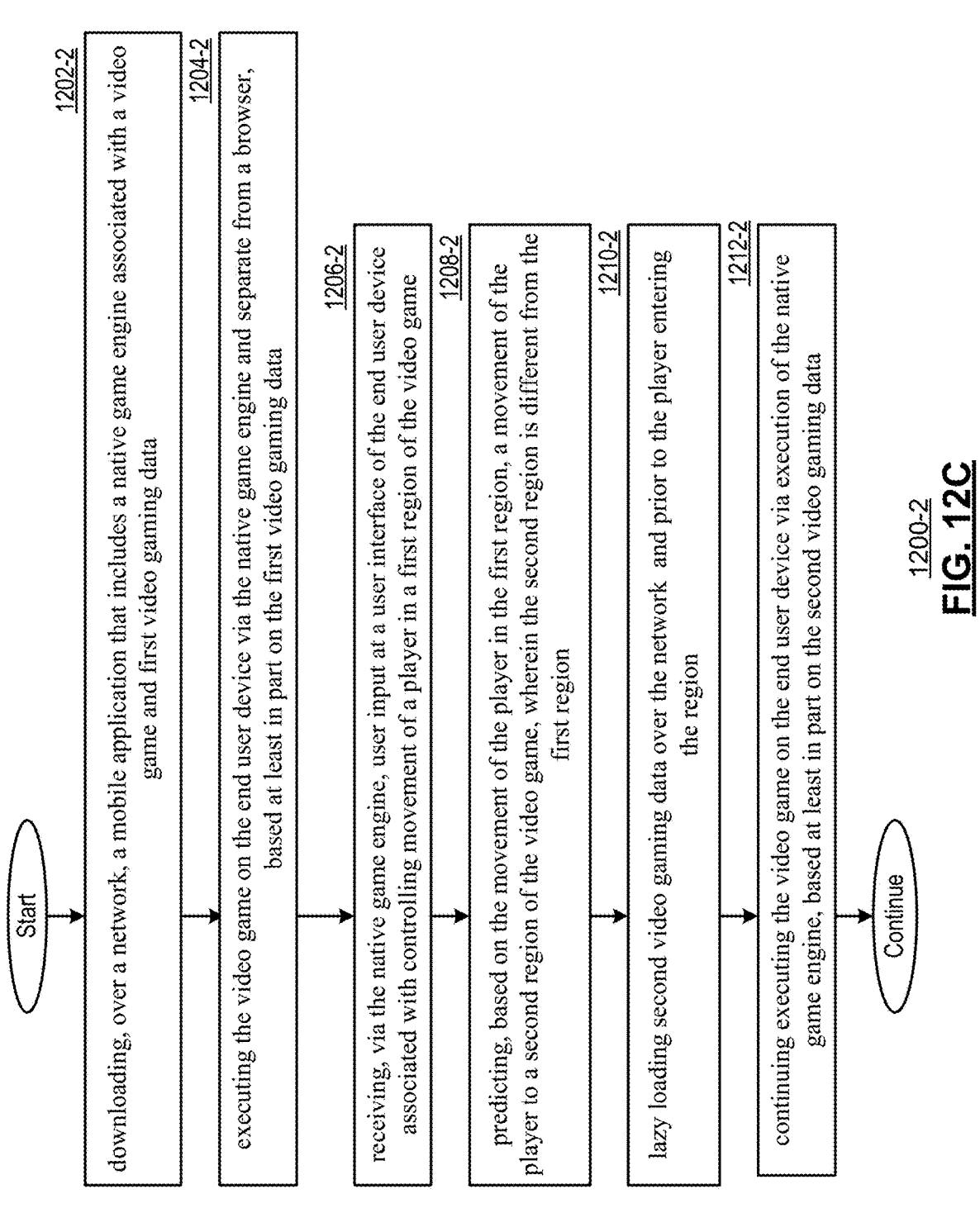

1202-2 downloading, over a network, a mobile application that includes a native game engine associated with a video game and first video gaming data 1204-2 executing the video game on the end user device via the native game engine and separate from a browser, based at least in part on the first video gaming data 1206-2 receiving, via the native game engine, user input at a user interface of the end user device associated with controlling movement of a player in a first region of the video game 1208-2 predicting, based on the movement of the player in the first region, a movement of the player to a second region of the video game, wherein the second region is different from the first region 1210-2 lazy loading second video gaming data over the network and prior to the player entering the region 1212-2 continuing executing the video game on the end user device via execution of the native game engine, based at least in part on the second video gaming data 1200-2
FIG. 12C

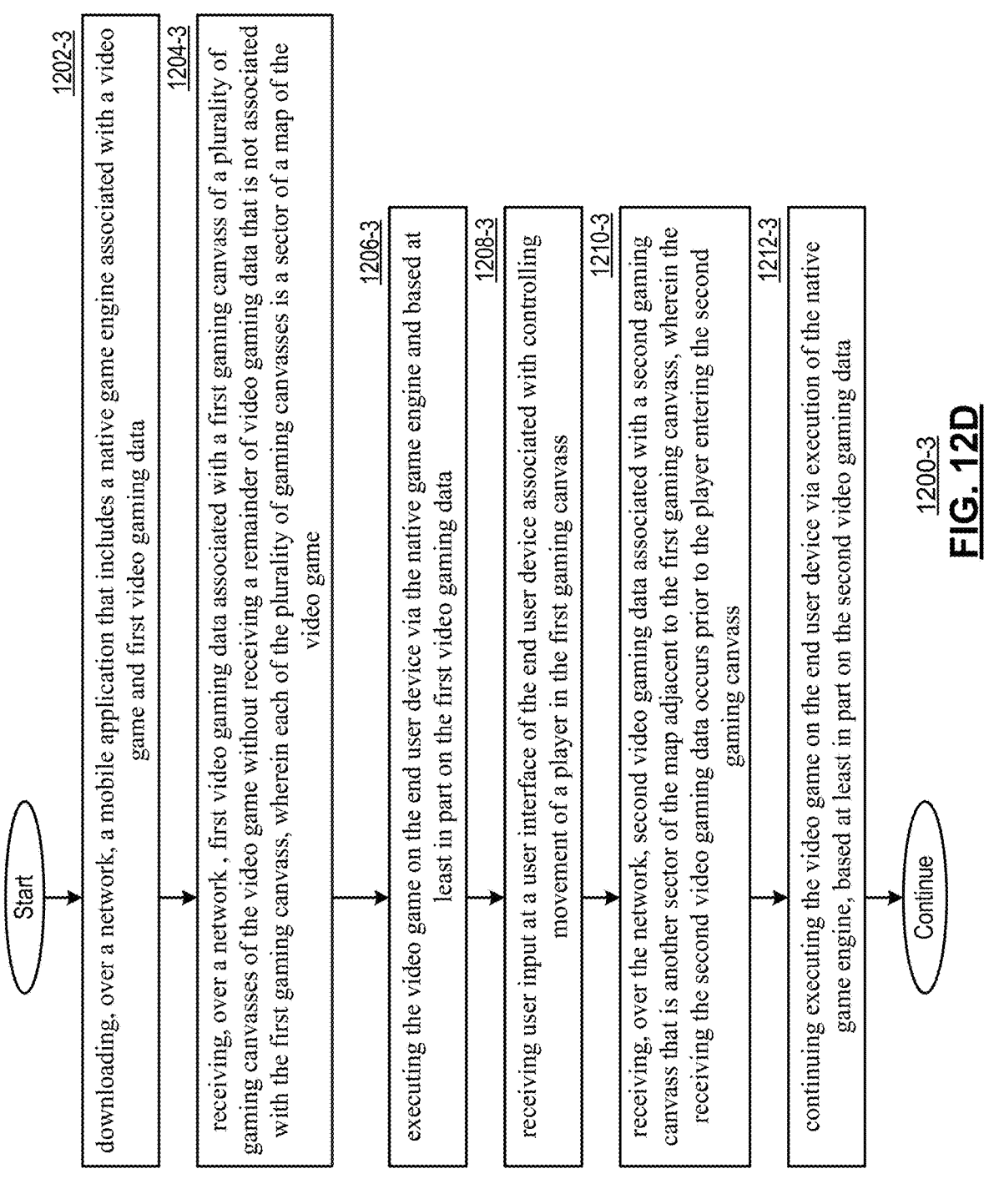

1202-3 downloading, over a network, a mobile application that includes a native game engine associated with a video game and first video gaming data 1204-3 receiving, over a network, first video gaming data associated with a first gaming canvass of a plurality of gaming canvasses of the video game without receiving a remainder of video gaming data that is not associated with the first gaming canvass, wherein each of the plurality of gaming canvasses is a sector of a map of the video game 1206-3 executing the video game on the end user device via the native game engine and based at least in part on the first video gaming data 1208-3 receiving user input at a user interface of the end user device associated with controlling movement of a player in the first gaming canvass 1210-3 receiving, over the network, second video gaming data associated with a second gaming canvass that is another sector of the map adjacent to the first gaming canvass, wherein the receiving the second video gaming data occurs prior to the player entering the second gaming canvass 1212-3 continuing executing the video game on the end user device via execution of the native game engine, based at least in part on the second video gaming data 1200-3

METHODS AND DEVICES FOR SUPPORTING DEVICE ADAPTIVE ONLINE VIDEO GAMES

CROSS-REFERENCE TO RELATED APPLICATIONS

The present application claims priority claims priority pursuant to 35 U.S.C. § 120 and 35 U.S.C. § 365(c) as a continuation of International Application Number PCT/US2023/060285, entitled "METHODS AND DEVICES FOR SUPPORTING ONLINE VIDEO GAMES UTILIZING A DEDICATED GAME SERVER", filed Jan. 9, 2023, which claims priority pursuant to 35 U.S.C. § 119(e) to U.S. Provisional Patent Application No. 63/297,940, entitled "METHOD AND APPARATUS FOR MANAGING VIDEO GAMES UTILIZING MULTIPLE MAP CANVASSES", filed Jan. 10, 2022; U.S. Provisional Patent Application No. 63/297,941, entitled "METHOD AND APPARATUS FOR MANAGING VIDEO GAMES UTILIZING MAP CANVASSES AND DATA PRIORITIZATION" filed Jan. 10, 2022; U.S. Provisional Patent Application No. 63/477,288, entitled "METHODS AND DEVICES FOR SUPPORTING ONLINE VIDEO GAMES UTILIZING A DEDICATED GAME SERVER" filed Dec. 27, 2022; U.S. Provisional Patent Application No. 63/477,292, entitled "METHODS AND DEVICES FOR SUPPORTING ONLINE VIDEO GAMES UTILIZING DEDICATED GAME SECTOR SERVERS" filed Dec. 27, 2022; U.S. Provisional Patent Application No. 63/477,300, entitled "METHODS AND DEVICES FOR SUPPORTING ONLINE VIDEO GAMES UTILIZING INTELLIGENT CACHE UNLOADING" filed Dec. 27, 2022; U.S. Provisional Patent Application No. 63/477,308, entitled "METHODS AND DEVICES FOR SUPPORTING ONLINE VIDEO GAMES UTILIZING MANIFEST FILES" filed Dec. 27, 2022; U.S. Provisional Patent Application No. 63/477,313, entitled "METHODS AND DEVICES FOR SUPPORTING ONLINE VIDEO GAMES VIA MANIFEST FILE UPDATES" filed Dec. 27, 2022, U.S. Provisional Patent Application No. 63/477,318, entitled "METHODS AND DEVICES FOR SUPPORTING ONLINE VIDEO GAMES VIA DICTIONARY-BASED COMPRESSION" filed Dec. 27, 2022, U.S. Provisional Patent Application No. 63/477,326, entitled "METHODS AND DEVICES FOR SUPPORTING DEVICE ADAPTIVE ONLINE VIDEO GAMES" filed Dec. 27, 2022; and U.S. Provisional Patent Application No. 63/477,332, entitled "METHOD AND DEVICE FOR SUPPORTING ONLINE VIDEO GAMES VIA A NATIVE MOBILE APPLICATION" filed Dec. 27, 2022, all of which are incorporated herein by reference in their entirety and made part of the present application for all purposes.

FIELD OF THE DISCLOSURE

The subject disclosure relates to methods and devices for implementing and managing online video games.

BACKGROUND

As more users experience virtual worlds, digital assets, video games and other electronic media, interest in these electronic media expands. Users often spend a large amount of time involved in or experiencing these electronic media, such as playing in a video game with other users.

As user interest in (and thus user participation or access to) virtual worlds, digital assets, video games and other electronic media expands, resource requirements increase. Additionally, user expectation of quality of experience also is increasing. A traditional game downloads all 3D models, audio, code, and so forth up front and then loads it in at the start of a level or the entire game. This ensures that all files are present on the file system when launching the game and makes the development process easier. However, the end-user has the unfortunate downside of having to download the entire game before being able to play the game, as well as subsequently receiving large updates and patches, such as tens of gigabytes or more. Delays in accessing a game can be a frustrating experience for a user.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Reference will now be made to the accompanying drawings, which are not necessarily drawn to scale, and wherein:

FIG. 2A depicts a series of pictorial diagrams illustrating an example, non-limiting embodiment of screen displays in accordance with various aspects described herein.

FIG. 2B depicts an illustrative embodiment of a method in accordance with various aspects described herein.

FIG. 2C depicts an illustrative embodiment of a method in accordance with various aspects described herein.

FIG. 2D depicts an illustrative embodiment of a method in accordance with various aspects described herein.

FIG. 2E depicts an illustrative embodiment of a method in accordance with various aspects described herein.

FIG. 2F depicts an illustrative embodiment of a method in accordance with various aspects described herein.

FIG. 2G depicts an illustrative embodiment of a method in accordance with various aspects described herein.

FIG. 6D depicts an illustrative embodiment of a method in accordance with various aspects described herein.

FIG. 6E depicts an illustrative embodiment of a method in accordance with various aspects described herein.

FIG. 6F depicts an illustrative embodiment of a method in accordance with various aspects described herein.

FIG. 7C depicts an illustrative embodiment of a method in accordance with various aspects described herein.

FIG. 7D depicts an illustrative embodiment of a method in accordance with various aspects described herein.

FIG. 7E depicts an illustrative embodiment of a method in accordance with various aspects described herein.

FIG. 8A depicts an illustrative embodiment of a process and memory in accordance with various aspects described herein.

FIG. 8B depicts an illustrative embodiment of a method in accordance with various aspects described herein.

FIG. 8C depicts an illustrative embodiment of a method in accordance with various aspects described herein.

FIG. 8D depicts an illustrative embodiment of a method in accordance with various aspects described herein.

FIG. 9E depicts an illustrative embodiment of a method in accordance with various aspects described herein.

FIG. 9I depicts an illustrative embodiment of a method in accordance with various aspects described herein.

FIG. 9J depicts an illustrative embodiment of a method in accordance with various aspects described herein.

FIG. 10B depicts an illustrative embodiment of a method in accordance with various aspects described herein.

FIG. 10C depicts an illustrative embodiment of a method in accordance with various aspects described herein.

FIG. 10D depicts an illustrative embodiment of a method in accordance with various aspects described herein.

FIG. 11C depicts an illustrative embodiment of a method in accordance with various aspects described herein.

FIG. 11D depicts an illustrative embodiment of a method in accordance with various aspects described herein.

FIG. 11E depicts an illustrative embodiment of a method in accordance with various aspects described herein.

FIG. 12A depicts an illustrative embodiment of a mobile application download in accordance with various aspects described herein.

FIG. 12B depicts an illustrative embodiment of a method in accordance with various aspects described herein.

FIG. 12C depicts an illustrative embodiment of a method in accordance with various aspects described herein.

FIG. 12D depicts an illustrative embodiment of a method in accordance with various aspects described herein.

DETAILED DESCRIPTION

Figure 1:
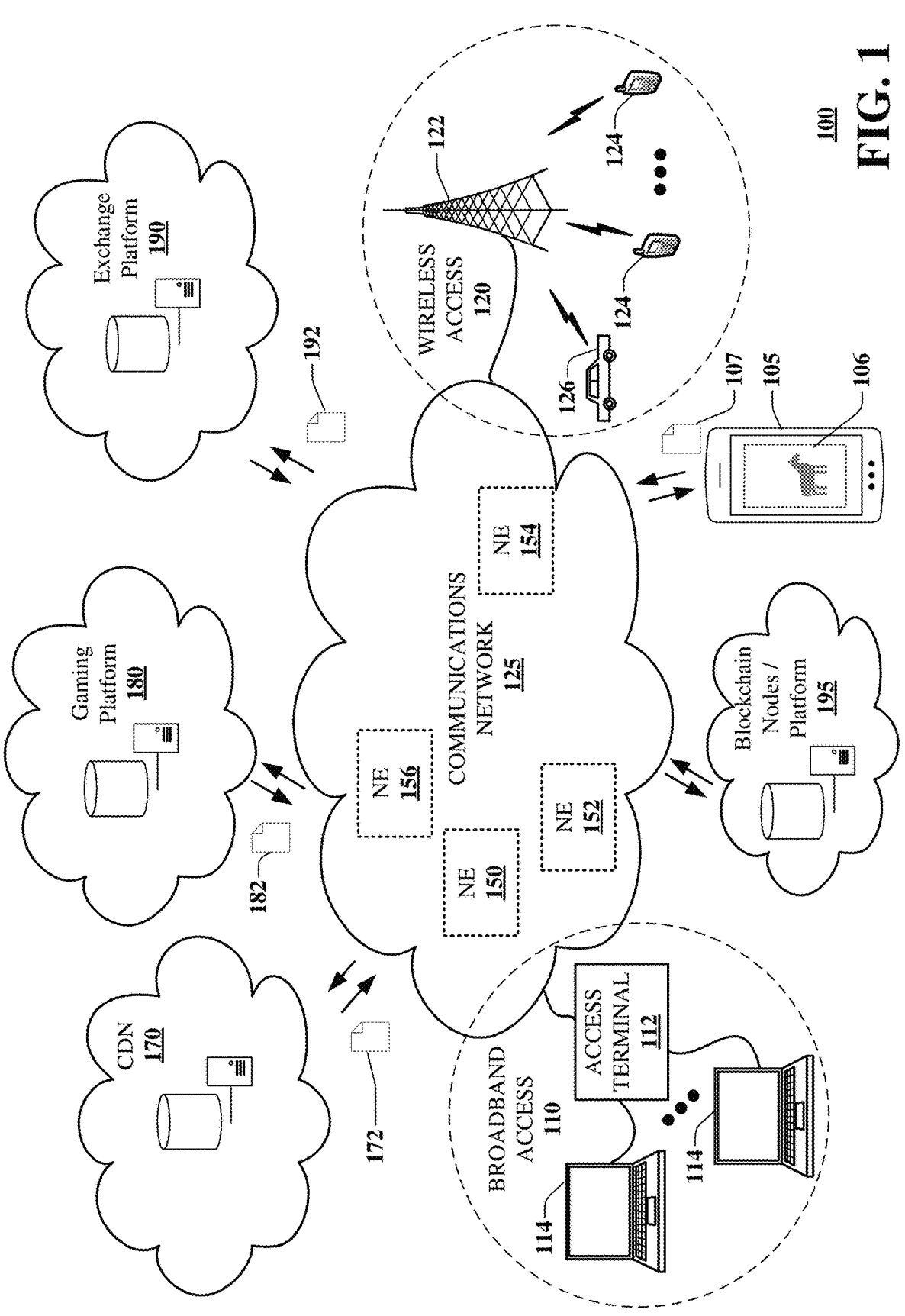
FIG. 1 is a block diagram illustrating an exemplary, non-limiting embodiment of a communication system in accordance with various aspects described herein.

In one or more embodiments, a browser-based or mobile application-based game, such as a massive multiplayer online (MMO) game or other online game can be executed at an end user device according to video gaming data that is provided on demand. For example, the map of the video game can be broken down into sectors which are different gaming canvasses. A prediction can be made as to a player entering an adjacent gaming canvass and that particular canvass or a portion thereof (e.g., objects and information associated therewith) can be downloaded to the browser (or commence downloading) before the player enters that particular adjacent gaming canvass. The prediction can be based on various criteria including a directional vector of player movement, historical movement of the player or other players, locations of objects of interests, behavior patterns, quests being followed, or other tendencies of the player that can facilitate predicting where the player will go. In one embodiment, a machine learning model can be trained on one, some or all of these criteria (as well as other criteria described herein) to facilitate predicting the movement of the player and selecting the adjacent gaming canvass.

In one or more embodiments, downloading of the video game data can be made more efficient through various prioritization and unloading schemes. For example, prioritizing downloading can be based on whether an object is static or dynamic, the type of object, the size or volume of the object, and/or the distance of the object to the player. In another embodiment, the unloading of the video gaming data can be made more efficient by implementing various schemes, such as a memory pressure calculation for the end user device, reference counting of resources associated with the static and dynamic objects, access times for the static and dynamic objects, and/or unloading policies assigned to a resource type. Other embodiments are described in the subject disclosure.

One or more aspects of the subject disclosure include a method including providing, by a processing system including a processor over a network to an end user device, first video gaming data associated with a first gaming canvass of a plurality of gaming canvasses of a video game, where each of the plurality of gaming canvasses is a sector of a map of the video game, where the first video gaming data facilitates playing of the video game in a browser of the end user device. The method includes providing, by the processing system over the network to the end user device, at least a portion of second video gaming data associated with a second gaming canvass, where the second gaming canvass is selected from among the plurality of gaming canvasses according to a predicting of movement of the player, where the second gaming canvass is another sector of the map adjacent to the first gaming canvass, where the providing the at least a portion of the second video gaming data occurs prior to the player entering the second gaming canvass, and where the second video gaming data facilitates playing of the video game in the browser of the end user device.

One or more aspects of the subject disclosure include a non-transitory machine-readable medium, comprising executable instructions that, when executed by an end user device, facilitate performance of operations. The operations include receiving, over a network from a server, first video gaming data associated with a first gaming canvass of a plurality of gaming canvasses of a video game, wherein each of the plurality of gaming canvasses is a sector of a map of the video game. The operations include executing the video game in a browser of the end user device based at least in part on the first video gaming data. The operations include receiving user input at a user interface of the end user device associated with controlling movement of a player in the first gaming canvass. The operations include receiving, over the network from the server, at least a portion of second video gaming data associated with a second gaming canvass, wherein the receiving the at least a portion of the second video gaming data occurs prior to the player entering the second gaming canvass, where the second gaming canvass is selected from among the plurality of gaming canvasses according to a predicting of movement of the player, where the second gaming canvass is another sector of the map adjacent to the first gaming canvass. The operations include continuing executing the video game in the browser of the end user device based at least in part on the second video gaming data.

One or more aspects of the subject disclosure include a device having a processing system including a processor, and a memory that stores executable instructions that, when executed by the processing system, facilitate performance of operations. The operations include providing, over a network to an end user device, first video gaming data associated with a first gaming canvass of a plurality of gaming canvasses of a video game, where each of the plurality of gaming canvasses is a sector of a map of the video game, where the first video gaming data facilitates playing the video game in a browser of the end user device. The operations include providing, over the network to the end user device, at least a portion of second video gaming data associated with a second gaming canvass, where the providing the at least a portion of the second video gaming data occurs prior to a player entering the second gaming canvass, where the second gaming canvass is selected from among the plurality of gaming canvasses according to a predicting of movement of the player, where the second gaming canvass is another sector of the map adjacent to the first gaming canvass, and where the second video gaming data facilitates playing of the video game in the browser of the end user device.

One or more aspects of the subject disclosure include a method including providing, by a processing system including a processor over a network to an end user device, first video gaming data associated with a first gaming canvass of a plurality of gaming canvasses of a video game without providing a remainder of video gaming data that is not associated with the first gaming canvass, wherein each of the plurality of gaming canvasses is a sector of a map of the video game, wherein the first video gaming data enables commencing playing the video game in a browser of the end user device. The method includes providing, by the processing system over the network to the end user device, second video gaming data associated with a second gaming canvass that is another sector of the map adjacent to the first gaming canvass, where the providing the second video gaming data commences prior to a player entering the second gaming canvass, where the second video gaming data facilitates playing of the video game in the browser of the end user device. The providing the second video gaming data comprises: prioritizing downloading of static objects according to Axis-Aligned Bounding Box (AABB) volume and distance to the player, and prioritizing downloading of dynamic objects according to type and distance to the player, where unloading of the video gaming data is according to a memory pressure calculation for the end user device, reference counting of resources associated with the static and dynamic objects, access times for the static and dynamic objects, and unloading policies assigned to a resource type.

One or more aspects of the subject disclosure include a non-transitory machine-readable medium, comprising executable instructions that, when executed by an end user device, facilitate performance of operations. The operations include receiving, over a network, first video gaming data associated with a first gaming canvass of a plurality of gaming canvasses of a video game without receiving a remainder of video gaming data that is not associated with the first gaming canvass, where each of the plurality of gaming canvasses is a sector of a map of the video game. The operations include executing the video game in a browser of the end user device based at least in part on the first video gaming data. The operations include receiving user input at a user interface of the end user device associated with controlling movement of a player in the first gaming canvass. The operations include receiving, over the network, second video gaming data associated with a second gaming canvass that is another sector of the map adjacent to the first gaming canvass, where the receiving the second video gaming data occurs prior to the player entering the second gaming canvass. The operations include sending, over the network to an edge node of a content delivery network, a single request for resources associated with chunks of a portion of the second video gaming data. The operations include receiving, over the network from the edge node of the content delivery network, bundled resources that were obtained in real-time by the edge node in response to the single request. The operations include continuing executing the video game in the browser of the end user device based at least in part on the second video gaming data and the bundled resources.

One or more aspects of the subject disclosure include an end user device having a processing system including a processor, a user interface; and a memory that stores executable instructions that, when executed by the processing system, facilitate performance of operations. The operations include receiving, over a network, first video gaming data associated with a first gaming canvass of a plurality of gaming canvasses of a video game without receiving a remainder of video gaming data that is not associated with the first gaming canvass, wherein each of the plurality of gaming canvasses is a sector of a map of the video game. The operations include executing the video game in a browser based at least in part on the first video gaming data. The operations include receiving user input at the user interface associated with controlling movement of a player in the first gaming canvass. The operations include receiving, over the network, second video gaming data associated with a second gaming canvass that is another sector of the map adjacent to the first gaming canvass, where the receiving the second video gaming data occurs prior to the player entering the second gaming canvass. The operations include continuing executing the video game in the browser of the end user device based at least in part on the second video gaming data, where unloading of the video gaming data is according to a memory pressure calculation for the end user device, reference counting of resources associated with the static and dynamic objects, access times for the static and dynamic objects, and unloading policies assigned to a resource type.

The subject disclosure includes many features and functions that are described with respect to the Figures that follow, each of which can be used in addition to, or in alternative to, any of the foregoing.

Referring now to FIG. 1, a block diagram is shown illustrating an example, non-limiting embodiment of a system 100 in accordance with various aspects described herein. System 100 can include one or more gaming platforms 180 for providing gaming services to end user devices (e.g., browser-based or other types of video games) in a Web 2 and/or Web3 environment, and/or one or more exchange platforms 190 and/or for managing NFT digital assets (including transfers of the NFT digital assets) that are associated with video game(s) managed by the gaming platform (s), and/or blockchain nodes/platform(s) 195 that can be utilized for creating and maintaining the NFT digital assets. The platforms 180, 190 and/or 195 can include various software and hardware such as devices, servers or other equipment (including cloud-based resources and processing) that allows the platforms to perform various computing functionality, such as described herein. For instance, an end user device 105 is illustrated (e.g., a mobile phone although other end user devices can also be utilized, such as desktop or laptop computers, tablets, gaming console, etc., which can access, transmit and receive data via a hardwire and/or wireless technology) which is executing a video game 106 (e.g., rendering in its browser) based at least in part on transmitting and receiving video gaming information or data 107 over the network 125. The video gaming data 107 can be of various types that enable a browser to execute/render a video game including one some or all of: chunks, resource requests, resources, zip files, bundled resources, audio/video files, texture(s), model(s), prefab(s), shader(s), shader program(s), scene(s), serialized structure(s), and/or other types of data.

As an example, system 100 can facilitate in whole or in part: managing NFT digital assets associated with one or more video games (e.g., a transfer exchange); providing an exchange for transaction of the NFT digital assets; streaming video gaming data on-demand as a player moves around a map in a browser-based video game; predicting player movement based on various criteria including trajectory, historical movements, and/or objects of interest so that adjacent gaming canvas can be pre-loaded (in whole or in part) prior to the player reaching that particular location; prioritizing downloading of particular objects according to various parameters including player distance, object type, and/or object size to facilitate quality of experience and resource usage; and/or performing unloading of objects based on various criteria including memory pressure, reference counting and/or access time to facilitate quality of experience and resource usage.

In particular, a communications network 125 is presented for providing broadband access 110 to a plurality of data terminals 114 via access terminal 112, and wireless access 120 to a plurality of mobile devices 124 and vehicle 126 via base station or access point 122. The network 125 can provide other services such as voice access to a plurality of telephony devices and/or media access to a plurality of audio/video display devices via media terminals. In addition, communication network 125 is coupled to one or more content sources 170 of gaming resources, audio, video, graphics, text and/or other content or media. While broadband access 110 and wireless access 120 are shown separately, one or more of these forms of access (including voice access and media access) can be combined to provide multiple access services to a single client device (e.g., mobile devices 124 can receive media content via media terminals, data terminals can be provided voice access via a switching device, and so on).

The communications network 125 can include a plurality of network elements (NE) 150, 152, 154, 156, etc. for facilitating the broadband access 110, wireless access 120, voice access, media access, the distribution of content from content sources 175 and/or video gaming streaming such as in a browser-based environment. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices. In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the content sources 170 can include content delivery network(s), as well as other types of sources such as broadcast television and radio sources, video on demand platforms and streaming video and audio services platforms, data servers, web servers and other content servers, and/or other sources of media. In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In one or more embodiments, lists and resource identifications can be utilized to facilitate when a client returns to play the video game, such as manifests and/or hashes being analyzed by the game client to identify particular objects that should be obtained when a client returns to play the video game. For example, when a player starts playing a video game for the first time, the player may start the game at an origination point. However, after finishing a gaming session and the returning to start a new video gaming session, the player will want to continue from the departure point (e.g., point on map when previous gaming session was finished) rather starting from the origination session. System 100 can utilize manifests and/or hashes to facilitate this process. When the player returns to the video game, the game client may have relevant chunks, resources or objects already stored locally. For instance, all or some of the resources can have a hash. Local hashes can be stored for those chunks. In one embodiment, if the local chunks are out-of-date or otherwise need updating then the gaming client can download only the ones that are out-of-date and utilize the local chunks for the others. For example, a manifest file can identify a hash mapping of a video game or a particular canvas(ses) of the video game. The gaming client can, in conjunction with a manifest file, check locally first to see if it has the hash or chunk stored already and then can obtain out-of-date resources as needed. In one embodiment, manifest files can be pushed to the game client so the game client can obtain resource(s) (e.g., new tree) and does not need to leave game or cause a server restart. In one embodiment, manifest files can be pushed to and/or pulled by the game client according to various triggers (e.g., periodically, gaming events, distance to a new gaming canvass, etc.).

System 100 allows for streaming of video gaming data on-demand. The gaming platform 180 can transmit and receive various data 182 that allows for providing gaming services to end user devices. Gaming platform 180 can have various components and perform various functions that enable gaming services according to the type of service, such as browser-based gaming that facilitates rendering the video game via the browser on the display of the end user device or non-browser-based online gaming, such as via a mobile application, desktop application and/or other software of an end user device. For example, gaming platform 180 can facilitate or otherwise provide video gaming data to the end user device 105 such that not all of the gaming data needs to be downloaded before the video game starts (e.g., the user has control over the player in the video game). For instance, video gaming data associated with a first gaming canvass (e.g., a particular sector of the video game map) can be provided to the end user device utilizing various streaming techniques (e.g., chunks that reference resources, resource requests received from the end user device by various devices (such as CDN 170, gaming platform 180) and so forth). A prediction can be made as to the next needed gaming canvass prior to the player entering that particular next gaming canvass. For instance, the prediction can be made and then updated according to one or more of a trajectory (e.g., direction and/or speed) of the player, historical movements or tendencies of the player and/or other players, or objects of interest in or near the gaming canvass. This improves the technology of online gaming systems by providing, necessary data to support the operation of the game on the end user device, just in time for use.

In one embodiment, the gaming canvass sector size can be selected according to various criteria such as network conditions and/or device capabilities. In one embodiment, gaming canvass sizes for the entire map can be the same. In another embodiment, gaming canvass sizes for the entire map can be different such as larger gaming canvasses in areas of the video game world where player movement tends to be faster (e.g., where fewer objects of interest are located) and smaller gaming canvasses in areas of the video game world where player movement tends to be slower (e.g., where numerous objects of interest are located). The prediction can be the basis of selecting the next gaming canvass and video gaming data associated with this next gaming canvass can commence download prior to the player entering this next gaming canvass. In one embodiment, the download of video gaming data for the next gaming canvass is commenced and completed before the player enters this next gaming canvass. In another embodiment, the download of video gaming data for the next gaming canvass is commenced before the player enters this next gaming canvass and is completed while the player is in this next gaming canvass. The prediction can be performed in a number of different ways as described herein including according to a machine learning model such as a convolutional neural network that is trained according to player behavior and/or other player behaviors. The prediction can be performed by various devices including the end user device 105 and/or the gaming platform 180. The training of the machine learning model can be performed by various devices including the gaming platform 180 and/or the end user device 105.

System 100 allows for a thin gaming client to be utilized on an end user device to facilitate a browser-based video game. In one embodiment, the download of complex objects (e.g., house, dragon) can be prioritized over simpler objects (e.g., blade of grass). In another embodiment, a type of content can dictate or influence prioritization of download (e.g., audio and complex objects). In another embodiment, unloading of the video gaming data is according to one or more of a memory pressure calculation for the end user device, reference counting of resources associated with static and dynamic objects, access times for the static and dynamic objects, and unloading policies assigned to a resource type. Some or all of the prioritization can be determined by various devices including the gaming platform 180 and/or the end user device 105. This improves the technology of online gaming systems by intelligently unloading unnecessary data from the end user device to provide room for new data to be loaded.

In one embodiment, the CDN 170 can transmit and receive various data 172 that allows for execution of the video game 106 at the end user device 105. For example, the CDN 170 can receive resource requests and can provide the resources over the network 125 to the end user device 105 to enable execution of the video game by the browser. In one embodiment, the end user device 105 can send, over the network to an edge node of the CDN 170, a single request for resources associated with chunks of a portion of gaming canvass of the video game and then the edge node can transmit over the network 125 bundled resources that are obtained in real-time by the edge node in response to the single request. The bundled resources can be sent in a compressed format such as a zip file.

FIG. 2A depicts a series of pictorial diagrams illustrating an example, non-limiting embodiment of screen displays in accordance with various aspects described herein. As previously discussed, a browser-based or mobile application-based game, such as a massive multiplayer online (MMO) game or other online game, can be executed at an end user device according to video gaming data that is provided on demand. For example, the map of the video game can be broken down into sectors which correspond to different gaming canvasses. As shown in the borderless screen displays of an end user device 252, 254, and 256, a user's avatar or character (which can be referred to as a "player") in an online game is moving to different sectors of the map of the video game, under control of the user's interaction with the user interface (UI) associated with the end user's device.

A prediction can be made as to a player entering an adjacent gaming canvass and that particular canvass or a portion thereof (e.g., objects and information associated therewith) can be downloaded to the browser (or commence downloading) before the player enters that particular adjacent gaming canvass. The prediction can be based on various criteria including, for example, a directional vector of player movement, historical movement of the player or other players, locations of objects of interests, behavior patterns, quests being followed, or other tendencies of the player that can facilitate predicting where the player will go. Furthermore, a machine learning model can be trained on one, some or all of these criteria (as well as other criteria described herein) to facilitate predicting the movement of the player and selecting the adjacent gaming canvass.

As previously discussed, downloading of the video game data can be made more efficient through various prioritization and unloading schemes. For example, prioritizing downloading can be based on whether an object is static or dynamic, the type of object, the size or volume of the object, and/or the distance of the object to the player. In another embodiment, the unloading of the video gaming data can be made more efficient by implementing various schemes, such as a memory pressure calculation for the end user device, reference counting of resources associated with the static and dynamic objects, access times for the static and dynamic objects, and/or unloading policies assigned to a resource type FIG. 2B depicts an illustrative embodiment of a method in accordance with various aspects described herein. In particular, a method 200-1 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 202-1 includes providing, by a processing system including a processor over a network to an end user device, first video gaming data associated with a first gaming canvass of a plurality of gaming canvasses of a video game, wherein each of the plurality of gaming canvasses is a sector of a map of the video game, wherein the first video gaming data facilitates playing of the video game in a browser of the end user device.

Step 204-1 includes providing, by the processing system over the network to the end user device, at least a portion of second video gaming data associated with a second gaming canvass, wherein the second gaming canvass is selected from among the plurality of gaming canvasses according to a predicting of movement of a player, wherein the second gaming canvass is another sector of the map adjacent to the first gaming canvass, wherein the providing the at least a portion of the second video gaming data occurs prior to the player entering the second gaming canvass, and wherein the second video gaming data facilitates playing of the video game in the browser of the end user device.

In addition to or in alternative to any of the foregoing, the predicting is based on a directional vector of the player that is calculated from player movement through the first gaming canvass.

In addition to or in alternative to any of the foregoing, the predicting is based on an object location of an object of interest in the video game.

In addition to or in alternative to any of the foregoing, the object location is in the second gaming canvass or is closer to the second gaming canvass than to a third gaming canvass adjacent to the first gaming canvass.

In addition to or in alternative to any of the foregoing, the predicting is based on historical movement of the player through the first gaming canvass.

In addition to or in alternative to any of the foregoing, the predicting is based on historical movement of other players through the first gaming canvass.

In addition to or in alternative to any of the foregoing, a predicted time is estimated for when the player will enter the second gaming canvass, wherein the providing the at least a portion of second video gaming data is based on the predicted time.

In addition to or in alternative to any of the foregoing, a commencement of the providing the at least a portion of second video gaming data is selected based on the predicted time.

In addition to or in alternative to any of the foregoing, a data rate of the providing the at least a portion of second video gaming data is selected based on the predicted time.

In addition to or in alternative to any of the foregoing, the providing of at least a portion of the first and second video gaming data is via chunks that reference resources.

In addition to or in alternative to any of the foregoing, the predicting is performed utilizing a machine learning model, wherein training data for the machine learning model includes one of present player movement of the player through the first gaming canvass, historical player movement of the player through the first gaming canvass, other historical player movement of other players through the first gaming canvass, object locations of objects of interest in the video game, or a combination thereof.

In addition to or in alternative to any of the foregoing, a size of one or more of the plurality of gaming canvasses of the video game is selected according to network conditions of the network, device capabilities of the end user device, or a combination thereof.

FIG. 2C depicts an illustrative embodiment of a method in accordance with various aspects described herein. In particular, a method 200-2 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 202-2 includes receiving, over a network from a server, first video gaming data associated with a first gaming canvass of a plurality of gaming canvasses of a video game, wherein each of the plurality of gaming canvasses is a sector of a map of the video game. Step 204-2 includes executing the video game in a browser of the end user device based at least in part on the first video gaming data. Step 206-2 includes receiving user input at a user interface of the end user device associated with controlling movement of a player in the first gaming canvass.

Step 208-2 includes receiving, over the network from the server, at least a portion of second video gaming data associated with a second gaming canvass, wherein the receiving the at least a portion of the second video gaming data occurs prior to the player entering the second gaming canvass, wherein the second gaming canvass is selected from among the plurality of gaming canvasses according to a predicting of movement of the player, wherein the second gaming canvass is another sector of the map adjacent to the first gaming canvass. Step 210.2 includes continuing executing the video game in the browser of the end user device based at least in part on the second video gaming data.

In addition to or in alternative to any of the foregoing, the predicting is performed utilizing a machine learning model, wherein training data for the machine learning model includes one of present player movement of the player through the first gaming canvass, historical player movement of the player through the first gaming canvass, other historical player movement of other players through the first gaming canvass, object locations of objects of interest in the video game, or a combination thereof. In addition to or in alternative to any of the foregoing, the predicting is performed according to estimating a predicted time when the player will enter the second gaming canvass based on a velocity of the player, and wherein a commencement of the receiving the at least a portion of second video gaming data is based on the predicted time.

FIG. 2D depicts an illustrative embodiment of a method in accordance with various aspects described herein. In particular, a method 200-3 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 202-3 includes providing, over a network to an end user device, first video gaming data associated with a first gaming canvass of a plurality of gaming canvasses of a video game, wherein each of the plurality of gaming canvasses is a sector of a map of the video game, wherein the first video gaming data facilitates playing the video game in a browser of the end user device.

Step 204-3 include providing, over the network to the end user device, at least a portion of second video gaming data associated with a second gaming canvass, wherein the providing the at least a portion of the second video gaming data occurs prior to a player entering the second gaming canvass, wherein the second gaming canvass is selected from among the plurality of gaming canvasses according to a predicting of movement of the player, wherein the second gaming canvass is another sector of the map adjacent to the first gaming canvass, and wherein the second video gaming data facilitates playing of the video game in the browser of the end user device.

In addition to or in alternative to any of the foregoing, the predicting is performed utilizing a machine learning model, wherein training data for the machine learning model includes one of present player movement of the player through the first gaming canvass, historical player movement of the player through the first gaming canvass, other historical player movement of other players through the first gaming canvass, object locations of objects of interest in the video game, or a combination thereof.

In addition to or in alternative to any of the foregoing, the predicting is performed according to estimating a predicted time when the player will enter the second gaming canvass based on a velocity of the player, and wherein a commencement of the providing the at least a portion of second video gaming data is based on the predicted time.

In addition to or in alternative to any of the foregoing, the providing of at least a portion of the first and second video gaming data is via chunks that reference resources, wherein at least a portion of the resources are available at a content delivery network.

In addition to or in alternative to any of the foregoing, a size of one or more of the plurality of gaming canvasses of the video game is selected according to network conditions of the network, device capabilities of the end user device, or a combination thereof.

FIG. 2E depicts an illustrative embodiment of a method in accordance with various aspects described herein. In particular, a method 200-4 is represented for use in conjunction with one or more functions and features described in conjunction the any of the preceding figures and any of the figures that follow. For example, the method can be performed by, or in conjunction with, a server such as a game server aid/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 202-4 includes providing, by a processing system including a processor over a network to an end user device, first video gaming data associated with a first gaming canvass of a plurality of gaming canvasses of a video game without providing a remainder of video gaming data that is not associated with the first gaming canvass, wherein each of the plurality of gaming canvasses is a sector of a map of the video game, wherein the first video gaming data enables commencing playing the video game in a browser of the end user device.

Step 204-4 includes providing, by the processing system over the network to the end user device, second video gaming data associated with a second gaming canvass that is another sector of the map adjacent to the first gaming canvass, wherein the providing the second video gaming data commences prior to a player entering the second gaming canvass, wherein the second video gaming data facilitates playing of the video game in the browser of the end user device, and wherein the providing the second video gaming data comprises: prioritizing downloading of static objects according to Axis-Aligned Bounding Box (AABB) volume and distance to the player, and prioritizing downloading of dynamic objects according to type and distance to the player, wherein unloading of the video gaming data is according to a memory pressure calculation for the end user device, reference counting of resources associated with the static and dynamic objects, access times for the static and dynamic objects, and unloading policies assigned to a resource type.

In addition to or in alternative to any of the foregoing, the prioritizing downloading of static objects is based on a higher priority for larger AABB volumes.

In addition to or in alternative to any of the foregoing, the prioritizing downloading of static objects is based on a higher priority for a closer distance to the player.

In addition to or in alternative to any of the foregoing, the prioritizing downloading of dynamic objects is based on a higher priority for the type of the dynamic objects that can damage a player.

In addition to or in alternative to any of the foregoing, the providing the second video gaming data comprises: prioritizing downloading of other players according to whether the other players can damage the player.

In addition to or in alternative to any of the foregoing, the memory pressure calculation is based on an available memory for use by the end user device and resources in a resource load queue.

In addition to or in alternative to any of the foregoing, the providing the second video gaming data comprises: prioritizing downloading type of content according to dynamic meshes then particle systems then static meshes.

In addition to or in alternative to any of the foregoing, the providing the second video gaming data comprises: determining that particular content is to be presented within a particular time period and prioritizing downloading of that particular content over other content already in a downloading queue.

In addition to or in alternative to any of the foregoing, the particular content that is to be presented within the particular time period is a conversation tree for the player interacting with a non-player character.

In addition to or in alternative to any of the foregoing, the providing of at least a portion of the first and second video gaming data is via chunks that reference resources.

In addition to or in alternative to any of the foregoing, at least a portion of the resources are requested by the end user device from a content delivery network.

In addition to or in alternative to any of the foregoing, the content delivery network bundles a group of resources in real time at an edge node to satisfy a single request by the end user device.

In addition to or in alternative to any of the foregoing, the end user device receives the bundled group of resources from the edge node in a file utilizing a compressed format.

In addition to or in alternative to any of the foregoing, the second gaming canvass is selected from among the plurality of gaming canvasses according to a predicting of movement of the player.

In addition to or in alternative to any of the foregoing, the predicting is performed utilizing a machine learning model, wherein training data for the machine learning model includes one of present player movement of the player through the first gaming canvass, historical player movement of the player through the first gaming canvass, other historical player movement of other players through the first gaming canvass, object locations of objects of interest in the video game, or a combination thereof.

In addition to or in alternative to any of the foregoing, the predicting is performed according to estimating a predicted time when the player will enter the second gaming canvass based on a velocity of the player, and wherein a commencement of the providing the second video gaming data is based on the predicted time.

FIG. 2F depicts an illustrative embodiment of a method in accordance with various aspects described herein. In particular, a method 200-5 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 202-5 includes receiving, over a network, first video gaming data associated with a first gaming canvass of a plurality of gaming canvasses of a video game without receiving a remainder of video gaming data that is not associated with the first gaming canvass, wherein each of the plurality of gaming canvasses is a sector of a map of the video game. Step 204-5 includes executing the video game in a browser of the end user device based at least in part on the first video gaming data. Step 206-5 includes receiving user input at a user interface of the end user device associated with controlling movement of a player in the first gaming canvass.

Step 208-5 includes receiving, over the network, second video gaming data associated with a second gaming canvas that is another sector of the map adjacent to the first gaming canvas, wherein the receiving the second video gaming data occurs prior to the player entering the second gaming canvas. Step 210-5 includes sending, over the network to an edge node of a content delivery network, a single request for resources associated with chunks of a portion of the second video gaming data. Step 212-5 includes receiving, over the network from the edge node of the content delivery network, bundled resources that were obtained in real-time by the edge node in response to the single request. Step 214-5 includes continuing executing the video game in the browser of the end user device based at least in part on the second video gaming data and the bundled resources.

FIG. 2G depicts an illustrative embodiment of a method in accordance with various aspects described herein. In particular, a method 200-6 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 202-6 includes receiving, over a network, first video gaming data associated with a first gaming canvas of a plurality of gaming canvasses of a video game without receiving a remainder of video gaming data that is not associated with the first gaming canvas, wherein each of the plurality of gaming canvasses is a sector of a map of the video game. Step 204-6 includes executing the video game in a browser based at least in part on the first video gaming data. Step 206-6 includes receiving user input at the user interface associated with controlling movement of a player in the first gaming canvas.

Step 208-6 includes receiving, over the network, second video gaming data associated with a second gaming canvas that is another sector of the map adjacent to the first gaming canvas, wherein the receiving the second video gaming data occurs prior to the player entering the second gaming canvas. Step 210-6 includes continuing executing the video game in the browser of the end user device based at least in part on the second video gaming data, wherein unloading of the first video gaming data and the second video gaming data is according to a memory pressure calculation for the end user device, reference counting of resources associated with the static and dynamic objects, access times for the static and dynamic objects, and unloading policies assigned to a resource type.

In addition to or in alternative to any of the foregoing, the operations further comprise: sending, over the network to an edge node of a content delivery network, a single request for resources associated with chunks of a portion of the second video gaming data; and receiving, over the network from the edge node of the content delivery network, bundled resources that were obtained in real-time by the edge node in response to the single request.

Figure 3A:
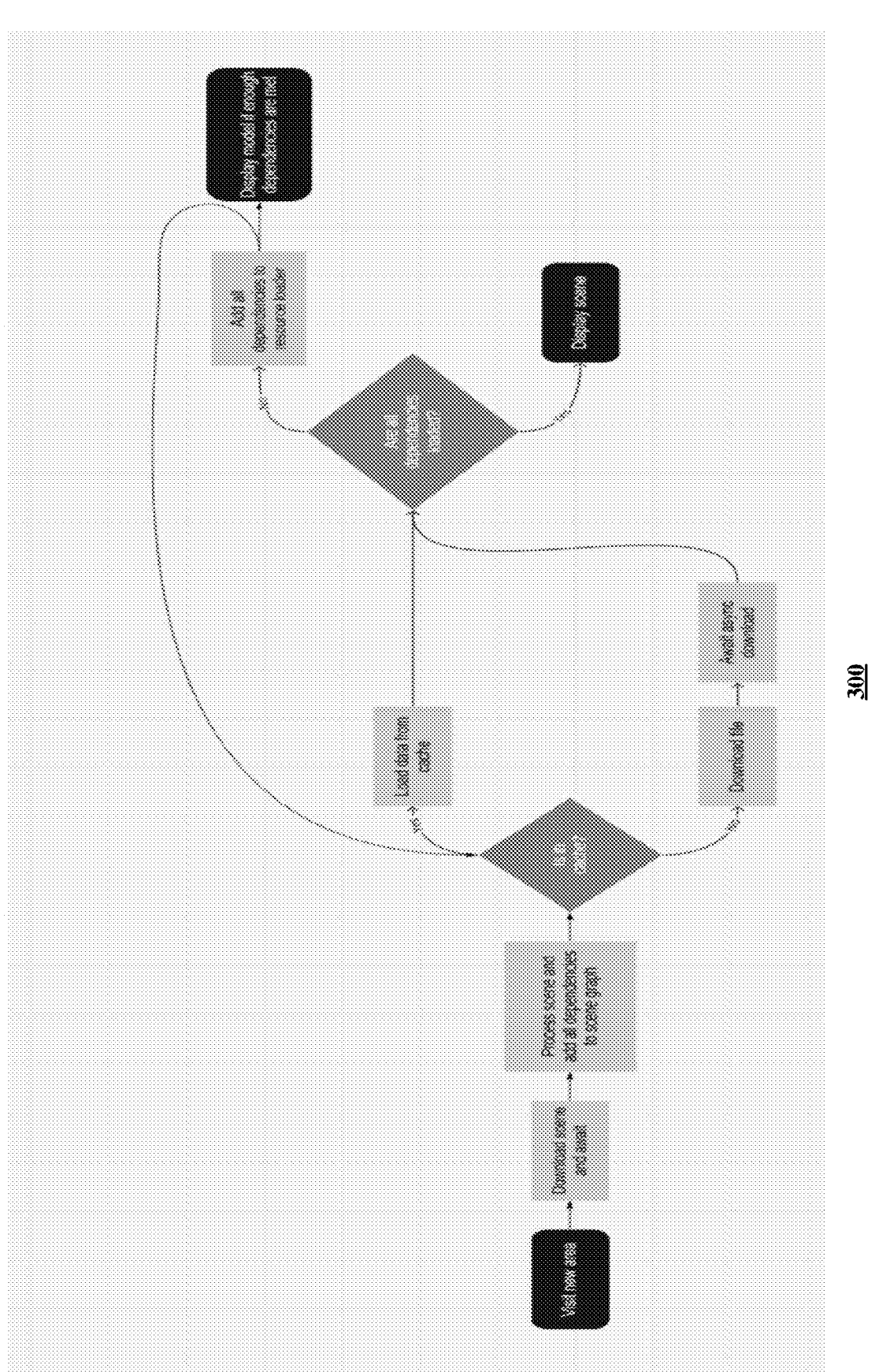
FIG. 3A depicts an illustrative embodiment of a method in accordance with various aspects described herein.

FIG. 3A illustrates a block diagram for a process 300 for streaming the data on-demand as the player moves around the map or world of the video game (rather than downloading everything up front) which can be used in system 100. All or some of the functions of process 300 can be performed by various devices of system 100 including the client/end user device 105. In one embodiment, this provides for a thin game client executed within a browser with a dynamic limited gaming canvas. For example, a player starts in a specific area. 3D models can be downloaded on-demand while the player can already begin to move around and interact with the video game. As the player moves from a first location to a second location, the client can predict where the player is going and can start to download the second location even before the player reaches the second location. In one embodiment, everything will be loaded by the client just before the player enters the new area (e.g., adjacent gaming canvas). This can create a seamless experience for the user, allowing the user to start playing the game in a short period of time (e.g., 5 seconds). Process 300 allows for determining whether all dependencies are loaded and then displaying a model if enough dependencies are met and displaying a scene if all dependencies are loaded. Process 300 provides for monitoring the cache to determine whether a file is to be downloaded or whether the data can be loaded from the cache. Process 300 can determine when a player is visiting a new area and then attempt to download and process the appropriate scene.

In one embodiment, downloading priority rules can be applied. For example, static objects (e.g., buildings, grass, water, etc.) can be prioritized by size (e.g., AABB bounding box volume) and/or the distance to the particular player. This means larger objects, closest to the player will load first, then large objects away from the player, and lastly smaller objects from closest to furthest away from the player. In one embodiment, dynamic objects (e.g., other players, creatures, non-player characters) can be prioritized based on the distance to the player and/or their type. For example, a first animal that cannot damage the player can be given a lower/lowest priority for download of dynamic objects, while a second animal that can damage or kill the player can have a higher/highest priority for download. The same schemes can be applied to the creature's animations and combat abilities, which are required for the client to visualize combat associated with the creature. Downloading of other players can have a particular priority based on the area the player is in, such as if the player is in a player-vs-player zone where other players can damage or kill the player then the client can prioritize the downloading of players over everything else or over other gaming items. In one embodiment, download priority can be given to collision data.

In one embodiment, the downloading priority for asset types can be based on dynamic meshes first, then particle systems and other prefabs, then static meshes, then the remainder of data such as audio, quest information, and so forth. In one embodiment, particular information that is determined (e.g., by the client) to be needed in a particular time period, such as within the near future (e.g., the next few seconds or minutes) can be provided with special priority. For instance, if the client determines that it requires particular information right away to present to the player (e.g., a conversation tree when a player has begun interacting with a non-player character), this resource corresponding to the particular information can skip to the front, or at least ahead, in the download queue.

In one embodiment, unloading of objects can be performed by way of various criteria and techniques, including reference counting and unloading policies or conditions, which can be employed or enforced by the client. For example, all objects can be reference counted such that each time a resource is referenced it increases the counter by one and when dereferenced it decreases the counter by one. When the counter reaches zero and the conditions for that resource type are met the resource is unloaded. In one embodiment, memory pressure can be employed to determine or otherwise to be used as a factor in unloading. For instance, whenever the game client determines that it has begun consuming memory resources over a particular threshold then objects can be more aggressively expelled from memory. In one embodiment, the unloading conditions of each or some resource types can be unique. For example, the unloading of large files (e.g., background music) can be done based on a lack of use, such as only after the resource has gone unused for a particular time threshold (e.g., 5 minutes of reference count being zero), and/or if the memory pressure is high enough (e.g., above a memory pressure threshold) to evict the song from memory sooner.

In one embodiment, pre-processed bundling of resources can be performed. For example, certain resources can always be requested as a single bundle, instead of many individual pieces. For instance, the game UI can include or consist of many small images, icons, audio clips and/or XML definition files. These files can be bundled at the video game's build-time to improve or optimize the client's download requirements and to help reduce bandwidth. As an example, each compressed bundle can contain resources inside that, once uncompressed, will be added to the resource management system. For instance, if the client downloads a bundle that contains tree A and later needs tree A again then the client will not download the non-bundled resource again, but instead will use the already cached resource.

In one embodiment, real-time bundling of resources can be employed or implemented. For example, when a resource is needed, it can be requested from a CDN network (e.g., Cloudflare). In one embodiment, some of the resources can be downloaded one at a time over HTTP/2 or HTTP/3 (full duplexing enabled). In one embodiment, a bundled file can be utilized to download exactly the assets that the client determines it needs. For instance, using CDN edge node workers, the exemplary embodiments can build bundles in real-time, on the fly, for the clients.

Figure 3B:
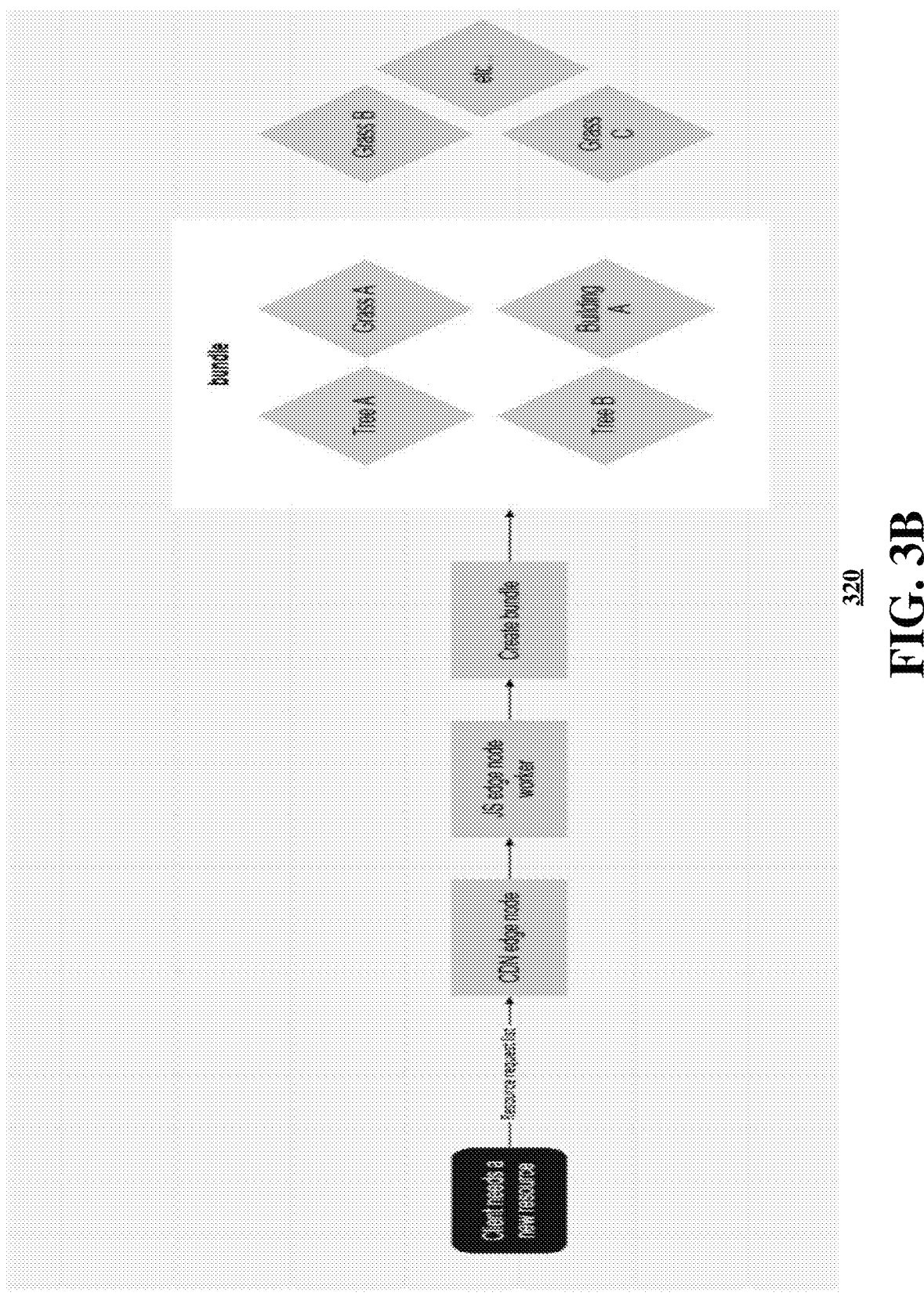
FIG. 3B depicts an illustrative embodiment of a method in accordance with various aspects described herein.

FIG. 3B illustrates a block diagram for a process 320 for bundling of resources which can be used in system 100. All or some of the functions of process 320 can be performed by various devices of system 100 including the client/end user device 105 and/or the CDN 170. As an example, if a client needs to download tree A, tree B, grass A and building A then instead of doing four separate requests to download these resources (and potentially more requests for its dependencies), the client can do a single request to an edge node or other device of the CDN and request all assets at once. The edge node can then obtain all assets and/or dependencies needed, bundle them together into a compressed file (e.g., a zip file), and send this bundle back to the client. Process 320 reduces the amount of requests but puts additional load on the edge nodes. Process 320 also reduces bandwidth, as the client only has to download what is needed, and some file formats share similar header data which can be compressed, such as via dictionary-based compressors.

Figure 3C:
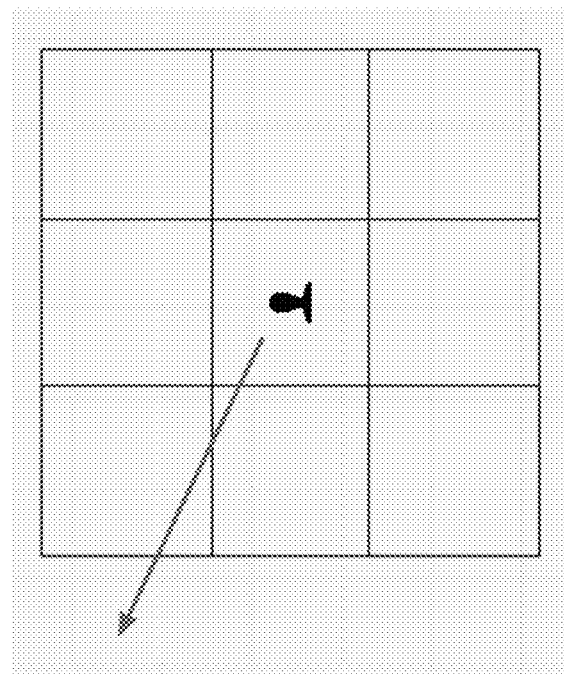
FIG. 3C depicts an illustrative embodiment of a process and sector map in accordance with various aspects described herein.

FIG. 3C illustrates a block diagram representative of a process/sector map 330 for predicting video game data that should be provided to the client which can be used in system 100. All or some of the functions of process 330 can be performed by various devices of system 100 including the client/end user device 105 and/or the gaming platform 180. In one embodiment, the map or world of the video game can be broken up or otherwise categorized into a plurality of gaming canvasses which are each a sector of the map or world. As explained herein, predicting a next needed gaming canvass can be utilized to facilitate and improve the efficiency of data downloading and execution of the video game by the end user device. As an example, scenes can be loaded in chunks where a chunk contains all static entities in a given area. In this example, the chunk itself does not contain any resources but refers to or references them. In one embodiment, through velocity/direction extrapolation, process 330 can be utilized to predict where players will end up in a specific time window. By calculating a directional vector, process 330 allows for preloading the correct chunks before the user is able to see them, creating a seamless experience. One or more other criteria can also be utilized alone, in combination with each other and/or in combination with the directional vector for predicting the next needed gaming canvass, such as the predicting being based on an object location of an object of interest in the video game, the object location being in the second gaming canvass or closer to the second gaming canvass than to a third gaming canvass adjacent to the first (current) gaming canvass; the predicting being based on historical movement of the player through the first gaming canvass; and/or the predicting being based on historical movement of other players through the first gaming canvass. In one embodiment, a predicted time can be estimated for when the player will enter the second gaming canvass and/or providing additional video gaming data (corresponding to the second gaming canvass) can be based on the predicted time. In one embodiment, a commencement of the providing the additional video gaming data (corresponding to the second gaming canvass) can be selected based on the predicted time. In one embodiment, one or more download parameters and/or streaming parameters can be selected based on the predicted time such as a data rate for the downloading of the additional video gaming data. In one embodiment, the gaming canvasses can be further divided and the downloading schemes described herein can be based on those sub-divisions and movement of the player through those sub-divisions.

In one embodiment, machine learning or a convolutional neural network can be used to train a model to predict user behavior. In one embodiment, the machine learning or the convolutional neural network can utilize one or more of the criteria described above as training data including the directional vector. This can be useful for players that behave in unpredictable or complex ways, such as following a specific questline of the video game. In one embodiment, chunk sizes can be static. In another embodiment, depending on network conditions for the client (e.g., network speed and latency), preloading of a larger area around the player can be performed. In one embodiment, the speed of download can be adjusted to prevent or reduce overburdening the network, which could lead to lag. In one embodiment, other parameters of the video game can be adjusted according to network conditions, such as decreasing game resolution where download speeds are below a particular threshold, where memory pressure is above a particular threshold, where the download queue is above a particular threshold, or for some other condition that is effecting the execution of the video game.

Figure 3D:
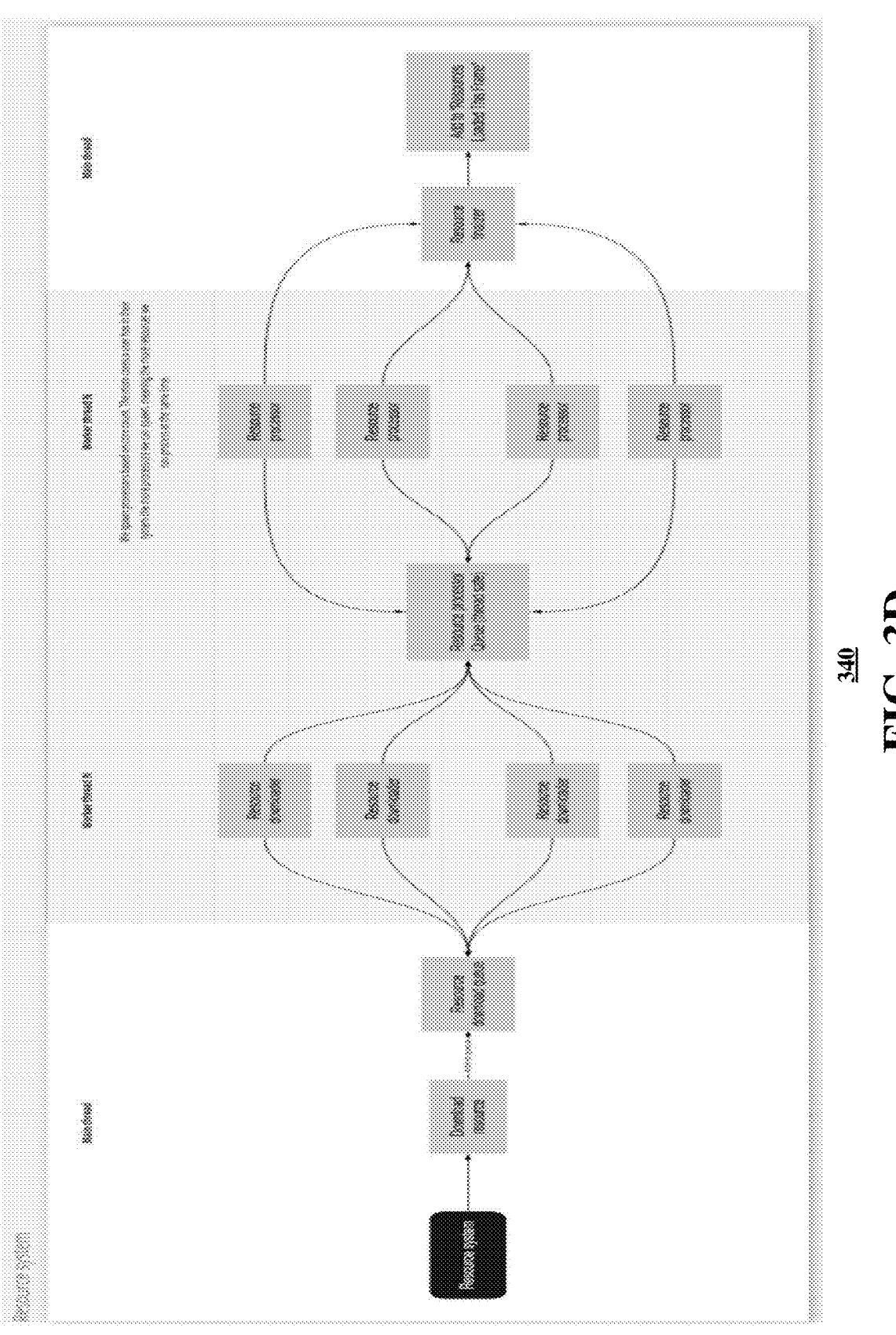
FIG. 3D depicts an illustrative embodiment of a method in accordance with various aspects described herein.

FIG. 3D illustrates a block diagram representative of a process 340 for work flow in the resource system which can be used in system 100. All or some of the functions of process 340 can be performed by various devices of system 100 including the client/end user device 105. In one embodiment, all resources in a scene file can be given a loadPriority. For example, the higher the load priority the more the object will be prioritized. In one embodiment, this may not result in the object being loaded first. For example, a building can have a higher priority than a flower, but the building file is much larger to download causing the asynchronous operation to take longer. Depending on the network connection, the number of network connections can be changed, which can be controlled by various devices including the client/end user device 105 and/or the gaming platform 180. For example, four simultaneous objects can be downloaded, however, if the network speed of a client is fast enough this number can be increased to speed up download speeds. Process 340 illustrates four resource downloaders operating according to the resource download queue and then providing output to the resource processor queue where resource processors operate according to the resource processor queue and then provide output to the resource finalizer.

In one embodiment, object download priority can be based on gameplay effect. For example, when a player walks through a spider web (which is being executed at the gaming platform 180) the server would still detect that condition and slow the player down but the downloading of the spider web would have a lower priority that downloading a building which a player could not walk through and would be stuck. In this example, the building can have a higher priority since it is a true collision stopping movement, as opposed to the spider web which slows the player down.

Figure 3E:
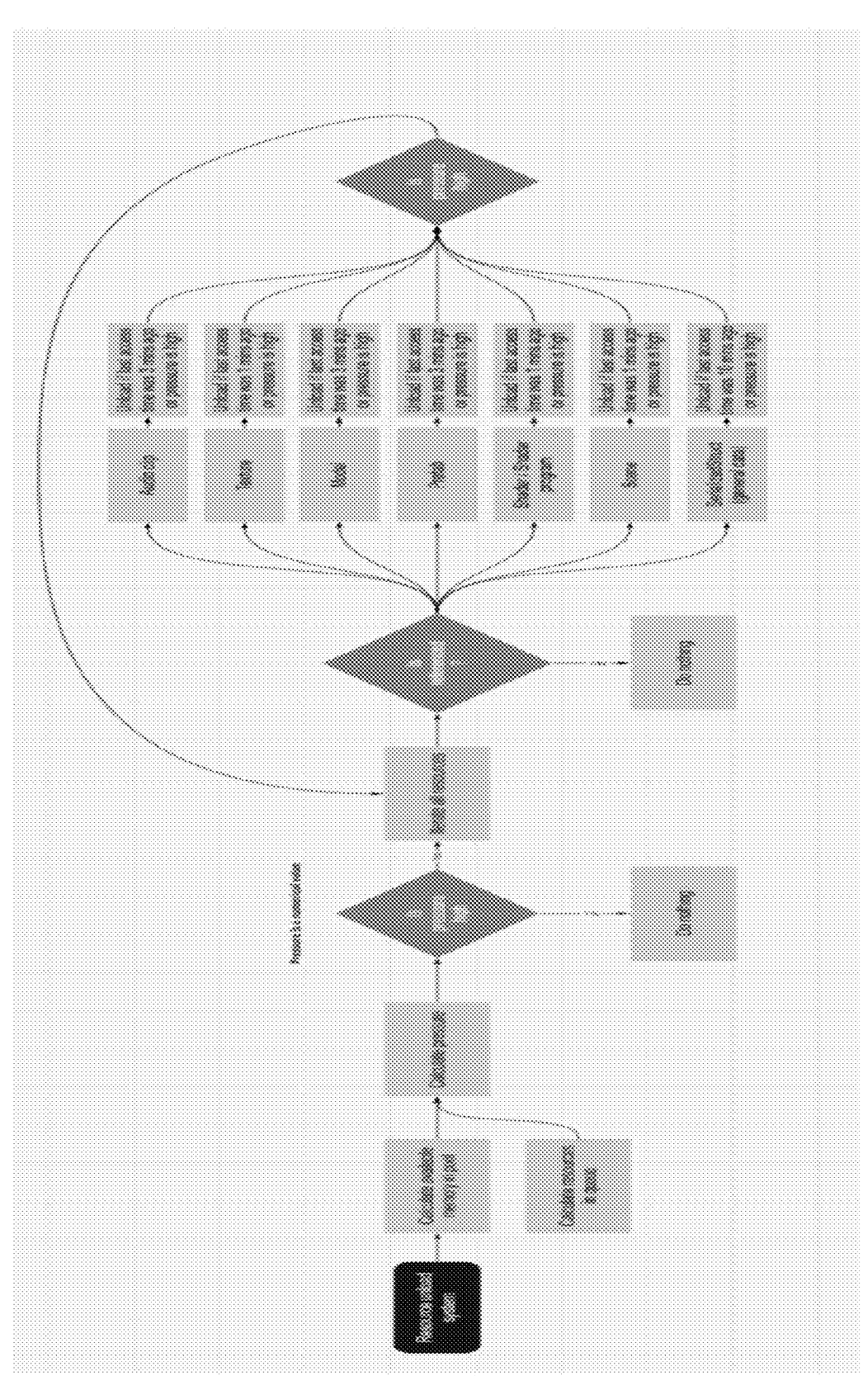
FIG. 3E depicts an illustrative embodiment of a method in accordance with various aspects described herein.

FIG. 3E illustrates a block diagram representative of a process 350 for work flow in the resource unload system which can be used in system 100. All or some of the functions of process 350 can be performed by various devices of system 100 including the client/end user device 105. In one embodiment, data unloading can be performed according to various techniques and criteria such as memory pressure, reference counting and access times. In one embodiment, memory pressure is determined by calculating the available memory on the system, minus the resources in the resource load queue. In one embodiment, a weighting factor can be employed to facilitate ensuring memory is available, such as resources in the load queue weighing double to ensure there is enough memory available to process the resource upon loading.

In one embodiment, reference counting can be performed where every time a resource is referenced (via handles), the reference count is incremented by one and every time a reference is removed it is decremented by one. When the counter reaches zero the reference becomes eligible for cleanup/unload (e.g., subject to other unloading policies and procedures). In one embodiment, access times can be monitored where every time the reference count changes the current time is stored with it. This allows for monitoring when a resource reference count reached zero. In one embodiment, each or some resource types can have their own loading/unloading policy. Process 350 illustrates different types of resources (e.g., audio clips, textures, models, prefabs, shaders/shader programs, scenes, and serialized structures) and the corresponding unloading policy that is applicable.

Process 350 can provide a particular order for the resource types to be considered for unloading, such as audio being the first resource type eligible for unloading due to its large file size and relative low gameplay impact as compared to other resource types (e.g., lower in the order illustrated in FIG. 3E) which can have a larger gameplay impact and/or smaller size (e.g., prefab). Process 350 also calculates memory pressure, determines whether the memory pressure is above a particular threshold, and determines whether the resource is referenced, prior to applying the unload policies (by type). In one or more embodiments, the functions, thresholds, order for the resource types to be considered for unloading, and/or unload policies described in process 350 can be adjusted (e.g., by the gaming platform 180 and/or the end user device 105) according to one or more of various factors, such as network conditions, end user device capabilities, quality of service metrics, type of video game being played, location of player in the video game map, quality of service metrics, and so forth. For instance, the memory pressure threshold may be increased where network conditions are providing for slower downloads while the unload policy for an audio clip may have its access time decreased where the player is in a location of the map where memory requirements/usage are generally higher (e.g., many other players are present). In one embodiment, these adjustments to the functions, thresholds, order for the resource types to be considered for unloading, and/or unload policies described in process 350 can be performed dynamically, such as based on measurements being made by the end user device 105 and/or the gaming platform 180 (or other devices), and can be implemented at a particular end user device or across a group of devices (e.g., numerous end user devices utilizing a same network to play the same video game).

While for purposes of simplicity of explanation, the respective processes are shown and described as a series of blocks in FIGS. 2B, 3A, 3B, 3D and 3E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In one or more embodiments, a virtualized communication network can be utilized in whole or in part to perform various functions and aspects described herein. In particular a virtualized communication network can be used to implement some or all of the subsystems and functions of system 100, as well as aspects of FIGS. 2A-3E. For example, a virtualized communication network can facilitate in whole or in part managing NFT digital assets associated with one or more video games (e.g., a transfer exchange); providing an exchange for transaction of the NFT digital assets; streaming video gaming data on-demand as a player moves around a map in a browser-based video game; predicting player movement based on various criteria including trajectory, historical movements, objects of interest so that adjacent gaming canvass can be pre-loaded (in whole or in part) prior to the player reaching that particular location; prioritizing downloading of particular objects according to various parameters including player distance, object type, and/or object size to facilitate quality of experience and resource usage; and/or performing unloading of objects based on various criteria including memory pressure, reference counting and/or access time to facilitate quality of experience and resource usage.

For example, cloud networking architecture can utilize a transport layer, a virtualized network function cloud and/or one or more cloud computing environments. As another example, the virtualized communication network can employ virtual network elements (VNEs) that perform some or all of the functions of network elements 150, 152, 154, 156, such as providing Network Function Virtualization Infrastructure (NFVI) or infrastructure that is capable of being directed with software and Software Defined Networking (SDN) protocols to perform a network functions and services. This infrastructure can include several types of substrates such as servers that support Network Function Virtualization (NFV). For instance, edge routers can be implemented via VNEs composed of NFV software modules, merchant silicon, and/or associated controllers. Other network elements such as other routers, switches, edge caches, and middle-boxes can be instantiated from the common resource pool.

The virtualized network function cloud can interface with the transport layer to provide VNEs to provide specific NFVs by leveraging cloud operations, applications, and architectures to support networking workloads, such as VNEs employing network function software that provides either a one-for-one mapping of traditional network element function or alternately some combination of network functions designed for cloud computing. For example, VNEs can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. The cloud computing environments can interface with the virtualized network function cloud via APIs.

Figure 4:
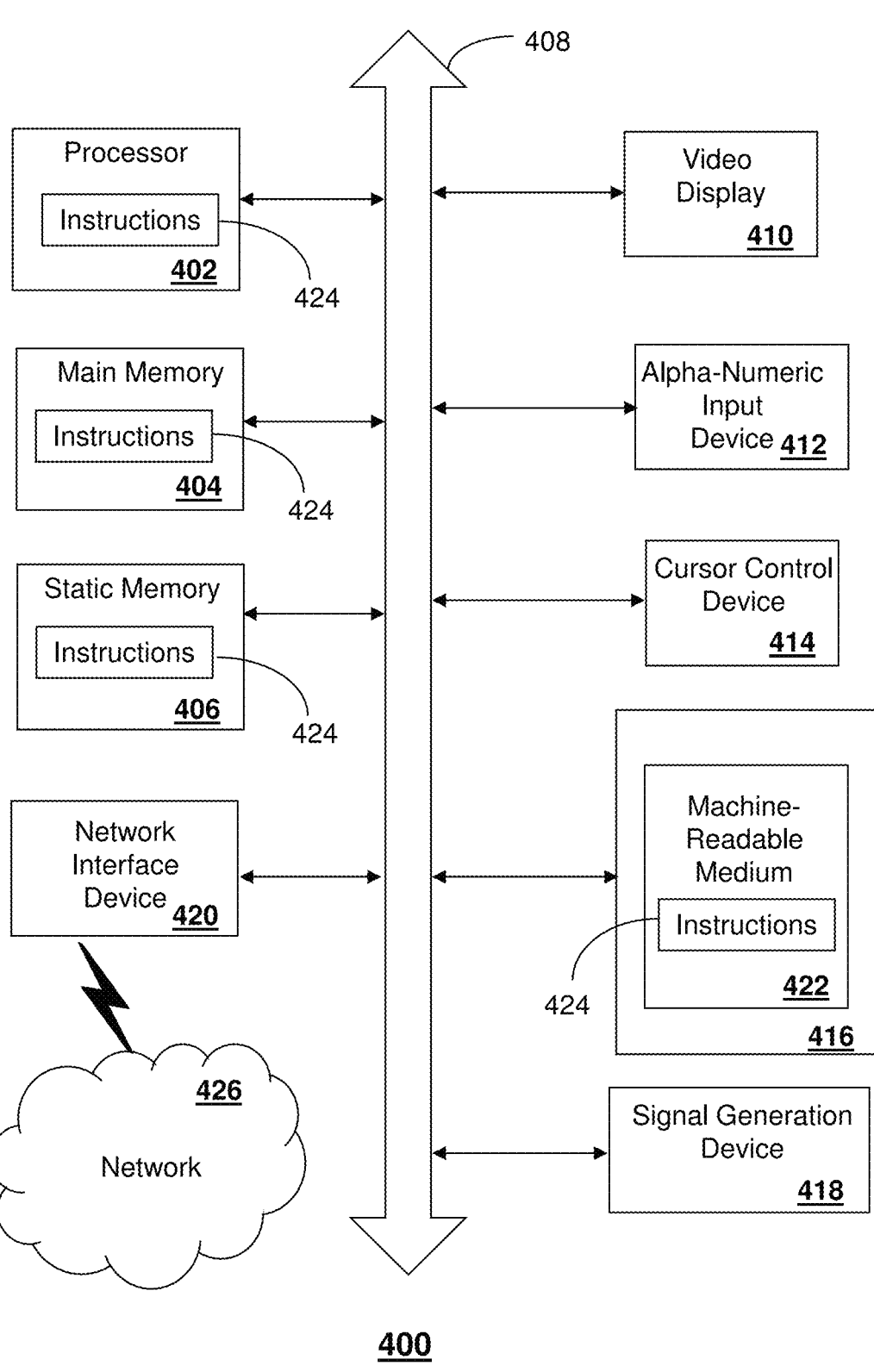
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of devices of system 100, as well as computing devices and hardware utilized in connection with FIGS. 2A-3E, such as end user devices, gaming platforms, exchange platforms, content delivery networks, blockchain nodes, blockchain platforms, network elements, access terminals, base station or access points, switching devices, media terminals, and/or VNEs. Each of these devices can be implemented via computer-executable instructions that can run on one or more computers, and/or in combination with other program modules and/or as a combination of hardware and software. For example, computing environment 400 can facilitate in whole or in part managing NFT digital assets associated with one or more video games (e.g., a transfer exchange); providing an exchange for transaction of the NFT digital assets; streaming video gaming data on-demand as a player moves around a map in a browser-based video game; predicting player movement based on various criteria including trajectory, historical movements, objects of interest so that adjacent gaming canvass can be pre-loaded (in whole or in part) prior to the player reaching that particular location; prioritizing downloading of particular objects according to various parameters including player distance, object type, and/or object size to facilitate quality of experience and resource usage; and/or performing unloading of objects based on various criteria including memory pressure, reference counting and/or access time to facilitate quality of experience and resource usage.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

FIG. 4 depicts an exemplary diagrammatic representation of a machine in the form of a computer system 400 within which a set of instructions, when executed, may cause the machine to perform any one or more of the functions, processes, or methods described above. One or more instances of the machine can operate, for example, as the devices associated with FIGS. 1-3E. In some embodiments, the machine may be connected (e.g., using a network 426) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 400 may include a processor (or controller) 402 (e.g., a central processing unit (CPU), a graphics processing unit (GPU, or both), a main memory 404 and a static memory 406, which communicate with each other via a bus 408. The computer system 400 may further include a display unit 410 (e.g., a liquid crystal display (LCD), a flat panel, or a solid-state display. The computer system 400 may include an input device 412 (e.g., a keyboard), a cursor control device 414 (e.g., a mouse), a disk drive unit 416, a signal generation device 418 (e.g., a speaker or remote control) and a network interface device 420. In distributed environments, the embodiments described in the subject disclosure can be adapted to utilize multiple display units 410 controlled by two or more computer systems 400. In this configuration, presentations described by the subject disclosure may in part be shown in a first of the display units 410, while the remaining portion is presented in a second of the display units 410.

The disk drive unit 416 may include a tangible computer-readable storage medium 422 on which is stored one or more sets of instructions (e.g., software 424) embodying any one or more of the methods or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 422 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (nonvolatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and ITP) represent examples of the state of the art. Such standards are from time-to-time superseded by faster or more efficient equivalents having essentially the same functions. Wireless standards for device detection (e.g., RFID), short-range communications (e.g., Bluetooth, Wi-Fi, ZigBee), and long-range communications (e.g., WiMAX, GSM, CDMA, LTE) can be used by computer system 400.

The computer 400 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, abed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

In one embodiment, a mobile network platform can be provided such as utilizing network elements 150, 152, 154, 156, and/or VNEs. For example, mobile platform can facilitate in whole or in part managing NFT digital assets associated with one or more video games (e.g., a transfer exchange); providing an exchange for transaction of the NFT digital assets; streaming video gaming data on-demand as a player moves around a map in a browser based video game; predicting player movement based on various criteria including trajectory, historical movements, objects of interest so that adjacent gaming canvass can be pre-loaded (in whole or in part) prior to the player reaching that particular location; prioritizing downloading of particular objects according to various parameters including player distance, object type, and/or object size to facilitate quality of experience and resource usage; and/or performing unloading of objects based on various criteria including memory pressure, reference counting and/or access time to facilitate quality of experience and resource usage.

In one or more embodiments, the mobile network platform can generate and receive signals transmitted and received by base stations or access points, and can include various components, such as nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform can be included in telecommunications carrier networks, and can be considered carrier-side components as discussed elsewhere herein. Mobile network platform can include CS gateway node(s) which can interface CS traffic received from legacy networks like telephony network(s) (e.g., public switched telephone network (PSTN), or public land mobile network (PLMN)) or a signaling system #7 (SS7) network. CS gateway node(s) can authorize and authenticate traffic (e.g., voice) arising from such networks. Additionally, CS gateway node(s) can access mobility, or roaming, data generated through SS7 network; for instance, mobility data stored in a visited location register (VLR), which can reside in memory. Moreover, CS gateway node(s) interfaces CS-based traffic and signaling and PS gateway node(s). As an example, in a 3GPP UMTS network, CS gateway node(s) can be realized at least in part in gateway GPRS support node(s) (GGSN). It should be appreciated that functionality and specific operation of CS gateway node(s), PS gateway node(s), and serving node(s), is provided and dictated by radio technology(ies) utilized by mobile network platform for telecommunication over a radio access network with other devices, such as a radiotelephone.

In addition to receiving and processing CS-switched traffic and signaling, PS gateway node(s) can authorize and authenticate PS-based data sessions with served mobile devices. Data sessions can comprise traffic, or content(s), exchanged with networks external to the mobile network platform, like wide area network(s) (WANs), enterprise network(s), and service network(s), which can be embodied in local area network(s) (LANs), can also be interfaced with mobile network platform through PS gateway node(s). It is to be noted that WANs and enterprise network(s) can embody, at least in part, a service network(s) like IP multimedia subsystem (IMS). Based on radio technology layer(s) available in technology resource(s) or radio access network, PS gateway node(s) can generate packet data protocol contexts when a data session is established; other data structures that facilitate routing of packetized data also can be generated. To that end, in an aspect, PS gateway node(s) can comprise a tunnel interface (e.g., tunnel termination gateway (TTG) in 3GPP UMTS network(s) (not shown)) which can facilitate packetized communication with disparate wireless network(s), such as Wi-Fi networks.

In one embodiment, mobile network platforms can include serving node(s) that, based upon available radio technology layer(s) within technology resource(s) in the radio access network, convey the various packetized flows of data streams received through PS gateway node(s). It is to be noted that for technology resource(s) that rely primarily on CS communication, server node(s) can deliver traffic without reliance on PS gateway node(s); for example, server node(s) can embody at least in part a mobile switching center. As an example, in a 3GPP UMTS network, serving node(s) can be embodied in serving GPRS support node(s) (SGSN).

For radio technologies that exploit packetized communication, server(s) in mobile network platform can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform. Data streams (e.g., content(s) that are part of a voice call or data session) can be conveyed to PS gateway node(s) for authorization/authentication and initiation of a data session, and to serving node(s) for communication thereafter. In addition to application server, server(s) can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform to ensure network's operation and data integrity in addition to authorization and authentication procedures that CS gateway node(s) and PS gateway node(s) can enact. Moreover, provisioning server(s) can provision services from external network(s) like networks operated by a disparate service provider, for instance, WAN or Global Positioning System (GPS) network(s) (not shown). Provisioning server(s) can also provision coverage through networks associated to mobile network platform (e.g., deployed and operated by the same service provider), such as distributed antennas networks that enhance wireless service coverage by providing more network coverage.

It is to be noted that server(s) can comprise one or more processors configured to confer at least in part the functionality of mobile network platform. To that end, the one or more processor can execute code instructions stored in memory, for example. It is should be appreciated that server(s) can comprise a content manager, which operates in substantially the same manner as described hereinbefore.

In one embodiment, memory can store information related to operation of mobile network platform. Other operational information can comprise provisioning information of mobile devices served through mobile network platform, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory can also store information from at least one of telephony network(s), WAN, SS7 network, or enterprise network(s). In an aspect, memory can be, for example, accessed as part of a data store component or as a remotely connected memory store.

In order to provide a context for the various aspects of the disclosed subject matter, the mobile platform can provide a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 5:
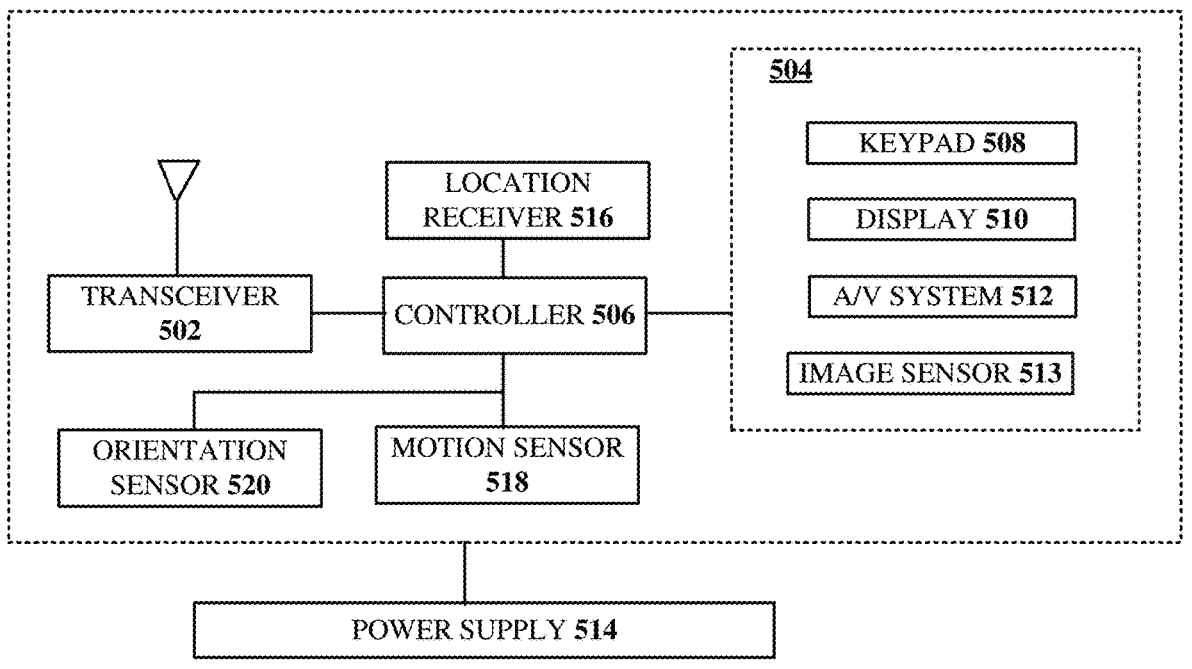
FIG. 5 is a block diagram of an example, non-limiting embodiment of a communication device in accordance with various aspects described herein.

Turning now to FIG. 5, an illustrative embodiment of a communication device 500 is shown. The communication device 500 can serve as an illustrative embodiment of devices associated with FIGS. 1-4 such as end user device 105, gaming platform 180, exchange platform 190, CDN 170. For example, computing device 500 can facilitate in whole or in part managing NFT digital assets associated with one or more video games (e.g., a transfer exchange); providing an exchange for transaction of the NFT digital assets; streaming video gaming data on-demand as a player moves around a map in a browser-based video game; predicting player movement based on various criteria including trajectory, historical movements, objects of interest so that adjacent gaming canvass can be pre-loaded (in whole or in part) prior to the player reaching that particular location; prioritizing downloading of particular objects according to various parameters including player distance, object type, and/or object size to facilitate quality of experience and resource usage; and/or performing unloading of objects based on various criteria including memory pressure, reference counting and/or access time to facilitate quality of experience and resource usage.

The communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface having graphical user interface (GUI) elements that can be selected by a user with a touch of a finger. The display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable communications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, nonvolatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ $=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Figures 6A, 6B:
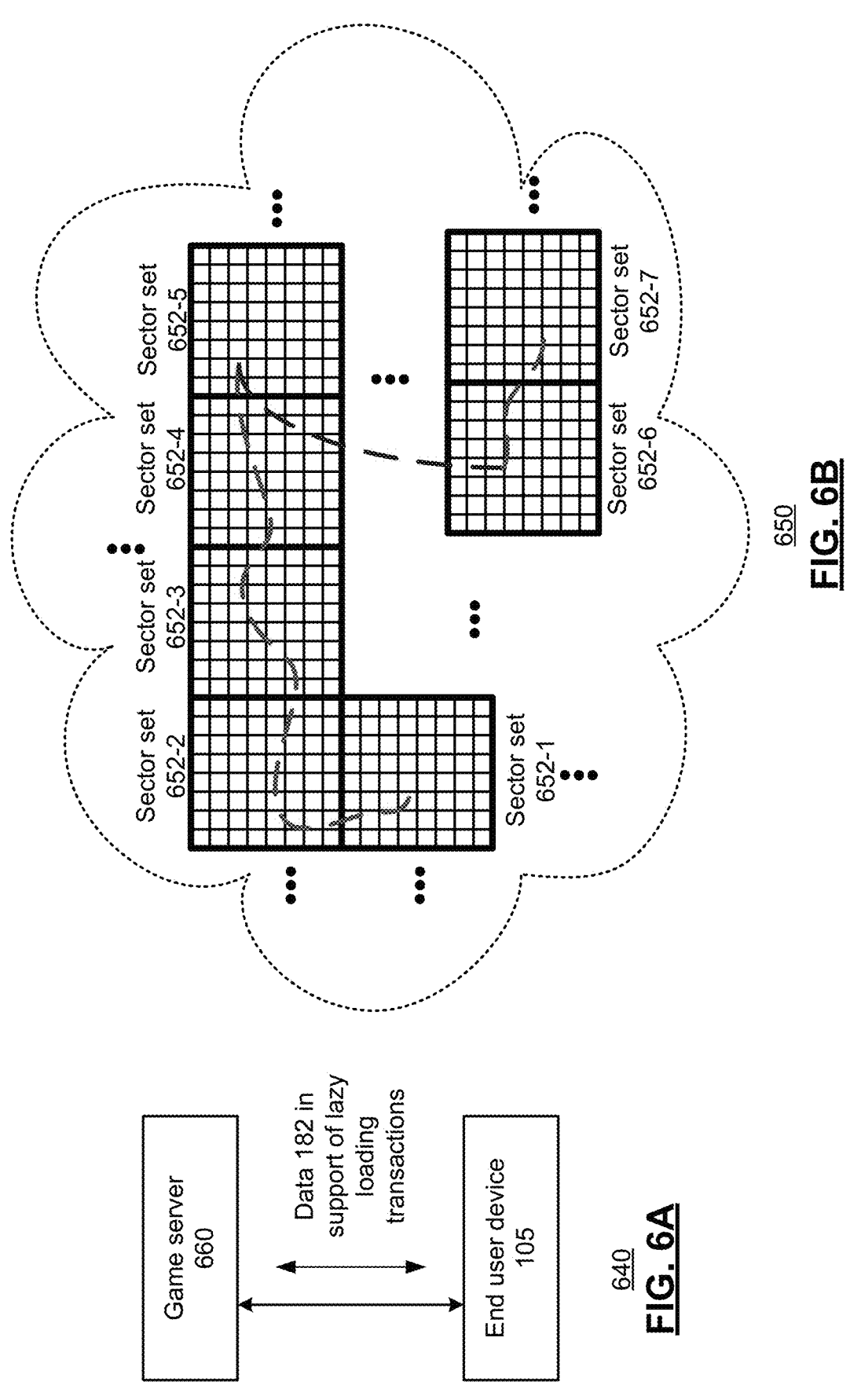
FIG. 6A depicts a block diagram representation of an illustrative embodiment of a system in accordance with various aspects described herein.
FIG. 6B is a block diagram illustrating an exemplary, non-limiting embodiment of a map of a video game world in accordance with various aspects described herein.

FIG. 6A depicts a block diagram representation of an illustrative embodiment of a system in accordance with various aspects described herein. A system 640 is shown that can be implemented with one or more devices previously described. In particular, game server 660 can be an edge node, server or other component of game platform 180 and provide support for streaming of video gaming data on-demand. In various examples, game server 660 can transmit and receive various data 182 in support of lazy loading transactions that provide the end user device 105 with support browser-based gaming that facilitates rendering the video game via the browser on the display of the end user device. For example, game server 660 can facilitate or otherwise provide video gaming data to the end user device 105 such that not all of the gaming data needs to be downloaded before the video game starts (e.g., the user has control over the player in the video game), and instead is lazy loaded on a realtime basis as the data is needed. As used herein, "lazy loading" refers to the practice of delaying load or initialization of resources or objects until they're actually needed to improve performance and save system resources.

In the example shown, some of the data 182 may be retrieved as needed from other content servers for lazy loading to the end user device via the game server 660 and/or directly to the end user device. Furthermore, the game server 660 provides single server support to uninterrupted play of the video game via the end user device for an entire session of the video game via the player. When a user enters (or re-enters) the game, a particular game server 660 is associated to the session based on such factors as availability, geography, the number of other game sessions the game server 660 is currently supporting for other users, and/or other load balancing considerations. Once assigned to particular end user device 105, the game server 660 provides dedicated (single game server) support to that particular end user device until the sessions ends. This improves the technology of online video gaming systems by avoiding game delays and interruptions that would otherwise be associated with swapping servers that support a particular end user device 105 during a session of game play.

FIG. 6B is a block diagram illustrating an exemplary, non-limiting embodiment of a map 650 in a video game world in accordance with various aspects described herein. In the example shown, individual sectors (e.g. gaming canvasses) of the map of a video game world are represented by grid squares and further organized into sets of sectors (sector sets 652-1, 652-2, . . . 652-7). Each set of sectors is a grid of 64 sectors. While shown as squares in of a two-dimensional map, these sectors couple be implemented via hexagons or other polygonal shapes, cubes or other three-dimensional regions in a three-dimensional game world or n-dimensional shapes in an n-dimensional virtual world.

In various examples, the map is a borderless map of a video game world that facilitates addition of other gaming canvasses to the plurality of gaming canvasses to expand the video game world. The other gaming canvasses that are added can be contiguous and/or non-contiguous to the original gaming canvasses. In the example shown, the sectors of sector sets 652-1, 652-2, . . . 652-5 form a contiguous grouping that promote the contiguous travel of a player on a path through particular sectors of these sets as represented in red. While sector sets 652-6 and 652-7 form an overall grouping of contiguous sectors with each other, they are non-contiguous with sector sets 652-1, 652-2, . . . 652-5. In the example shown, the play has "teleported" from a sector in sector set 652-5 to a sector of sector set 652-6 (as represented in blue) and continued travel along the path shown in green.

Figure 6C:
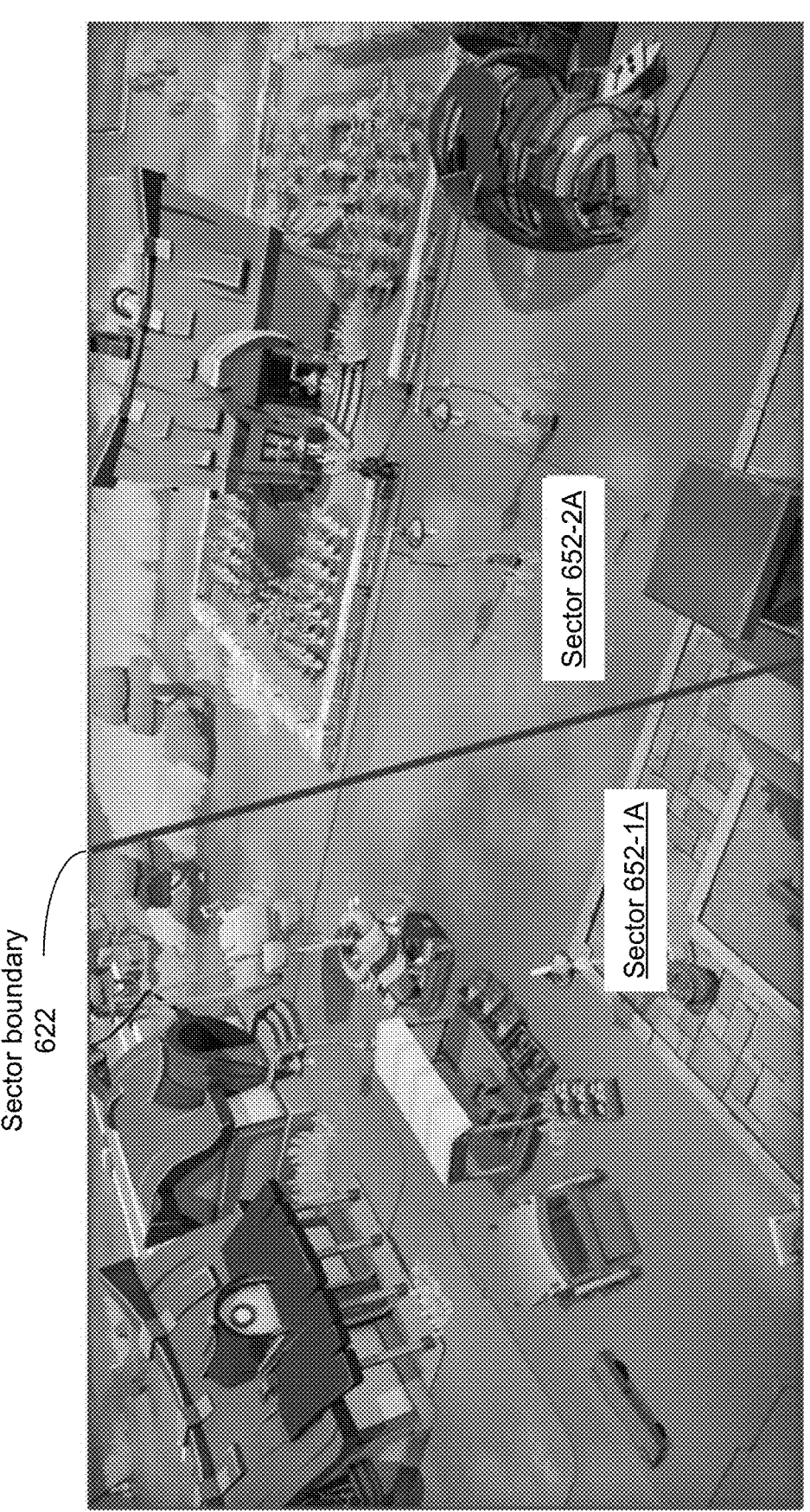
FIG. 6C is a pictorial diagram illustrating an example, non-limiting embodiment of a screen display in accordance with various aspects described herein.

FIG. 6C is a pictorial diagram illustrating an example, non-limiting embodiment of a screen display in accordance with various aspects described herein. In particular, a screen display is shown that represents a portion of a map of a video game world. In the example shown, the portion of the map spans positions of two sectors (e.g. game canvasses)—sector 652-1A of a sector set 652-1 and sector 652-2A of a sector set 652-2A along the sector boundary 622 as shown as a line in red.

FIG. 6D depicts an illustrative embodiment of a method in accordance with various aspects described herein. In particular, a method 600-1 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 602-1 includes providing, by a processing system of a single game server including a processor over a network to an end user device via, first video gaming data associated with a first gaming canvass of a plurality of gaming canvasses of a video game, wherein each of the plurality of gaming canvasses is a sector of a map of the video game, and wherein the first video gaming data facilitates playing of the video game via the end user device.

Step 604-1 includes providing, via a lazy loading over the network to the end user device, at least a portion of second video gaming data associated with a second gaming canvass, wherein the second gaming canvass is selected from among the plurality of gaming canvasses according to a predicting of movement of a player, wherein the second gaming canvass is another sector of the map adjacent to the first gaming canvass, wherein the providing the at least a portion of the second video gaming data occurs prior to the player entering the second gaming canvass, wherein the second video gaming data facilitates playing of the video game via the end user device and wherein the single game server supports uninterrupted play of the video game via the end user device for an entire session of the video game via the player.

In addition or in the alternative to any of the foregoing, the video game is a massive multiplayer online (MMO) game.

In addition or in the alternative to any of the foregoing, the map of the video game is a borderless map in a video game world and wherein the borderless map facilitates addition of other gaming canvasses to the plurality of gaming canvasses to expand the video game world.

In addition or in the alternative to any of the foregoing, the other gaming canvasses are contiguous to the plurality of gaming canvasses.

In addition or in the alternative to any of the foregoing, the other gaming canvasses are non-contiguous to the plurality of gaming canvasses.

In addition or in the alternative to any of the foregoing, the method further comprises: providing a game engine over the network to an end user device that further facilitates playing of the video game via the end user device.

In addition or in the alternative to any of the foregoing, the game engine further facilitates playing of the video game via a browser of the end user device.

FIG. 6E depicts an illustrative embodiment of a method in accordance with various aspects described herein. In particular, a method 600-2 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 602-2 includes receiving, over a network via a single game server, first video gaming data associated with a first gaming canvass of a plurality of gaming canvasses of a video game, wherein each of the plurality of gaming canvasses is a sector of a map of the video game. Step 604-2 includes executing the video game in a browser of the end user device based at least in part on the first video gaming data. Step 606-2 includes receiving user input at a user interface of the end user device associated with controlling movement of a player in the first gaming canvass.

Step 608-2 includes lazy loading, over the network, at least a portion of second video gaming data associated with a second gaming canvass, wherein the receiving the at least a portion of the second video gaming data occurs prior to the player entering the second gaming canvass, wherein the second gaming canvass is selected from among the plurality of gaming canvasses according to a predicting of movement of the player, wherein the second gaming canvass is another sector of the map adjacent to the first gaming canvass. Step 610-2 includes continuing executing the video game in the browser of the end user device based at least in part on the second video gaming data, wherein the single game server supports uninterrupted play of the video game via the end user device for an entire session of the video game via the player.

In addition or in the alternative to any of the foregoing, the operations further comprise: receiving, over the network from the single game server, a game engine that further facilitates playing of the video game via the end user device.

In addition or in the alternative to any of the foregoing, the game engine further facilitates playing of the video game via a browser of the end user device.

In addition or in the alternative to any of the foregoing, the map of the video game is a borderless map in a video game world and wherein the borderless map facilitates addition of other gaming canvasses to the plurality of gaming canvasses to expand the video game world.

In addition or in the alternative to any of the foregoing, the other gaming canvasses are contiguous to the plurality of gaming canvasses.

In addition or in the alternative to any of the foregoing, the other gaming canvasses are non-contiguous to the plurality of gaming canvasses.

In addition or in the alternative to any of the foregoing, a predicted time is estimated for when the player will enter the second gaming canvass, wherein the lazy loading is based on the predicted time.

FIG. 6F depicts an illustrative embodiment of a method in accordance with various aspects described herein. In particular, a method 600-3 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 602-3 includes receiving, over a network via a single game server, first video gaming data associated with a first gaming canvass of a plurality of gaming canvasses of a video game without receiving a remainder of video gaming data that is not associated with the first gaming canvass, wherein each of the plurality of gaming canvasses is a sector of a map of the video game. Step 604-3 includes executing the video game in a browser of the end user device based at least in part on the first video gaming data. Step 606-3 includes receiving user input at a user interface of the end user device associated with controlling movement of a player in the first gaming canvass.

Step 608-3 includes receiving, over the network via the second game server, second video gaming data associated with a second gaming canvass that is another sector of the map adjacent to the first gaming canvass, wherein the receiving the second video gaming data occurs prior to the player entering the second gaming canvass. Step 610-3 includes lazy loading, over the network, resources associated with chunks of a portion of the second video gaming data. Step 612-3 includes continuing executing the video game in the browser of the end user device based at least in part on the second video gaming data and the resources, wherein the single game server supports uninterrupted play of the video game via the end user device for an entire session of the video game via the player.

In addition or in the alternative to any of the foregoing, the video game is a massive multiplayer online (MMO) game.

In addition or in the alternative to any of the foregoing, the map of the video game is a borderless map in a video game world and wherein the borderless map facilitates addition of other gaming canvasses to the plurality of gaming canvasses to expand the video game world.

In addition or in the alternative to any of the foregoing, the other gaming canvasses are contiguous to the plurality of gaming canvasses.

In addition or in the alternative to any of the foregoing, the other gaming canvasses are non-contiguous to the plurality of gaming canvasses.

In addition or in the alternative to any of the foregoing, the resources include one or more of: audio clips, textures, models, prefabs, shader programs, scenes, or serialized structures.

Figure 7A:
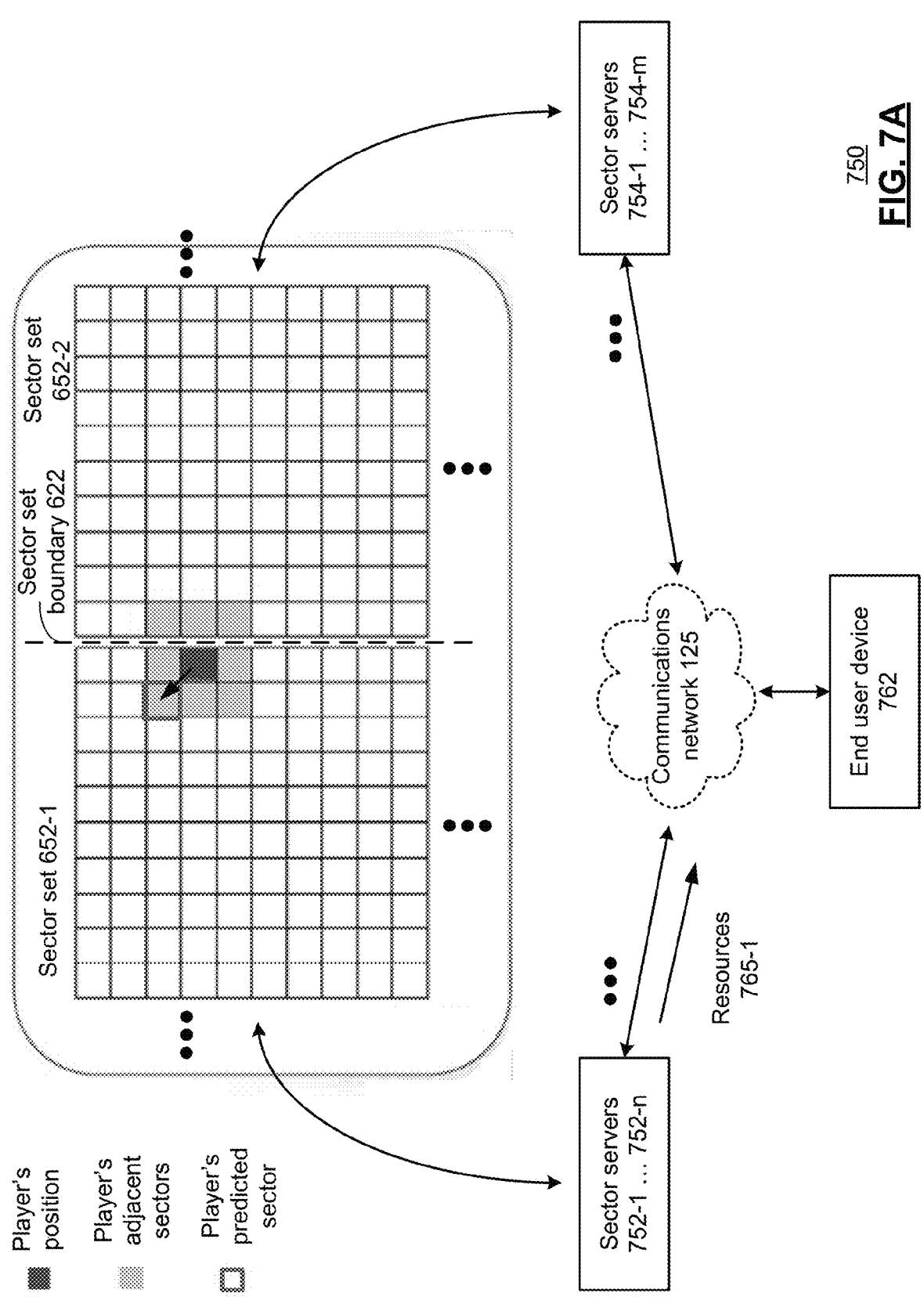
FIGS. 7A and 7B depict an illustrative embodiment of a system in accordance with various aspects described herein.
Figure 7B:
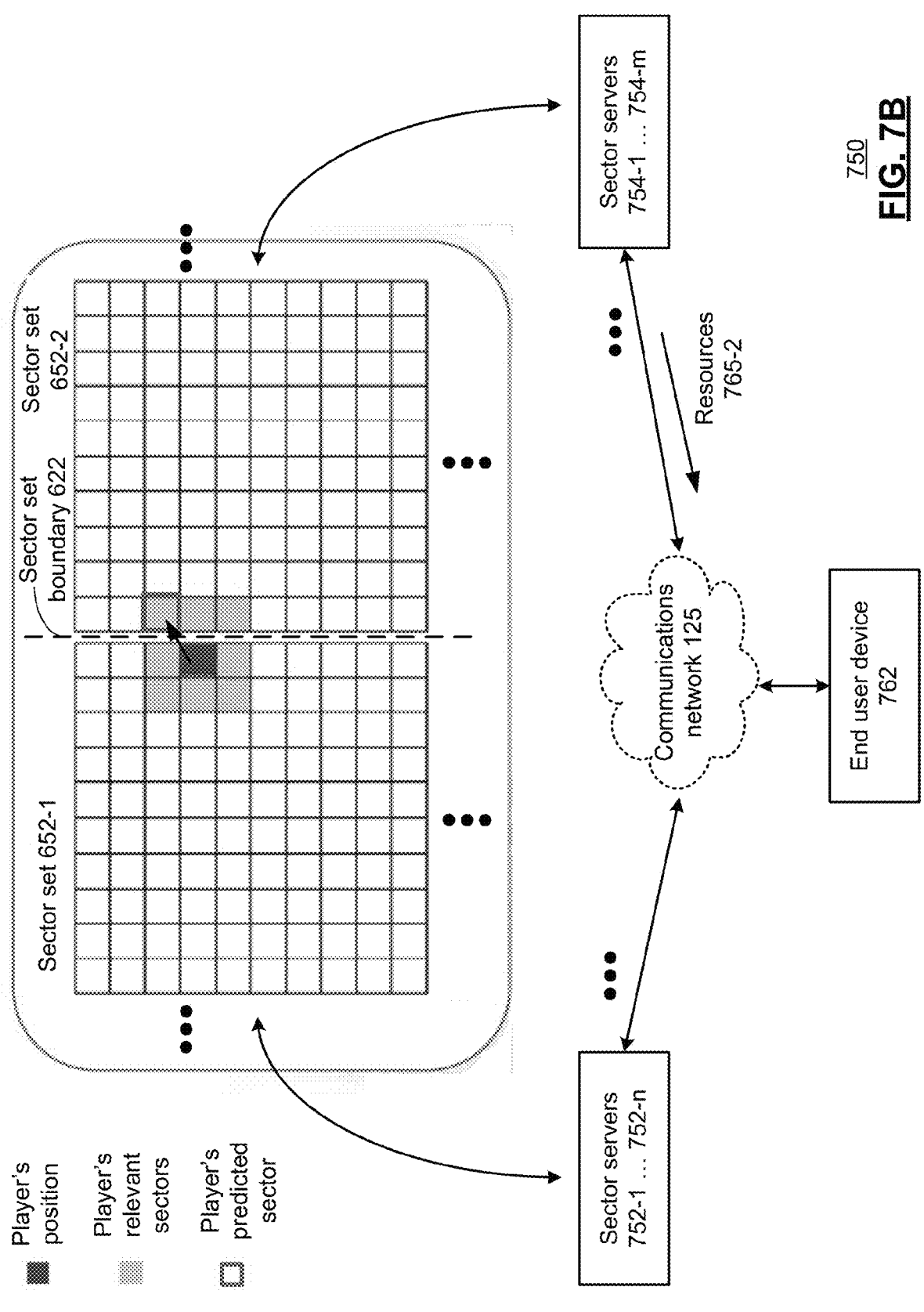

FIGS. 7A and 7B depict an illustrative embodiment of a system in accordance with various aspects described herein. Is particular a system 750 is shown that includes a communications network 125, that can operate in conjunction with a game server such as game server 660 for example, that provides video gaming data to an end user device, such as end user device 105 such that not all of the gaming data needs to be downloaded before the video game starts (e.g., the user has control over the player in the video game), and instead is provided on a realtime basis as the data is needed. Furthermore, n sector servers (752-1 . . . 752-n) are dedicated to provided resources associated with sectors of sector set 652-1. Similarly, m sector servers (754-1 . . . 754-m) are dedicated to provided resources associated with sectors of sector set 652-2. Providing individual server support, dedicated to providing resources associated with separate regions of the game map, improves the technology of online video gaming systems by promoting scalability when additions are made to the map of the game, as the number of players are added to the game, to promote load balancing among sector servers and allocation of section servers based on historical use of particular map regions.

In the example shown in FIG. 7A, the player's position (currently) in the sector of sector set 652-1 is indicated in red and the end user device 762 has received the necessary video gaming data for that sector. It is possible that player motion in the game may take the player to any of the player's adjacent sectors indicated in light green. Three of these adjacent sectors are in sector set 652-2 and the remaining 5 of these adjacent sectors are in sector set 652-1. When the predicted movement player indicates, as shown, that the player is heading toward a particular sector of sector set 652-1—indicated by the blue square indicated as player's predicted sector—resources 765-1 associated with that new sector are retrieved from one or more of the sector servers 752-1 . . . 752-*n* that are dedicated to this sector set. As shown in FIG. 7B, When the predicted movement player indicates, as shown, that the player is heading toward a particular sector of sector set 652-2—indicated by the blue square indicated as player's predicted sector—resources 765-2 associated with that new sector are retrieved from one or more of the sector servers 754-1 . . . 754-*m* that are dedicated to this sector set.

It should be noted that, while FIG. 7A and FIG. 7B presents a configuration where the resources from the sector servers are provided over communications network 125 either via a game server such as game server 660 or these resources can be retrieved directly over communications network 125 from the sector servers via lazy loading transactions. Furthermore, while described above as "resources", one skilled in the art will recognize that these resources are provided as data files that correspond to the actual types of resources required by the game.

FIG. 7C depicts an illustrative embodiment of a method in accordance with various aspects described herein. In particular, a method 700-1 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 702-1 includes providing, over a network to an end user device, first video gaming data associated with a first gaming canvass of a first plurality of gaming canvasses of a video game, wherein the first gaming canvass is a first sector of a map of the video game associated with a first set of sectors, wherein the first video gaming data facilitates playing of the video game via the end user device and wherein the first video gaming data includes resources received from a first sector server dedicated to providing resources of the first set of sectors.

Step 704-1 includes providing, over the network to the end user device, at least a portion of second video gaming data associated with a second gaming canvass, wherein the second gaming canvass is selected from among the plurality of gaming canvasses according to a predicting of movement of a player, wherein the second gaming canvass is second sector of the map adjacent to the first gaming canvass, wherein the providing the at least a portion of the second video gaming data occurs prior to the player entering the second gaming canvass, wherein the second video gaming data facilitates playing of the video game via the end user device, wherein, when the second sector is included in the first set of sectors, the second video gaming data is received from the first sector server, and wherein, when the second sector is not included in the first set of sectors, the second video gaming data is received from a second sector server dedicated to providing resources of a second set of sectors that includes the second sector.

In addition or in the alternative to any of the foregoing, the video game is a massive multiplayer online (MMO) game.

In addition or in the alternative to any of the foregoing, the map of the video game is a borderless map in a video game world and wherein the borderless map facilitates addition of other gaming canvasses to the plurality of gaming canvasses to expand the video game world.

In addition or in the alternative to any of the foregoing, the other gaming canvasses are contiguous to the plurality of gaming canvasses.

In addition or in the alternative to any of the foregoing, the other gaming canvasses are non-contiguous to the plurality of gaming canvasses.

In addition or in the alternative to any of the foregoing, the method further comprises: providing a game engine over the network to an end user device that further facilitates playing of the video game via the end user device.

In addition or in the alternative to any of the foregoing, the game engine further facilitates playing of the video game via a browser of the end user device.

FIG. 7D depicts an illustrative embodiment of a method in accordance with various aspects described herein. In particular, a method 700-2 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 702-2 includes receiving, over a network, first video gaming data associated with a first gaming canvass of a plurality of gaming canvasses of a video game, wherein each of the plurality of gaming canvasses is a sector of a map of the video game and wherein the map of the video game is a borderless map in a video game world, wherein the first video gaming data includes resources received via the gaming server from a first sector server dedicated to providing resources of a first set of sectors of the map. Step

704-2 includes executing the video game in a browser of the end user device based at least in part on the first video gaming data. Step 706-2 includes receiving user input at a user interface of the end user device associated with controlling movement of a player in the first gaming canvass.

Step 708-2 includes lazy loading, over the network, at least a portion of second video gaming data associated with a second gaming canvass corresponding to another sector of the map, wherein the receiving the at least a portion of the second video gaming data occurs prior to the player entering the second gaming canvass, wherein the second gaming canvass is selected from among the plurality of gaming canvasses according to a predicting of movement of the player, wherein the second video gaming data includes first resources received from the first sector server when the another sector is one of the set of first sectors and wherein the second video gaming data includes resources received from a second sector server dedicated to providing resources of a second set of sectors of the map when the another sector is one of the set of second sectors. Step 710-2 includes continuing executing the video game in the browser of the end user device based at least in part on the second video gaming data.

In addition or in the alternative to any of the foregoing, the operations further comprise: receiving, over the network, a game engine that further facilitates playing of the video game via the end user device.

In addition or in the alternative to any of the foregoing, the game engine further facilitates playing of the video game via a browser of the end user device.

In addition or in the alternative to any of the foregoing, the map of the video game is a borderless map in a video game world and wherein the borderless map facilitates addition of other gaming canvasses to the plurality of gaming canvasses to expand the video game world.

In addition or in the alternative to any of the foregoing, the other gaming canvasses are contiguous to the plurality of gaming canvasses.

In addition or in the alternative to any of the foregoing, the other gaming canvasses are non-contiguous to the plurality of gaming canvasses.

In addition or in the alternative to any of the foregoing, a predicted time is estimated for when the player will enter the second gaming canvass, wherein the lazy loading is based on the predicted time.

FIG. 7E depicts an illustrative embodiment of a method in accordance with various aspects described herein. In particular, a method 700-3 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 702-3 includes receiving, over a network, first video gaming data associated with a first gaming canvass of a plurality of gaming canvasses of a video game without receiving a remainder of video gaming data that is not associated with the first gaming canvass, wherein the first gaming canvass is a first sector of a map of the video game associated with a first set of sectors, wherein the first video gaming data facilitates playing of the video game via the end user device and wherein the first video gaming data includes resources received from a first sector server dedicated to providing resources of the first set of sectors. Step 704-3 includes executing the video game in a browser of the end user device based at least in part on the first video gaming data. Step 706-3 includes receiving user input at a user interface of the end user device associated with controlling movement of a player in the first gaming canvass.

Step 708-3 includes receiving, over the network from the game server, second video gaming data associated with a second gaming canvass of a second sector of the map adjacent to the first gaming canvass, wherein receiving the second video gaming data occurs prior to the player entering the second gaming canvass. Step 710-3 includes when the second sector is included in the first set of sectors: sending, over the network to the first sector server, a single request for resources associated with chunks of a portion of the second video gaming data; and receiving, over the network via the first sector server, bundled resources that were obtained in real-time by the game server in response to the single request.

Step 712-3 includes, when the second sector is not included in the first set of sectors: sending, over the network to a second sector server dedicated to providing resources of a second set of sectors that includes the second sector, a single request for resources associated with chunks of a portion of the second video gaming data; and receiving, over the network from the second sector server, bundled resources that were obtained in real-time by the game server in response to the single request. Step 714-3 includes continuing executing the video game in the browser of the end user device based at least in part on the second video gaming data and the bundled resources.

In addition or in the alternative to any of the foregoing, the first server is one of a plurality of first servers dedicated to providing the first gaming canvass.

In addition or in the alternative to any of the foregoing, the second server is one of a plurality of second servers dedicated to providing the second gaming canvass.

In addition or in the alternative to any of the foregoing, the video game is a massive multiplayer online (MMO) game and wherein usage of the plurality of first servers is managed via a load balancing prediction associated with play of the MMO game by a plurality of players.

In addition or in the alternative to any of the foregoing, the load balancing prediction is generated via an artificial intelligence (AI) model.

In addition or in the alternative to any of the foregoing, the resources include one or more of: audio clips, textures, models, prefabs, shader programs, scenes, or serialized structures.

FIG. 8A depicts an illustrative embodiment 850 of a process and memory in accordance with various aspects described herein. In the example shown, portions of lazy loaded video game data 852, such as data 182, are stored in a cache 854 of an end user device 762. As previously discussed, a geography/position of the player on a map of the game can be used to determine data to be downloaded (e.g. lazy loaded) to the end user device 762 and stored in the cache 854. From time to time, based on memory pressure, the end user device 762, engages in unloading of video game data 856. In addition or in the alternative to the unloading criteria previously discussed, a geography/position of the player on a map of the game can also be used to determine data to be unloaded from the end user device 762. This improves the technology of online gaming systems by intelligently unloading unnecessary data from the end user device to provide room for new data to be loaded.

FIG. 8B depicts an illustrative embodiment of a method in accordance with various aspects described herein. In particular, a method 800-1 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 802-1 includes providing, by a processing system including a processor over a network to an end user device, first video gaming data associated with a first gaming canvass of a plurality of gaming canvasses of a video game without providing a remainder of video gaming data that is not associated with the first gaming canvass, wherein each of the plurality of gaming canvasses is a sector of a map of the video game, wherein the first video gaming data enables commencing playing the video game in a browser of the end user device.

Step 804-1 includes providing, via a lazy loading by the processing system over the network to the end user device, second video gaming data associated with a second gaming canvass that is another sector of the map adjacent to the first gaming canvass, wherein the providing the second video gaming data commences prior to a player entering the second gaming canvass, wherein the second video gaming data facilitates playing of the video game in the browser of the end user device, and wherein the second video gaming data comprises static objects and dynamic objects and wherein unloading of the first video gaming data and the second video gaming data from a cache of the end user device is based on a memory pressure calculation for the end user device and a position of the player on the map.

In addition or in the alternative to any of the foregoing, the first video gaming data stored in the cache includes static object data associated with a static object, and wherein the static object data is prioritized for unloading based on a distance between the static object to the position of the player on the map.

In addition or in the alternative to any of the foregoing, the first video gaming data includes first static object data associated with a first static object having a first distance from the position of the player on the map is prioritized for unloading sooner than a second static object having a second distance from the position of the player on the map when the first distance is greater than the second distance.

In addition or in the alternative to any of the foregoing, unloading of the video gaming data is further based on reference counting of resources associated with the static and dynamic objects.

In addition or in the alternative to any of the foregoing, unloading of the video gaming data is further based on access times for the static and dynamic objects.

In addition or in the alternative to any of the foregoing, unloading of the video gaming data is further based on unloading policies assigned to a resource type.

In addition or in the alternative to any of the foregoing, the video game is a massive multiplayer online (MMO) game.

In addition or in the alternative to any of the foregoing, the map of the video game is a borderless map in a video game world and wherein the borderless map facilitates addition of other gaming canvasses to the plurality of gaming canvasses to expand the video game world.

FIG. 8C depicts an illustrative embodiment of a method in accordance with various aspects described herein. In particular, a method 800-2 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 802-2 includes receiving, over a network from a server, first video gaming data associated with a plurality of gaming canvasses of a video game, wherein each of the plurality of gaming canvasses is a sector of a map of the video game, wherein the first video gaming data is stored in a cache. Step 804-2 includes executing the video game via the end user device based at least in part on the first video gaming data. Step 806-2 includes receiving user input at a user interface of the end user device associated with controlling movement of a player in a first gaming canvass of the plurality of canvasses.

Step 808-2 includes predicting, based on the movement of the player in the first gaming canvass, a movement of the player to a second gaming canvass, wherein the second gaming canvass is different from the first gaming canvass. Step 810-2 includes determining, prior to the player entering the second gaming canvass, that a portion of the first video gaming data is associated with the second gaming canvass and retrieving, prior to the player entering the second gaming canvass, the portion of the first video gaming data associated with the second gaming canvass from the cache when the portion of the first video gaming data is associated with the second gaming canvass. Step 812-2 includes lazy loading second video gaming data over the network from the server and prior to the player entering the second gaming canvass, when the first video gaming data is not associated with the second gaming canvass and storing the second video gaming data in the cache.

Step 814-2 includes continuing executing the video game via the end user device based at least in part on the second video gaming data. Step 816-2 includes unloading of the cache based on a memory pressure calculation for the end user device and further based on a position of the player on the map.

In addition or in the alternative to any of the foregoing, the first video gaming data stored in the cache includes static object data associated with a static object, and wherein the static object data is prioritized for unloading based on a distance between the static object to the position of the player on the map.

In addition or in the alternative to any of the foregoing, the first video gaming data includes first static object data associated with a first static object having a first distance from the position of the player on the map is prioritized for unloading sooner than a second static object having a second distance from the position of the player on the map when the first distance is greater than the second distance.

In addition or in the alternative to any of the foregoing, unloading of the video gaming data is further based on reference counting of resources associated with static and dynamic objects.

In addition or in the alternative to any of the foregoing, unloading of the video gaming data is further based on access times for the static and dynamic objects.

In addition or in the alternative to any of the foregoing, unloading of the video gaming data is further based on unloading policies assigned to a resource type.

FIG. 8D depicts an illustrative embodiment of a method in accordance with various aspects described herein. In particular, a method 800-3 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 802-3 includes receiving, over a network, first video gaming data associated with a first gaming canvass of a plurality of gaming canvasses of a video game without receiving a remainder of video gaming data that is not associated with the first gaming canvass, wherein each of the plurality of gaming canvasses is a sector of a map of the video game, wherein the first video game data is stored in a cache. Step 804-3 includes executing the video game in a browser based at least in part on the first video gaming data. Step 806-3 includes receiving user input at the user interface associated with controlling movement of a player in the first gaming canvass.

Step 808-3 includes receiving, over the network, second video gaming data associated with a second gaming canvass that is another sector of the map adjacent to the first gaming canvass, wherein the receiving the second video gaming data occurs prior to the player entering the second gaming canvass and wherein the second video gaming data is stored in the cache. Step 810-3 includes continuing executing the video game in the browser of the end user device based at least in part on the second video gaming data. Step 812-3 includes unloading of the cache based on a position of the player on the map.

In addition or in the alternative to any of the foregoing, the first video gaming data stored in the cache includes static object data associated with a static object, and wherein the static object data is prioritized for unloading based on a distance between the static object to the position of the player on the map.

In addition or in the alternative to any of the foregoing, the first video gaming data includes first static object data a first static object having a first distance from the position of the player on the map is prioritized for unloading sooner than a second static object having a second distance from the position of the player on the map when the first distance is greater than the second distance.

In addition or in the alternative to any of the foregoing, unloading of the video gaming data is further based on reference counting of resources associated with static and dynamic objects.

In addition or in the alternative to any of the foregoing, unloading of the video gaming data is further based on access times for the static and dynamic objects.

In addition or in the alternative to any of the foregoing, unloading of the video gaming data is further based on unloading policies assigned to a resource type.

FIGS. 9A-9D depict an illustrative embodiment of a process between a game server and an end user device in accordance with various aspects described herein. A portion of a system 950 is shown. As previously discussed, manifest files can be shared with an end user device. For example, a manifest file can identify a hash mapping of a video game or a particular canvas(ses) of the video game. This improves the technology of online gaming systems by allowing an end user device to, in conjunction with a manifest file, check locally first to see if it has the hash or chunk stored already and then can obtain out-of-date resources as needed. This improves the technology of online gaming systems whereby manifest files can be pushed to the end user device so the game client can obtain resource(s) (e.g., new tree) and does not need to leave game or cause a server restart. In one embodiment, manifest files can be pushed to and/or pulled by the game client according to various triggers (e.g., periodically, gaming events, location of a player in a game, the distance to a new gaming canvass, etc.).

Figures 9A, 9B, 9C, 9D:
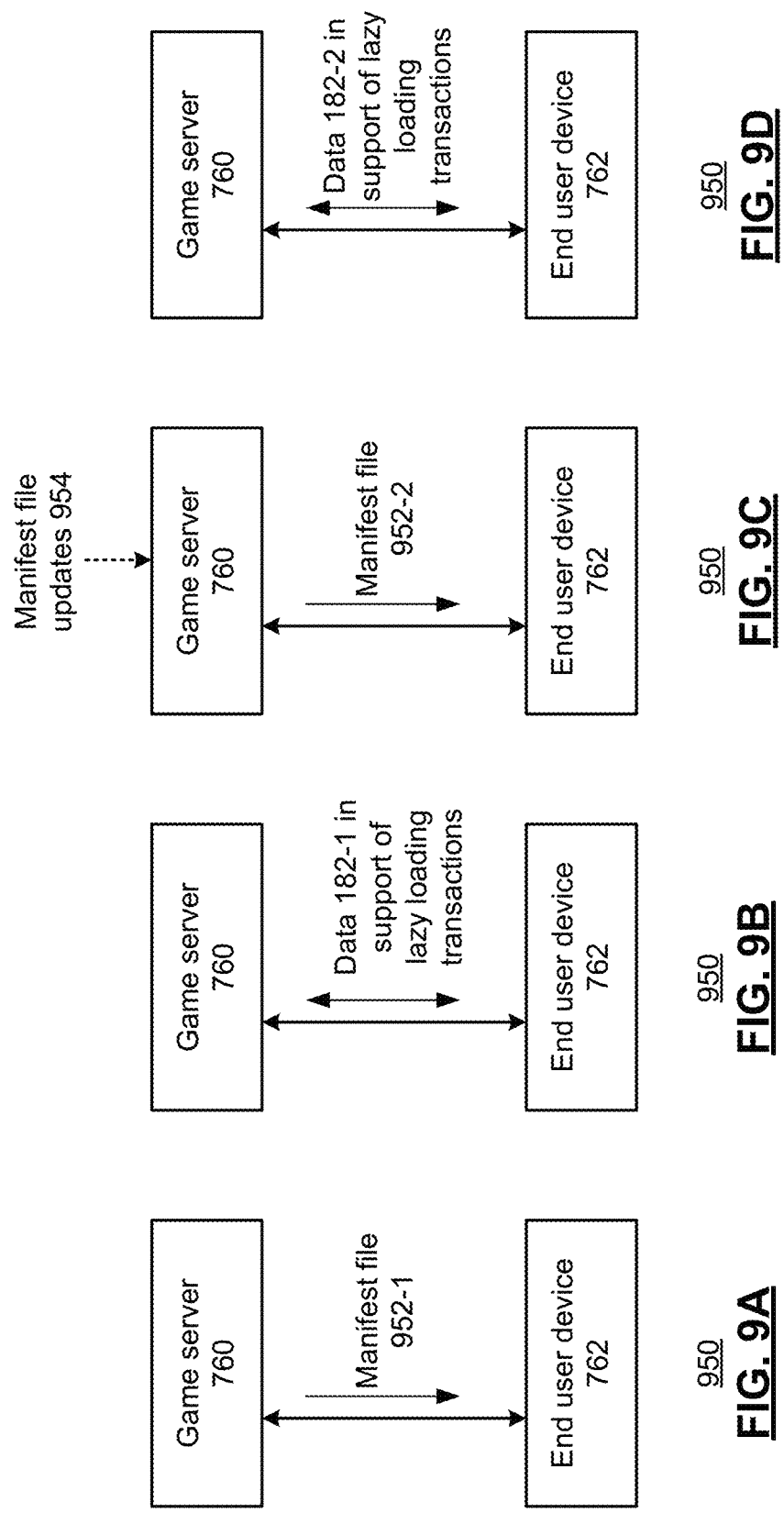
FIGS. 9A-9D depict an illustrative embodiment of a process between a game server and an end user device in accordance with various aspects described herein.

In FIG. 9A, the end user device 762 receives a manifest file 952-1 from a game server 760, such as a game server 660, edge node or other component of game platform 180 or content data network 170. In FIG. 9B, the end user device 762 engages in lazy loading via data 182-2 in support of lazy loading transaction and based on the manifest file 962-1. In FIG. 9C, the end user device 762 receives another manifest file 952-2, that could be based on a new location in the game and/or be based on manifest file updates 954 to updated assets/resources. In FIG. 9D, the end user device 762 engages in lazy loading via data 182-2 in support of lazy loading transaction and based on the manifest file 962-1.

In various examples, each manifest file can indicate with current versions of a plurality of the game data files (e.g. resources or other assets). In addition to checking cache for assets, a manifest file can be checked to determine if newer version of an asset needs to be lazy loaded (even if cached).

Manifest file can be split into multiple files, for example, by location in the game, by geographical location of an end user device in the real world, by resource or asset type, and/or simply based on size. In various examples, you may have an en-gb.manifest file and a resources.manifest file. In various examples, for end user devices in China, the china-.manifest file for a "Creature A" points to a panda bear, but in europe.manifest "Creature A" points to a regular bear. Since the client in China only knows about the china.manifest file it'll just lazy load the panda bear without ever having to download the regular bear and vice versa for the European clients.

In various examples, game location based manifest files can be provided (within regions of the game). If a player enters a cave/dungeon these assets may never be visible in the open world, and therefore don't need to clutter up the manifest file(s) for other players. Instead these references and versions can be stored in a manifest file that is specific to this area in the game and, for example, is provided only to the players that need it.

Furthermore, as game assets/resources are updated, updated manifest files can be pushed to the end user device. The permits artists involved with game creation, development and/or updating to add to world and/or to change assets in real-time. These asset changes can then be recoded as new versions in an updated manifest that can be pushed to the players while they are playing. Lazy loading allows changes to be made without reloading the game but also the server. So assets can be reloaded without the player needing to reload the client and without needing to reconnect to the game, or the server needing to restart.

FIG. 9E depicts an illustrative embodiment of a method in accordance with various aspects described herein. In particular, a method 900-1 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 902-1 includes receiving, over a network from a server, at least one manifest file associated with a plurality of resources of a video game. Step 904-1 includes lazy loading, over the network and based on the at least one manifest file, first video gaming data associated with first resources of a plurality of gaming canvasses of the video game, wherein each of the plurality of gaming canvasses is a sector of a map of the video game and wherein the first video gaming data is stored in a cache. Step 906-1 includes executing the video game via the end user device based at least in part on the first video gaming data.

Step 908-1 includes receiving user input at a user interface of the end user device associated with controlling movement of a player in a first gaming canvass of the plurality of gaming canvasses. Step 910-1 includes predicting, based on the movement of the player in the first gaming canvass, a movement of the player to a second gaming canvass, wherein the second gaming canvass is different from the first gaming canvass. Step 912-1 includes determining, prior to the player entering the second gaming canvass, that resources of the second gaming canvass are included in the first resources Step 914-1 includes determining, based on the at least one manifest file and prior to the player entering the second gaming canvass, that a portion of the first video gaming data associated with at least one of the resources of the second gaming canvass has been superseded by an updated resource. Step 916-1 includes receiving, over the network and prior to the player entering the second gaming canvass, second video gaming data associated with the updated resource when the at least one of the resources of the second gaming canvass has been superseded by the updated resource, wherein the second video gaming data is stored in the cache. Step 918-1 includes continuing executing the video game via the end user device based at least in part on the second video gaming data.

In addition or in the alternative to any of the foregoing, the operations further include: removing the portion of the first video gaming data associated with the at least one of the resources of the second gaming canvass responsive to determining that the at least one of the resources of the second gaming canvass has been superseded by the updated resource.

In addition or in the alternative to any of the foregoing, the operations further include: determining, based on the manifest file and prior to the player entering the second gaming canvass, that a remaining portion of the resources of the second gaming canvass have not been superseded; and retrieving from the cache, prior to the player entering the second gaming canvass, the portion of the first video gaming data associated with the remaining portion of the resources of the second gaming canvass.

In addition or in the alternative to any of the foregoing, the operations further include: determining, based on the manifest file and prior to the player entering the second gaming canvass, that none of the resources of the second gaming canvass have been superseded by an updated resource; and retrieving from the cache, prior to the player entering the second gaming canvass, the portion of the first video gaming data associated with the resources of the second gaming canvass when the resources of the second gaming canvass are included in the first resources and none of the resources of the second gaming canvass have been superseded by an updated resource.

In addition or in the alternative to any of the foregoing, the at least one manifest file includes a plurality of manifest files corresponding to a plurality of resource types.

In addition or in the alternative to any of the foregoing, the plurality of resource types include one or more of: audio clips, textures, models, prefabs, shader programs, scenes, or serialized structures.

In addition or in the alternative to any of the foregoing, the at least one manifest file includes a plurality of manifest files generated by splitting a larger manifest file.

In addition or in the alternative to any of the foregoing, the at least one manifest file includes a plurality of manifest files corresponding to a plurality of game regions.

Figure 9F:
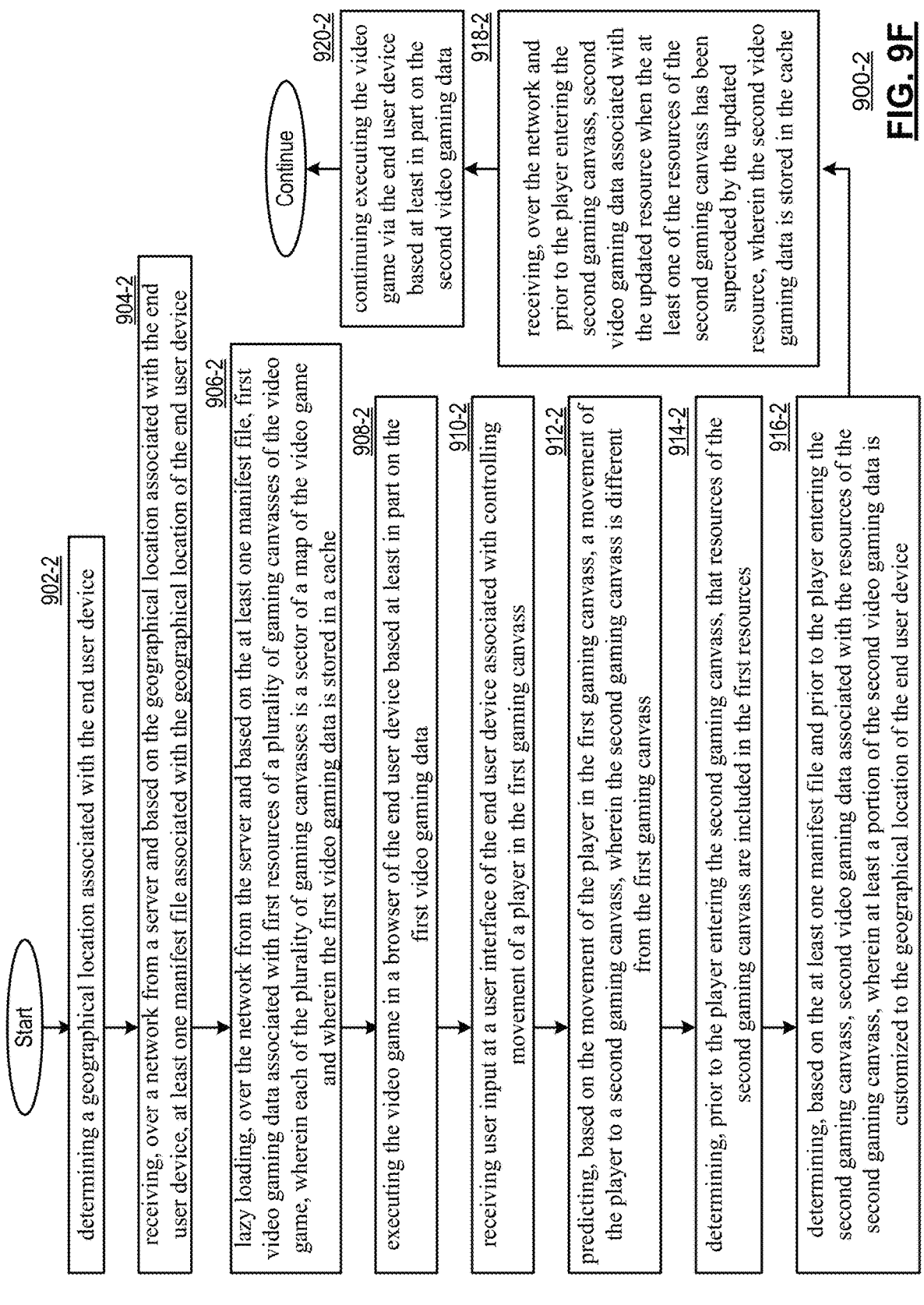
FIG. 9F depicts an illustrative embodiment of a method in accordance with various aspects described herein.

FIG. 9F depicts an illustrative embodiment of a method in accordance with various aspects described herein. In particular, a method 900-2 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 902-2 includes determining a geographical location associated with the end user device. Step 904-2 includes receiving, over a network from a server and based on the geographical location associated with the end user device, at least one manifest file associated with the geographical location of the end user device. Step 906-2 includes lazy loading, over the network and based on the at least one manifest file, first video gaming data associated with first resources of a plurality of gaming canvasses of the video game, wherein each of the plurality of gaming canvasses is a sector of a map of the video game, and wherein the first video gaming data is stored in a cache.

Step 908-2 includes executing the video game via the end user device based at least in part on the first video gaming data. Step 910-2 includes receiving user input at a user interface of the end user device associated with controlling movement of a player in a first gaming canvass of the plurality of gaming canvasses. Step 912-2 includes predicting, based on the movement of the player in the first gaming canvass, a movement of the player to a second gaming canvass, wherein the second gaming canvass is different from the first gaming canvass;

Step 914-2 includes determining, prior to the player entering the second gaming canvass, that resources of the second gaming canvass are not included in the first resources. Step 916-2 includes determining, based on the at least one manifest file and prior to the player entering the second gaming canvass, second video gaming data associated with the resources of the second gaming canvass, wherein at least a portion of the second video gaming data is customized to the geographical location of the end user device. Step 918-2 includes receiving, over the network and prior to the player entering the second gaming canvass, the second video gaming data, wherein the second video gaming data is stored in the cache. Step 920-2 includes continuing executing the video game via the end user device based at least in part on the second video gaming data.

In addition or in the alternative to any of the foregoing, the operations further include: removing the portion of the first video gaming data associated with the at least one of the resources of the second gaming canvass responsive to determining that the at least one of the resources of the second gaming canvass has been superseded by an updated resource.

In addition or in the alternative to any of the foregoing, the operations further include: determining, based on the manifest file and prior to the player entering the second gaming canvass, that a remaining portion of the resources of the second gaming canvass have not been superseded; and retrieving from the cache, prior to the player entering the second gaming canvass, the portion of the first video gaming data associated with the remaining portion of the resources of the second gaming canvass.

In addition or in the alternative to any of the foregoing, the operations further include: determining, based on the manifest file and prior to the player entering the second gaming canvass, that none of the resources of the second gaming canvass have been superseded by an updated resource; and retrieving from the cache, prior to the player entering the second gaming canvass, the portion of the first video gaming data associated with the resources of the second gaming canvass when the resources of the second gaming canvass are included in the first resources and none of the resources of the second gaming canvass have been superseded by an updated resource.

In addition or in the alternative to any of the foregoing, the at least one manifest file includes a plurality of manifest files corresponding to a plurality of resource types.

In addition or in the alternative to any of the foregoing, the plurality of resource types include one or more of: audio clips, textures, models, prefabs, shader programs, scenes, or serialized structures.

Figure 9G:
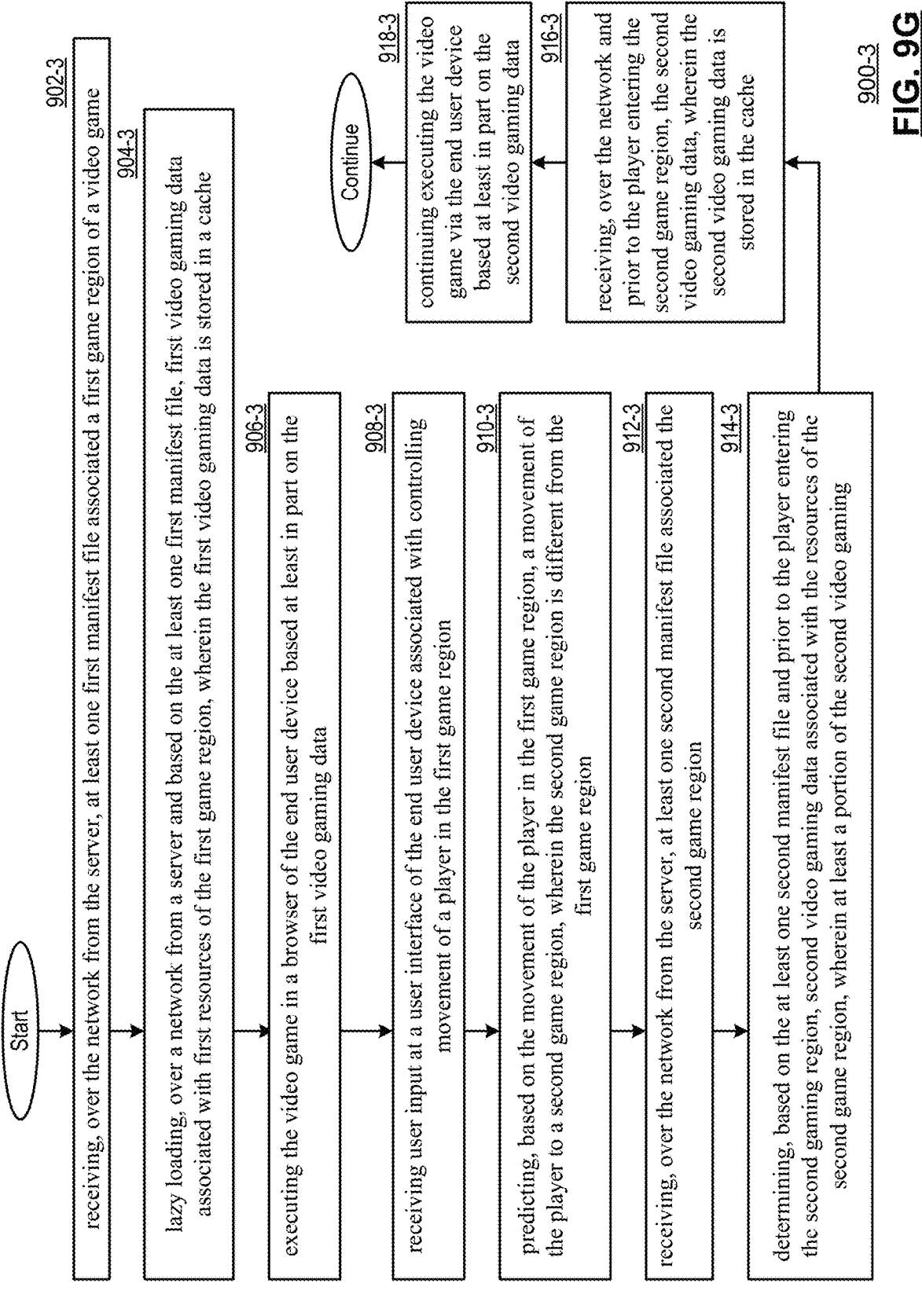
FIG. 9G depicts an illustrative embodiment of a method in accordance with various aspects described herein.

FIG. 9G depicts an illustrative embodiment of a method in accordance with various aspects described herein. In particular, a method 900-3 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 902-3 includes receiving, over a network from a server, at least one first manifest file associated a first game region of a map of a video game. Step 904-3 includes lazy loading, over the network and based on the at least one first manifest file, first video gaming data associated with first resources of the first game region, wherein the first video gaming data is stored in a cache. Step 906-3 includes executing the video game via the end user device based at least in part on the first video gaming data.

Step 908-3 includes receiving user input at a user interface of the end user device associated with controlling movement of a player in the first game region. Step 910-3 includes predicting, based on the movement of the player in the first game region, a movement of the player to a second game region of the map, wherein the second game region is different from the first game region. Step 912-3 includes receiving, over the network from the server, at least one second manifest file associated the second game region.

Step 914-3 includes determining, based on the at least one second manifest file and prior to the player entering the second gaming region, second video gaming data associated with the resources of the second game region, wherein at least a portion of the second video gaming. Step 916-3 includes receiving, over the network and prior to the player entering the second game region, the second video gaming data, wherein the second video gaming data is stored in the cache. Step 918-3 includes continuing executing the video game via the end user device based at least in part on the second video gaming data.

In addition or in the alternative to any of the foregoing, the at least one first manifest file includes a plurality of manifest files corresponding to a plurality of resource types.

In addition or in the alternative to any of the foregoing, the plurality of resource types include one or more of: audio clips, textures, models, prefabs, shader programs, scenes, or serialized structures.

In addition or in the alternative to any of the foregoing, the map of the video game is a borderless map in a video game world and wherein the borderless map facilitates addition of other game regions to expand the video game world.

In addition or in the alternative to any of the foregoing, the other game regions are contiguous to the first game region and the second game region.

In addition or in the alternative to any of the foregoing, the other game regions are non-contiguous to the first game region and the second game region.

Figure 9H:
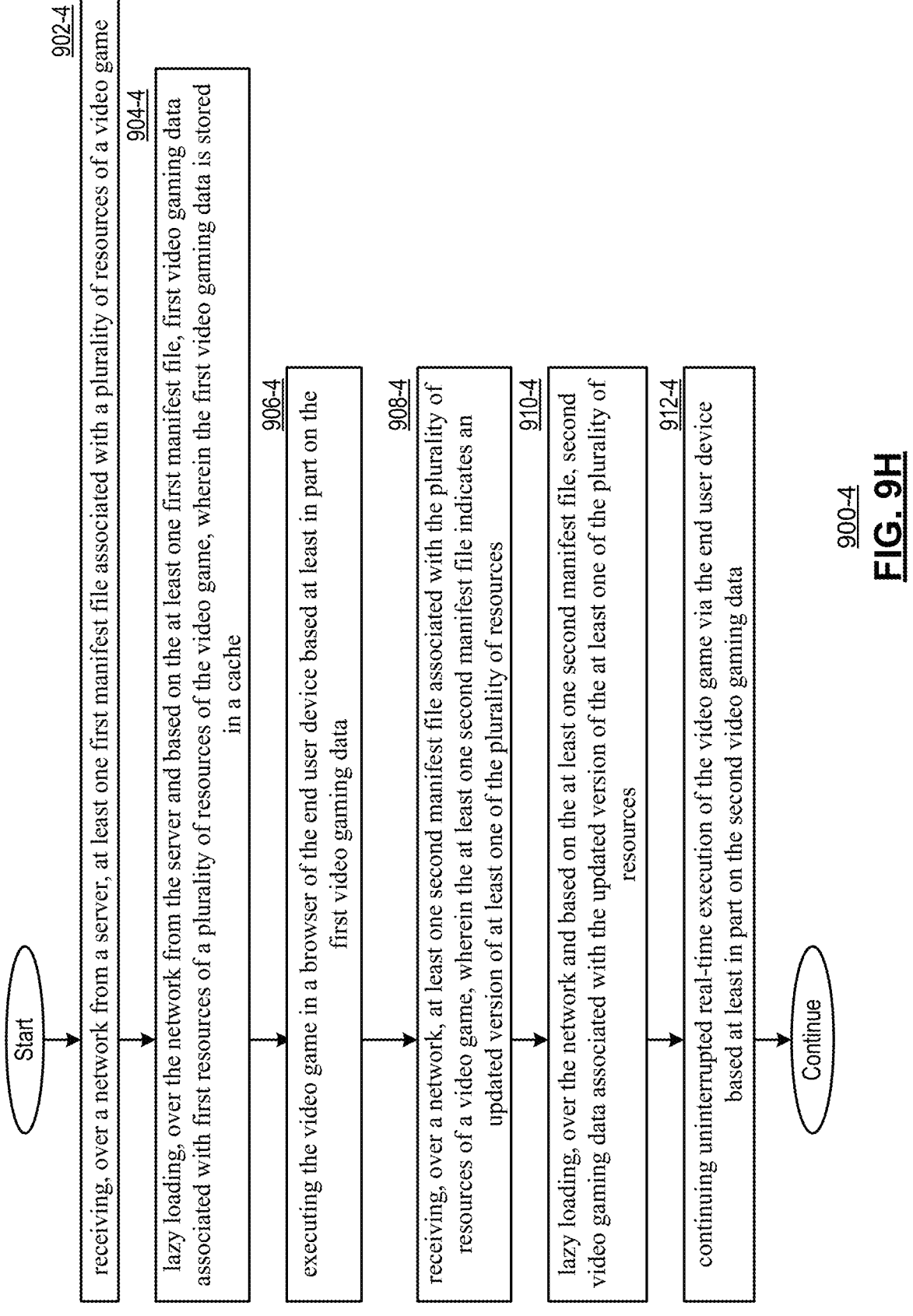
FIG. 9H depicts an illustrative embodiment of a method in accordance with various aspects described herein.

FIG. 9H depicts an illustrative embodiment of a method in accordance with various aspects described herein. In particular, a method 900-4 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 902-4 includes receiving, over a network from a server, at least one first manifest file associated with a plurality of resources of a video game. Step 904-4 includes lazy loading, over the network and based on the at least one first manifest file, first video gaming data associated with first resources of a plurality of resources of the video game, wherein the first video gaming data is stored in a cache. Step 9064 includes executing the video game via the end user device based at least in part on the first video gaming data.

Step 9084 includes receiving, over a network, at least one second manifest file associated with the plurality of resources of a video game, wherein the at least one second manifest file indicates an updated version of at least one of the plurality of resources. Step 910-4 includes lazy loading, over the network and based on the at least one second manifest file, second video gaming data associated with the updated version of the at least one of the plurality of resources. Step 912-4 includes continuing uninterrupted real-time execution of the video game via the end user device based at least in part on the second video gaming data.

In addition or in the alternative to any of the foregoing, the operations further include: receiving user input at a user interface of the end user device associated with controlling movement of a player in a first gaming canvass of a plurality of canvasses;

predicting, based on the movement of the player in the first gaming canvass, a movement of the player to a second gaming canvass, wherein the second gaming canvass is different from the first gaming canvass; determining, prior to the player entering the second gaming canvass, that resources of the second gaming canvass are included in the first resources; determining, based on the at least one second manifest file and prior to the player entering the second gaming canvass, that a portion of the first video gaming data associated with at least one of the resources of the second gaming canvass has been superseded by an updated resource; receiving, over the network from the server and prior to the player entering the second gaming canvass, third video gaming data associated with the updated resource when the at least one of the resources of the second gaming canvass has been superseded by the updated resource; storing the third video gaming data in the cache; and continuing executing the video game via the end user device based at least in part on the third video gaming data.

In addition or in the alternative to any of the foregoing, the predicting is based on a directional vector of the player that is calculated from player movement through the first gaming canvass.

In addition or in the alternative to any of the foregoing, the predicting is based on an object location of an object of interest in the video game.

In addition or in the alternative to any of the foregoing, the predicting is based on historical movement of the player through the first gaming canvass or based on historical movement of other players through the first gaming canvass.

In addition or in the alternative to any of the foregoing, the at least one first manifest file is pushed to the end user device via the server.

In addition or in the alternative to any of the foregoing, the at least one second manifest file is pushed to the end user device in response to creation of the updated version of the at least one of the plurality of resources.

In addition or in the alternative to any of the foregoing, the plurality of resources include one or more of: audio clips, textures, models, prefabs, shader programs, scenes, or serialized structures.

FIG. 9I depicts an illustrative embodiment of a method in accordance with various aspects described herein. In particular, a method 900-5 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 902-5 includes receiving, over a network from a server, at least one first manifest file associated a video game. Step 904-5 includes lazy loading, over the network and based on the at least one first manifest file, first video gaming data associated with first resources of the video game. Step 906-5 includes executing the video game via the end user device based at least in part on the first video gaming data.

Step 908-5 includes receiving, over the network from the server, at least one second manifest file that includes updates to the at least one first manifest file indicating updated resources of the video game. Step 910-5 includes receiving, via a lazy loading over the network, second video gaming data, associated with the updated resources of the video game. Step 912-5 includes continuing uninterrupted real-time execution of the video game via the end user device based at least in part on the second video gaming data.

In addition or in the alternative to any of the foregoing, the at least one first manifest file is pushed to the end user device via the server.

In addition or in the alternative to any of the foregoing, the at least one second manifest file is pushed to the end user device via the server.

In addition or in the alternative to any of the foregoing, the at least one second manifest file is pushed to the end user device in response to creation of an updated version of the at least one of the first resources.

In addition or in the alternative to any of the foregoing, the first resources include one or more of: audio clips, textures, models, prefabs, shader programs, scenes, or serialized structures.

In addition or in the alternative to any of the foregoing, the updated resources include one or more of: audio clips, textures, models, prefabs, shader programs, scenes, or serialized structures.

FIG. 9J depicts an illustrative embodiment of a method in accordance with various aspects described herein. In particular, a method 900-6 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 902-6 includes receiving, over a network via a first push transaction from a server, at least one first manifest file associated a video game. Step 904-6 includes lazy loading, over the network and based on the at least one first manifest file, first video gaming data associated with first resources of the video game. Step 906-6 includes executing the video game via the end user device based at least in part on the first video gaming data.

Step 908-6 includes receiving, over the network via a second push transaction from the server, at least one second manifest file that includes updates to the at least one first manifest file indicating updated resources of the video game. Step 910-6 includes receiving, via a lazy loading over the network, second video gaming data, associated with the updated resources of the video game. Step 912-6 includes continuing uninterrupted real-time execution of the video game via the end user device based at least in part on the second video gaming data.

In addition or in the alternative to any of the foregoing, the first resources include one or more of: audio clips, textures, models, prefabs, shader programs, scenes, or serialized structures.

In addition or in the alternative to any of the foregoing, the updated resources include one or more of: audio clips, textures, models, prefabs, shader programs, scenes, or serialized structures.

In addition or in the alternative to any of the foregoing, the video game is a massive multiplayer online (MMO) game.

In addition or in the alternative to any of the foregoing, the operations further include: providing a game engine over the network to the end user device that further facilitates playing of the video game via a browser of the end user device.

In addition or in the alternative to any of the foregoing, the at least one first manifest file includes a plurality of manifest files corresponding to a plurality of resource types.

Figure 10A:
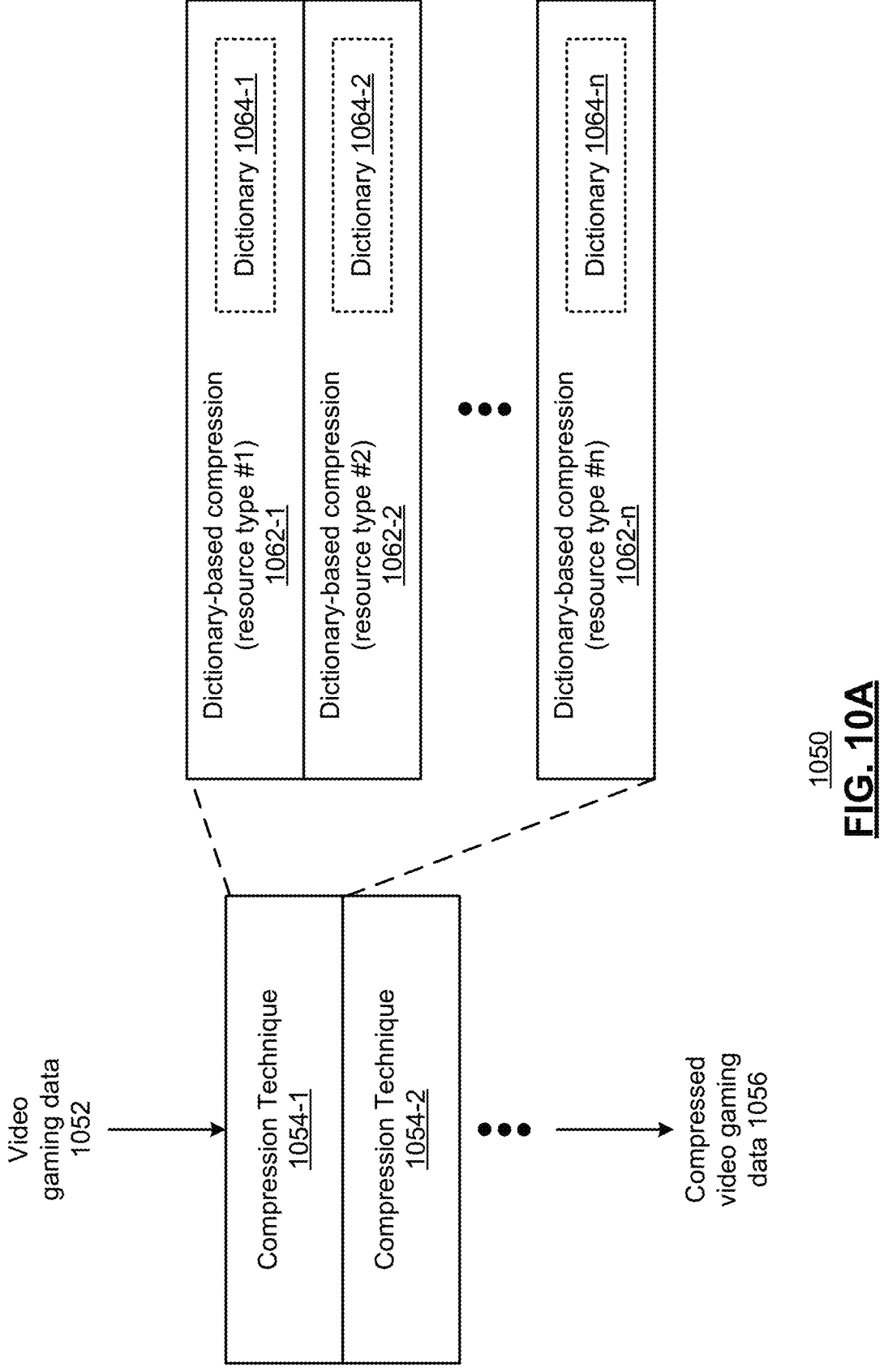
FIG. 10A depicts an illustrative embodiment of a compression process in accordance with various aspects described herein.

FIG. 10A depicts an illustrative embodiment of a compression process in accordance with various aspects described herein. In particular, a process 1050 is shown where video gaming data, is compressed by a plurality of compression techniques 1054-1, 1054-2 . . . in order to generate compressed video gaming data 1056 such as portions of data 182. For example, compression techniques 1054-1 can correspond to dictionary-based compressions, 1062-1, 1062-2, . . . 1062-$n$ that utilizes customized dictionaries 1064-1, 1064-2, . . . 1064-$n$ to compress data corresponding resource types 1, 2, . . . n. Compression technique 1054-1 can correspond to zip file compression or other (non-dictionary based) compression methodology.

In this fashion, dictionary-based compression can be applied across many different types of assets/file types to leverage common elements in differing resource types. Furthermore, the types of resources to be dictionary-compressed can be selected as the subset of all resource types where dictionary-based compression provides the most benefit. So 3D models can have their own dictionary. Furthermore, scene files can be compressed without textures cluttering up the dictionary—expanding its size without pay off of better compression. This improves the technology of online gaming systems by providing greater and more intelligent file compression, lowering the amount of bandwidth required to provide necessary files to an end user device.

FIG. 10B depicts an illustrative embodiment of a method in accordance with various aspects described herein. In particular, a method 1000-1 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 1002-1 includes providing, over a network to an end user device, first video gaming data associated with a first gaming canvass of a plurality of gaming canvasses of a video game representing a plurality of first resources each having a corresponding one of a plurality of resource types, wherein the first video gaming data is compressed utilizing a plurality of compression techniques including a dictionary-based compression having a plurality of different dictionaries each corresponding to one of the plurality of resource types, wherein each of the plurality of gaming canvasses is a sector of a map of the video game, wherein the first video gaming data facilitates playing of the video game via the end user device.

Step 1004-2 includes providing, over the network to the end user device, at least a portion of second video gaming data associated with a second gaming canvass representing a plurality of second resources each having a corresponding one of the plurality of resource types, wherein the second video gaming data is compressed utilizing the plurality of compression techniques including the dictionary-based compression having the plurality of different dictionaries each corresponding to one of the plurality of resource types, wherein the second gaming canvass is selected from among the plurality of gaming canvasses according to a predicting of movement of a player, wherein the second gaming canvass is another sector of the map adjacent to the first gaming canvass, wherein the providing the at least a portion of the second video gaming data occurs prior to the player entering the second gaming canvass, and wherein the second video gaming data facilitates playing of the video game via the end user device.

In addition or in the alternative to any of the foregoing, the method further comprises: providing, over the network, a game engine that further facilitates playing of the video game via the end user device.

In addition or in the alternative to any of the foregoing, the game engine further facilitates playing of the video game via a browser of the end user device.

In addition or in the alternative to any of the foregoing, a predicted time is estimated for when the player will enter the second gaming canvass, wherein the providing the at least a portion of second video gaming data is based on the predicted time.

In addition or in the alternative to any of the foregoing, a commencement of the providing the at least a portion of second video gaming data is selected based on the predicted time.

In addition or in the alternative to any of the foregoing, a data rate of the providing the at least a portion of second video gaming data is selected based on the predicted time.

In addition or in the alternative to any of the foregoing, the video game is a massive multiplayer online (MMO) game.

In addition or in the alternative to any of the foregoing, the plurality of resources types includes one or more of: audio clips, textures, models, prefabs, shader programs, scenes, or serialized structures.

FIG. 10C depicts an illustrative embodiment of a method in accordance with various aspects described herein. In particular, a method 1000-2 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 1002-2 includes receiving, over a network from a server, first video gaming data associated with a first gaming canvass of a plurality of gaming canvasses of a video game representing a plurality of first resources each having a corresponding one of a plurality of resource types, wherein each of the plurality of gaming canvasses is a sector of a map of the video game and wherein the first video gaming data is compressed utilizing a plurality of compression techniques including a dictionary-based compression having a plurality of different dictionaries each corresponding to one of the plurality of resource types. Step 1004-2 includes executing the video game in a browser of the end user device based at least in part on the first video gaming data. Step 1006-2 includes receiving user input at a user interface of the end user device associated with controlling movement of a player in the first gaming canvass.

Step 1008-2 includes lazy loading, over the network, at least a portion of second video gaming data associated with a second gaming canvass, wherein the receiving the at least a portion of the second video gaming data occurs prior to the player entering the second gaming canvass, wherein the second gaming canvass is selected from among the plurality of gaming canvasses according to a predicting of movement of the player, wherein the second gaming canvass is another sector of the map adjacent to the first gaming canvass, and wherein the second video gaming data is compressed utilizing the plurality of compression techniques including the dictionary-based compression having the plurality of different dictionaries each corresponding to one of the plurality of resource types. Step 1010-2 includes continuing executing the video game in the browser of the end user device based at least in part on the second video gaming data.

In addition or in the alternative to any of the foregoing, the operations further comprise: receiving, over the network from the server, a game engine that further facilitates playing of the video game via the end user device.

In addition or in the alternative to any of the foregoing, the game engine further facilitates playing of the video game via a browser of the end user device.

In addition or in the alternative to any of the foregoing, the plurality of resources types includes one or more of: audio clips, textures, models, prefabs, shader programs, scenes, or serialized structures.

In addition or in the alternative to any of the foregoing, the predicting is based on a directional vector of the player that is calculated from player movement through the first gaming canvass.

In addition or in the alternative to any of the foregoing, the predicting is based on an object location of an object of interest in the video game.

FIG. 10D depicts an illustrative embodiment of a method in accordance with various aspects described herein. In particular, a method 1000-3 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 1002-3 includes receiving, over a network, first video gaming data associated with a first gaming canvass of a plurality of gaming canvasses of a video game without receiving a remainder of video gaming data that is not associated with the first gaming canvass, wherein each of the plurality of gaming canvasses is a sector of a map of the video game and wherein the first video gaming data is compressed utilizing a plurality of compression techniques including a dictionary-based compression having a plurality of different dictionaries each corresponding to one of a plurality of resource types. Step 1004-3 includes executing the video game in a browser of the end user device based at least in part on the first video gaming data. Step 1006-3 includes receiving user input at a user interface of the end user device associated with controlling movement of a player in the first gaming canvass.

Step 1008-3 includes receiving, over the network, second video gaming data associated with a second gaming canvass that is another sector of the map adjacent to the first gaming canvass, wherein the receiving the second video gaming data occurs prior to the player entering the second gaming canvass. Step 1010-3 includes lazy loading, over the network, resources associated with chunks of a portion of the second video gaming data, and wherein the resources are compressed utilizing the plurality of compression techniques including the dictionary-based compression having the plurality of different dictionaries each corresponding to one of the plurality of resource types. Step 1012-3 includes continuing executing the video game in the browser of the end user device based at least in part on the second video gaming data and the resources.

In addition or in the alternative to any of the foregoing, wherein the operations further include: receiving, over the network, a game engine that further facilitates playing of the video game via the browser of the end user device.

In addition or in the alternative to any of the foregoing, wherein the plurality of resources types includes one or more of: audio clips, textures, models, prefabs, shader programs, scenes, or serialized structures.

In addition or in the alternative to any of the foregoing, the map of the video game is a borderless map in a video game world and wherein the borderless map facilitates addition of other gaming canvasses to the plurality of gaming canvasses to expand the video game world.

In addition or in the alternative to any of the foregoing, wherein the other gaming canvasses are contiguous to the plurality of gaming canvasses.

In addition or in the alternative to any of the foregoing, wherein the other gaming canvasses are non-contiguous to the plurality of gaming canvasses.

Figures 11A, 11B:
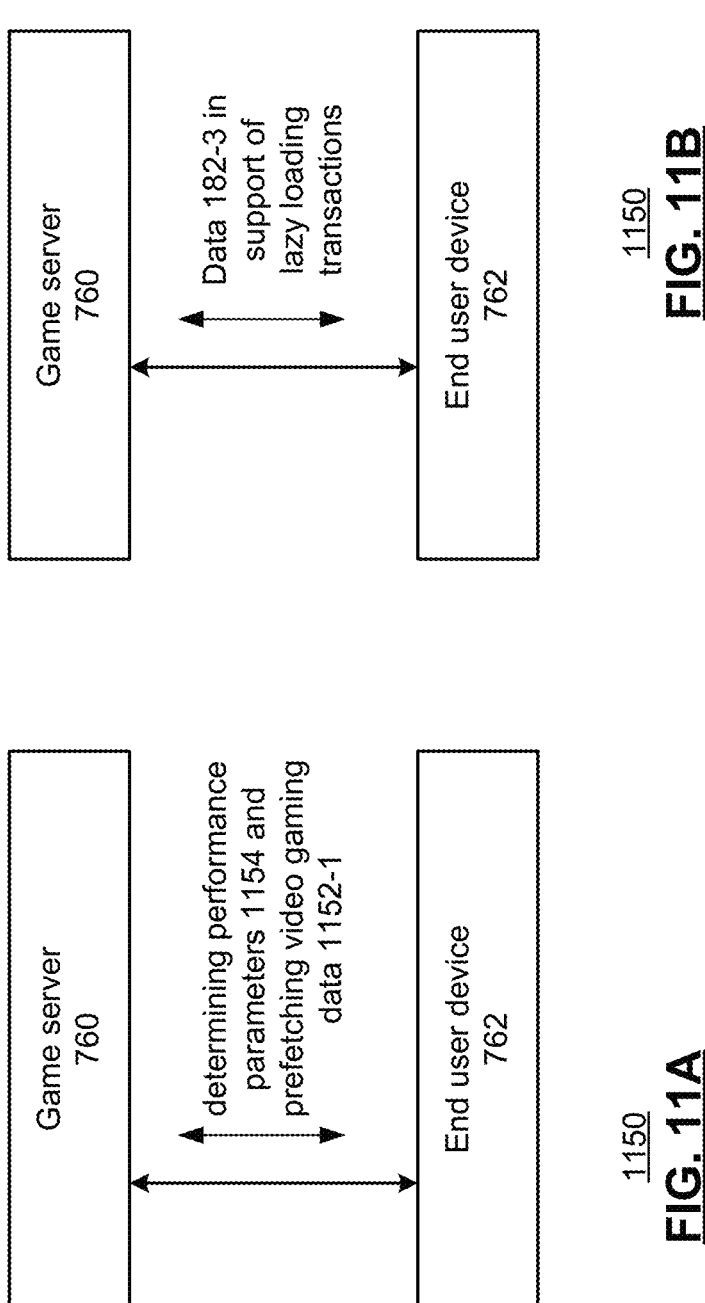
FIGS. 11A and 11B depict an illustrative embodiment of a process between a game server and an end user device in accordance with various aspects described herein.

FIGS. 11A and 11B depict an illustrative embodiment of a process between a game server and an end user device in accordance with various aspects described herein. A portion of a system 1150 is shown. In FIG. 11A, performance parameters 1154 of the end user device 762 are determined and video gaming data 1152-1 is prefetched. In FIG. 11B, data 182-3 is shared in support of lazy loading transactions to facilitate game play by the end user device 762.

In various examples, the amount of prefetch data that is downloaded to the end user device before the launch of the game is adapted based on performance parameters 1154 determined based on the end user device 762 including at least one connection bandwidth parameter associated with a network that indicates a connection speed. The prefetch data can include characters, a user interface, and textures that are cached locally to the end user device and, for example lessen the need for lazy loading in lower bandwidth scenarios.

In various examples, the performance parameters 1154 can include a network protocol, (e.g. 3G, 4G, 5G), a network provider, a measured download speed, a minimum download speed, a currently download speed. In addition, other performance parameters associated with the end user device such as display resolution, device type, OS, connection speed and/or browser type can be used to select an appropriate game engine, manifest file, etc.

In various examples, the amount of pre-fetched data to be downloaded is selected with more data preloaded for slower connection speeds and less for higher connection speeds with lazy loading video gaming data 1152-2 adapted as well—e.g. lazy relied on more heavily for higher bandwidth connections. The preloading amount can be entirely dynamic. For example, if 20 MB needs to be downloaded to start the game, 20 MB can be preloaded for the slowest connection and OMB for the fastest. Any connection halfway in between would then preload about 10 MB. Furthermore, game engine/and/or game server can adapt downloading/online speed to avoid crippling the network connection. For example, a mobile device might have a 3 g (7.2 mbit) connection, so it can only download at 6 mbit/s (750 KB/s) to avoid consuming the entire connection and disrupting the gameplay experience.

In various examples, lazy loading video gaming data 1152-2 is adapted based on the performance parameters to a bandwidth that is a predetermined amount less than the connection speed. This predetermined amount can be selected based on the connection speed such as a percentage (e.g., 15%, 20% or other value). In other examples, the predetermined amount can be selected independent from the connection speed as, for example, the minimum bandwidth required for game play and/or selected further based on at least one device parameter that indicates or corresponds to the resolution of the device display. Each of the foregoing techniques improve the technology of online gaming systems by intelligently adapting to the connection speed of the end user device.

FIG. 11C depicts an illustrative embodiment of a method in accordance with various aspects described herein. In particular, a method 1100-1 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 1102-1 includes determining a plurality of performance parameters associated with an end user device, the performance parameters including at least one connection bandwidth parameter associated with a network that indicates a connection speed. Step 1104-1 includes providing, over the network to the end user device, first video gaming data, the first video gaming data including a plurality of first resources associated with a first gaming canvass of a plurality of gaming canvasses of a video game; wherein each of the plurality of gaming canvasses is a sector of a map of the video game, wherein the first video gaming data facilitates playing of the video game via the end user device, and wherein an amount of first video gaming data that is provided is determined based on the performance parameters.

Step 1106-1 includes providing, over the network to the end user device, at least a portion of second video gaming data associated with a second gaming canvass, wherein the second gaming canvass is selected from among the plurality of gaming canvasses according to a predicting of movement of a player, wherein the second gaming canvass is another sector of the map adjacent to the first gaming canvass, wherein the providing the at least a portion of the second video gaming data occurs prior to the player entering the second gaming canvass, and wherein the at least a portion of second video gaming data facilitates playing of the video game via the end user device.

In addition or in the alternative to any of the foregoing, the amount of the first video gaming data is a first amount for a first connection speed and a second amount for a second connection speed, wherein the first amount is greater than the second amount when the first connection speed is less than the second connection speed.

In addition or in the alternative to any of the foregoing, providing the at least the portion of the second video gaming data is adapted based on the performance parameters to a bandwidth that is a predetermined amount less than the connection speed.

In addition or in the alternative to any of the foregoing, the predetermined amount is selected based on the connection speed.

In addition or in the alternative to any of the foregoing, the predetermined amount is independent from the connection speed.

In addition or in the alternative to any of the foregoing, the predetermined amount is selected further based on at least one device parameter.

In addition or in the alternative to any of the foregoing, the plurality of first resources include characters, a user interface, and textures that are cached locally to the end user device.

In addition or in the alternative to any of the foregoing, the plurality of first resources include one or more of: audio clips, textures, models, prefabs, shader programs, scenes, or serialized structures.

FIG. 11D depicts an illustrative embodiment of a method in accordance with various aspects described herein. In particular, a method 1100-2 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 1102-2 includes sending, over a network to a game server, a plurality of performance parameters associated with the end user device including at least one connection bandwidth parameter associated with a network that indicates a connection speed. Step 1104-2 includes receiving, over the network from the game server, prefetch data associated with a video game, wherein the prefetch data includes an amount of first video gaming data to be prefetched that is determined based on the performance parameters and storing the first video gaming data in a cache. Step 1106-2 includes executing the video game via the end user device, based at least in part on the first video gaming data. Step 1108-2 includes receiving user input at a user interface of the end user device associated with controlling movement of a player in a first region of the video game.

Step 1110-2 includes predicting, based on the movement of the player in the first region, a movement of the player to a second region of the video game, wherein the second region is different from the first region. Step 1112-2 includes lazy loading second video gaming data over the network and prior to the player entering the region, wherein the second video gaming data is not included in the first video gaming data and wherein the lazy loading is adapted based on the performance parameters to a bandwidth that is a predetermined amount less than the connection speed and storing the second video gaming data in the cache. Step 1114-2 includes continuing executing the video game on the end user device based at least in part on the second video gaming data.

In addition or in the alternative to any of the foregoing, the amount of the first video gaming data to be prefetched is a first amount for a first connection speed and a second amount for a second connection speed, wherein the first amount is greater than the second amount when the first connection speed is less than the second connection speed.

In addition or in the alternative to any of the foregoing, the operations further include: determining, prior to the player entering the second region, that a portion of the first video gaming data is associated with the second region; and retrieving, prior to the player entering the second region, the portion of the first video gaming data associated with the second region from the cache when the portion of the first video gaming data is associated with the second region.

In addition or in the alternative to any of the foregoing, the predetermined amount is selected based on the connection speed.

In addition or in the alternative to any of the foregoing, the predetermined amount is independent from the connection speed.

In addition or in the alternative to any of the foregoing, the predetermined amount is selected based on at least one device parameter.

FIG. 11E depicts an illustrative embodiment of a method in accordance with various aspects described herein. In particular, a method 1100-3 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 1102-3 includes sending, over a network to a game server, a plurality of performance parameters associated with the end user device including at least one device parameter and at least one connection bandwidth parameter associated with a network that indicates a connection speed. Step 1104-3 includes receiving, over the network from the game server, prefetch data associated with a video game, wherein the prefetch data includes an amount of first video gaming data to be prefetched that is determined based on the performance parameters. Step 1106-3 includes executing the video game via the end user device, based at least in part on the first video gaming data.

Step 1108-3 includes receiving user input at a user interface of the end user device associated with controlling movement of a player in a first region of the video game. Step 1110-3 includes predicting, based on the movement of the player in the first region, a movement of the player to a second region of the video game, wherein the second region is different from the first region. Step 1112-3 includes lazy loading second video gaming data over the network and prior to the player entering the region, wherein the second video gaming data is not included in the first video gaming data and wherein the lazy loading is adapted based on the performance parameters to a bandwidth that is a predetermined amount less than the connection speed. Step 1114-3 includes continuing executing the video game on the end user device based at least in part on the second video gaming data.

In addition or in the alternative to any of the foregoing, the amount of the first video gaming data to be prefetched is a first amount for a first connection speed and a second amount for a second connection speed, wherein the first amount is greater than the second amount when the first connection speed is less than the second connection speed.

In addition or in the alternative to any of the foregoing, the predetermined amount is selected based on the connection speed.

In addition or in the alternative to any of the foregoing, the predetermined amount is independent from the connection speed.

In addition or in the alternative to any of the foregoing, the predetermined amount is selected based on the at least one device parameter.

In addition or in the alternative to any of the foregoing, the operations further include: receiving a game engine over the network that further facilitates playing of the video game via a browser of the end user device.

FIG. 12A depicts an illustrative embodiment of a mobile application download in accordance with various aspects described herein. In the example shown, the end user device 762 is mobile device that has downloaded and launched a mobile application (app) 1252 that includes a native game engine.

In various examples, A mobile app also includes some preloaded files bundled with the app to avoid the necessity of lazy loading of some material. Preloaded content can include characters, UI, textures, shaders, models, audio, etc. and/or other assets/resources that are cached locally and fetched from the local device. The mobile app can also include one or more manifest files and the game platform 180 can trigger mobile app updates if new versions/updates are generated for preloaded materials and/or the manifest file(s).

In various examples the native game engine can be compiled into a native mobile app, not in the mobile browser. This improves the technology of online gaming systems since the native game engine is an actual app can operate with native APIs and can obtain full native performance without any limitations—getting the maximum amount out of the mobile hardware.

FIG. 12B depicts an illustrative embodiment of a method in accordance with various aspects described herein. In particular, a method 1200-1 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 1202-1 includes providing, over a network to an end user device, first video gaming data, the first video gaming data including a plurality of first resources associated with a first gaming canvas of a plurality of gaming canvasses of a video game; wherein each of the plurality of gaming canvasses is a sector of a map of the video game, wherein the first video gaming data facilitates playing of the video game via the end user device via a mobile application that includes a native game engine that is separate from a browser of the end user device.

Step 1204-1 includes providing, over the network to the end user device, at least a portion of second video gaming data associated with a second gaming canvas, wherein the second gaming canvas is selected from among the plurality of gaming canvasses according to a predicting of movement of a player, wherein the second gaming canvas is another sector of the map adjacent to the first gaming canvas, wherein the providing the at least a portion of the second video gaming data occurs prior to the player entering the second gaming canvas, and wherein the at least a portion of second video gaming data facilitates playing of the video game via the mobile application of the end user device.

In addition or in the alternative to any of the foregoing, the first video gaming data includes at least one manifest file associated with a plurality of resources of the video game.

In addition or in the alternative to any of the foregoing, the plurality of first resources include at least one of: materials, textures, shaders, user interface data, models, or audio.

In addition or in the alternative to any of the foregoing, the first video gaming data is stored in cache memory of the end user device during execution of the video game via the native game engine.

In addition or in the alternative to any of the foregoing, the native game engine is compiled on the end user device via the mobile application.

In addition or in the alternative to any of the foregoing, the predicting of movement of the player is estimated based on a predicted time when the player will enter the second gaming canvass, wherein the providing the at least a portion of second video gaming data is based on the predicted time.

In addition or in the alternative to any of the foregoing, a commencement of the providing the at least a portion of second video gaming data is selected based on the predicted time.

In addition or in the alternative to any of the foregoing, a data rate of the providing the at least a portion of second video gaming data is selected based on the predicted time.

FIG. 12C depicts an illustrative embodiment of a method in accordance with various aspects described herein. In particular, a method 1200-2 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 1202-2 includes downloading, over a network, a mobile application that includes a native game engine associated with a video game and first video gaming data. Step 1204-2 includes executing the video game on the end user device via the native game engine and separate from a browser, based at least in part on the first video gaming data. Step 1206-2 includes receiving, via the native game engine, user input at a user interface of the end user device associated with controlling movement of a player in a first region of the video game.

Step 1208-2 includes predicting, based on the movement of the player in the first region, a movement of the player to a second region of the video game, wherein the second region is different from the first region. Step 1210-2 includes lazy loading second video gaming data over the network and prior to the player entering the region. Step 1212-2 includes continuing executing the video game on the end user device via execution of the native game engine, based at least in part on the second video gaming data.

In addition or in the alternative to any of the foregoing, the first video gaming data includes at least one manifest file associated with a plurality of resources of the video game.

In addition or in the alternative to any of the foregoing, the first video gaming data includes a plurality of resources of the video game.

In addition or in the alternative to any of the foregoing, the plurality of resources include at least one of: materials, textures, shaders, user interface data, models, or audio.

In addition or in the alternative to any of the foregoing, the first video gaming data is stored in cache memory of the end user device during execution of the video game via the native game engine.

In addition or in the alternative to any of the foregoing, the native game engine is compiled on the end user device via the mobile application.

FIG. 12D depicts an illustrative embodiment of a method in accordance with various aspects described herein. In particular, a method 1200-3 is represented for use in conjunction with one or more functions and features described in conjunction the any of the preceding figures and any of the figures that follow. For example, the method can be performed by, or in conjunction with, a server such as a game server and/or a component of gaming platform 180, content data network 170 and/or other platform. For example, the method can be performed in conjunction with a network such as communications network 125 or other network. For example, the method can be performed by, or in conjunction with, an end user device such as client/end user device 105 or other end user device. For example, the method can be performed by, or in conjunction with, computer system 400, communication device 500, or other computing device that includes at least one processor, at least one memory and at least one network interface. In various examples, the method can be incorporated in non-transitory machine-readable medium, comprising executable instructions that, when executed by a device, facilitate performance of operations corresponding to the steps of the method. In various examples, the method can be incorporated in a device that includes a processing system including a processor, a user interface, and a memory that stores executable instructions that, when executed by the processing system, facilitate performance of operations corresponding to the steps of the method.

Step 1202-3 includes downloading, over a network, a mobile application that includes a native game engine associated with a video game. Step 1204-3 includes receiving, over the network, first video gaming data associated with a first gaming canvass of a plurality of gaming canvasses of the video game without receiving a remainder of video gaming data that is not associated with the first gaming canvass, wherein each of the plurality of gaming canvasses is a sector of a map of the video game. Step 1206-3 includes executing the video game on the end user device via the native game engine and based at least in part on the first video gaming data.

Step 1208-3 includes receiving user input at a user interface of the end user device associated with controlling movement of a player in the first gaming canvass. Step 1210-3 includes receiving, over the network, second video gaming data associated with a second gaming canvass that is another sector of the map adjacent to the first gaming canvass, wherein the receiving the second video gaming data occurs prior to the player entering the second gaming canvass. Step 1212-3 includes continuing executing the video game in the native game engine of the end user device based at least in part on the second video gaming data.

In addition or in the alternative to any of the foregoing, the first video gaming data includes at least one manifest file associated with a plurality of resources of the video game.

In addition or in the alternative to any of the foregoing, the first video gaming data includes a plurality of resources of the video game.

In addition or in the alternative to any of the foregoing, the plurality of resources include at least one of: materials, textures, shaders, user interface data, models, or audio.

In addition or in the alternative to any of the foregoing, the first video gaming data is stored in cache memory of the end user device during execution of the video game via the native game engine.

In addition or in the alternative to any of the foregoing, the native game engine is compiled on the end user device via the mobile application.

It should be noted that while the method, end user device and computer readable storage medium have been described above in terms of the downloading and/or execution of a mobile app, any of the foregoing could likewise be implemented via a desktop application and/or other software of an end user device—with or without the aid of a browser.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Similarly, flow diagram blocks may also have been arbitrarily defined herein to illustrate certain significant functionality.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

As may further be used herein, a computer readable memory includes one or more memory elements. A memory element may be a separate memory device, multiple memory devices, or a set of memory locations within a memory device. Such a memory device may be a read-only memory, random access memory, volatile memory, nonvolatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such a advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal X>5 is equivalent to determining if −X<−5, and the comparison to determine if signal A matches signal B can likewise be performed by determining −A matches −B or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

What is claimed is:

1. A method, comprising:

sending, over a network to a game server, a plurality of performance parameters associated with an end user device including at least one connection bandwidth parameter associated with the network that indicates a connection speed;

receiving, over the network from the game server, prefetch data associated with a video game, wherein the prefetch data includes a first amount of video gaming data that is determined based on the performance parameters including the at least one connection bandwidth parameter associated with the network;

storing the first amount of video gaming data in a cache;

executing the video game via the end user device, based at least in part on the first amount of video gaming data stored in the cache;

receiving user input at a user interface of the end user device associated with controlling movement of a player in a first region of the video game;

predicting, based on the user input associated with controlling movement of the player in the first region, a movement of the player to a second region of the video game, wherein the second region is different from the first region;

lazy loading second video gaming data associated with the video game over the network and prior to the player entering the second region of the video game, wherein the second video gaming data is not included in the first amount of video gaming data, and wherein the lazy loading is adapted based on the performance parameters to a bandwidth that is a predetermined amount less than the connection speed;

storing the lazy loaded second video gaming data in the cache; and continuing executing the video game on the end user device based at least in part on the lazy loaded second video gaming data stored in the cache.

2. The method of claim 1, wherein the first amount of video gaming data is a first amount for a first connection speed and a second amount for a second connection speed, wherein the first amount is greater than the second amount when the first connection speed is less than the second connection speed.

3. The method of claim 1, wherein the predetermined amount is selected based on the connection speed.

4. The method of claim 1, wherein the predetermined amount is independent from the connection speed.

5. The method of claim 1, wherein the predetermined amount is selected based on at least one device parameter.

6. The method of claim 1, wherein the first amount of video gaming data is a first amount for a first connection speed and a second amount for a second connection speed, wherein the first amount is greater than the second amount when the first connection speed is less than the second connection speed.

7. The method of claim 1, further comprising:

determining, prior to the player entering the second region of the video game, that a portion of the first amount of video gaming data is associated with the second region; and retrieving, prior to the player entering the second region, the portion of the first amount of video gaming data associated with the second region from the cache when the portion of the first video gaming data is associated with the second region.

8. A non-transitory machine-readable medium, comprising executable instructions that, when executed by an end user device, cause the end user device to perform operations, the operations comprising:

sending, over a network to a game server, a plurality of performance parameters associated with the end user device including at least one connection bandwidth parameter associated with the network that indicates a connection speed;

receiving, over the network from the game server, prefetch data associated with a video game, wherein the prefetch data includes a first amount of video gaming data that is determined based on the performance parameters including the at least one connection bandwidth parameter associated with the network;

storing the first amount of video gaming data in a cache;

executing the video game via the end user device, based at least in part on the first amount of video gaming data stored in the cache;

receiving user input at a user interface of the end user device associated with controlling movement of a player in a first region of the video game;

predicting, based on the user input associated with controlling movement of the player in the first region, a movement of the player to a second region of the video game, wherein the second region is different from the first region;

lazy loading second video gaming data associated with the video game over the network and prior to the player entering the second region of the video game, wherein the second video gaming data is not included in the first amount of video gaming data, and wherein the lazy loading is adapted based on the performance parameters to a bandwidth that is a predetermined amount less than the connection speed;

storing the lazy loaded second video gaming data in the cache; and continuing executing the video game on the end user device based at least in part on the lazy loaded second video gaming data stored in the cache.

9. The non-transitory machine-readable medium of claim 8, wherein the first amount of video gaming data is a first amount for a first connection speed and a second amount for a second connection speed, wherein the first amount is greater than the second amount when the first connection speed is less than the second connection speed.

10. The non-transitory machine-readable medium of claim 8, wherein the operations further include:

determining, prior to the player entering the second region of the video game, that a portion of the first amount of video gaming data is associated with the second region; and retrieving, prior to the player entering the second region, the portion of the first amount of video gaming data associated with the second region from the cache when the portion of the first video gaming data is associated with the second region.

11. The non-transitory machine-readable medium of claim 8, wherein the predetermined amount is selected based on the connection speed.

12. The non-transitory machine-readable medium of claim 8, wherein the predetermined amount is independent from the connection speed.

13. The non-transitory machine-readable medium of claim 8, wherein the predetermined amount is selected based on at least one device parameter.

14. An end user device, comprising:

a processing system including a processor;

a user interface; and a memory that stores executable instructions that, when executed by the processing system, cause the end user device to perform operations, the operations comprising:

sending, over a network to a game server, a plurality of performance parameters associated with the end user device including at least one device parameter and at least one connection bandwidth parameter associated with the network that indicates a connection speed;

receiving, over the network from the game server, prefetch data associated with a video game, wherein the prefetch data includes a first amount of video gaming data that is determined based on the performance parameters including the at least one connection bandwidth parameter associated with the network;

storing the first amount of video gaming data in a cache;

executing the video game via the end user device, based at least in part on the first amount of video gaming data stored in the cache;

receiving user input at a user interface of the end user device associated with controlling movement of a player in a first region of the video game;

predicting, based on the user input associated with controlling movement of the player in the first region, a movement of the player to a second region of the video game, wherein the second region is different from the first region;

lazy loading second video gaming data associated with the video game over the network and prior to the player entering the second region of the video game, wherein the second video gaming data is not included in the first amount of video gaming data, and wherein the lazy loading is adapted based on the performance parameters to a bandwidth that is a predetermined amount less than the connection speed;

storing the lazy loaded second video gaming data in the cache; and continuing executing the video game on the end user device based at least in part on the lazy loaded second video gaming data stored in the cache.

15. The end user device of claim 14, wherein the first amount of video gaming data is a first amount for a first connection speed and a second amount for a second connection speed, wherein the first amount is greater than the second amount when the first connection speed is less than the second connection speed.

16. The end user device of claim 14, the predetermined amount is selected based on the connection speed.

17. The end user device of claim 14, wherein the predetermined amount is independent from the connection speed.

18. The end user device of claim 14, wherein the predetermined amount is selected based on the at least one device parameter.

19. The end user device of claim 14, wherein the operations further include:

receiving a game engine over the network that further facilitates playing of the video game via a browser of the end user device.

* * * * *